(12) United States Patent
Kocer et al.

(10) Patent No.: US 12,389,899 B2
(45) Date of Patent: *Aug. 19, 2025

(54) LOCALIZED PRODUCT INJECTION SYSTEM AND METHODS FOR SAME

(71) Applicant: Raven Industries, Inc., Sioux Falls, SD (US)

(72) Inventors: Jared Ernest Kocer, Sioux Falls, SD (US); Nicholas O. Michael, Sioux Falls, SD (US); John D. Preheim, Beresford, SD (US); Brent A. Driesen, Alvord, IA (US)

(73) Assignee: Raven Industries, Inc., Sioux Falls, SD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/809,223

(22) Filed: Jun. 27, 2022

(65) Prior Publication Data

US 2023/0049963 A1   Feb. 16, 2023

Related U.S. Application Data

(63) Continuation of application No. 16/476,016, filed as application No. PCT/US2018/012590 on Jan. 5, 2018.

(Continued)

(51) Int. Cl.
*A01M 7/00* (2006.01)
*B05B 1/20* (2006.01)
(Continued)

(52) U.S. Cl.
CPC ........ *A01M 7/0092* (2013.01); *A01M 7/0071* (2013.01); *B05B 1/20* (2013.01);
(Continued)

(58) Field of Classification Search
CPC ..... B05B 12/12; B05B 12/006; B05B 12/008; B05B 15/658; B05B 7/0408; B05B 7/12;
(Continued)

(56) References Cited

U.S. PATENT DOCUMENTS

| | | |
|---|---|---|
| 1,582,986 A | 5/1926 | Frank |
| 3,197,299 A * | 7/1965 | Stull .................... B64D 1/18 504/319 |

(Continued)

FOREIGN PATENT DOCUMENTS

| | | |
|---|---|---|
| AU | 725448 | 10/2000 |
| AU | 2004219715 | 9/2004 |

(Continued)

OTHER PUBLICATIONS

"U.S. Appl. No. 13/776,285, Amendment and Response under 37 C.F.R. Sec. 1.114 filed Apr. 27, 2015", 13 pgs.

(Continued)

*Primary Examiner* — Cody J Lieuwen
(74) *Attorney, Agent, or Firm* — Schwegman Lundberg & Woessner, P.A.

(57) ABSTRACT

A localized product injection system includes a composite boom tube having a carrier fluid passage within a tube body, and at least one injection product passage within the tube body isolated from the carrier fluid passage. A plurality of port stations are provided at locations along the tube body. Each of the port stations includes a carrier fluid outlet port and at least one injection product outlet port. A localized injection interface is coupled at a port station. The injection interface includes a carrier fluid input coupled with the carrier fluid outlet port, and at least one injection product input coupled with the at least one injection product outlet port. The injection interface includes at least one throttling element in communication with the at least one injection (Continued)

product input, a mixing chamber, and an injection port configured for localized coupling and injection to a product dispenser.

27 Claims, 23 Drawing Sheets

Related U.S. Application Data

(60) Provisional application No. 62/442,897, filed on Jan. 5, 2017.

(51) Int. Cl.
    *B05B 7/04*         (2006.01)
    *B05B 7/12*         (2006.01)
    *B05B 7/26*         (2006.01)
    *B05B 12/12*       (2006.01)
    *B05B 12/14*       (2006.01)
    *B05B 15/658*     (2018.01)

(52) U.S. Cl.
    CPC .............. *B05B 7/0408* (2013.01); *B05B 7/12* (2013.01); *B05B 7/26* (2013.01); *B05B 12/12* (2013.01); *B05B 12/1436* (2013.01); *B05B 15/658* (2018.02)

(58) Field of Classification Search
    CPC .......... B05B 7/2486; B05B 7/32; B05B 7/28; B05B 7/26; B05B 13/005; A01C 23/007
    See application file for complete search history.

(56) References Cited

U.S. PATENT DOCUMENTS

| | | |
|---|---|---|
| 3,770,198 A | 11/1973 | Mihara |
| 3,955,795 A | 5/1976 | Neely |
| 4,283,010 A | 8/1981 | Arzi et al. |
| 4,356,528 A | 10/1982 | Coffee |
| 4,398,605 A | 8/1983 | Conklin et al. |
| 4,530,463 A | 7/1985 | Hiniker et al. |
| 4,582,085 A | 4/1986 | Hafner et al. |
| 4,632,358 A | 12/1986 | Orth et al. |
| 4,803,626 A | 2/1989 | Bachman et al. |
| 4,970,973 A | 11/1990 | Lyle et al. |
| 5,134,961 A | 8/1992 | Giles et al. |
| 5,285,814 A | 2/1994 | Pettersson et al. |
| 5,310,113 A | 5/1994 | Cowgur |
| 5,337,959 A | 8/1994 | Boyd |
| 5,475,614 A | 12/1995 | Tofte et al. |
| 5,479,812 A | 1/1996 | Juntunen et al. |
| 5,496,100 A | 3/1996 | Schmid |
| 5,503,366 A | 4/1996 | Zabeck et al. |
| 5,520,333 A | 5/1996 | Tofte |
| 5,615,836 A | 4/1997 | Graef |
| 5,635,911 A | 6/1997 | Landers et al. |
| 5,649,687 A | 7/1997 | Rosas et al. |
| 5,653,389 A | 8/1997 | Henderson et al. |
| 5,703,554 A | 12/1997 | Polgar et al. |
| 5,704,546 A | 1/1998 | Henderson et al. |
| 5,772,114 A | 6/1998 | Hunter |
| 5,785,246 A | 7/1998 | King et al. |
| 5,801,948 A | 9/1998 | Wood et al. |
| 5,864,781 A | 1/1999 | White |
| 5,881,919 A | 3/1999 | Womac et al. |
| 5,883,383 A | 3/1999 | Dragne |
| 5,884,205 A | 3/1999 | Elmore et al. |
| 5,884,224 A | 3/1999 | McNabb et al. |
| 5,897,600 A | 4/1999 | Elmore et al. |
| 5,911,362 A | 6/1999 | Wood et al. |
| 5,913,915 A | 6/1999 | McQuinn |
| 5,919,242 A | 7/1999 | Greatline et al. |
| 5,924,371 A | 7/1999 | Flamme et al. |
| 5,931,882 A | 8/1999 | Fick et al. |
| 5,936,234 A | 8/1999 | Thomas et al. |
| 5,938,071 A | 8/1999 | Sauder |
| 5,941,303 A | 8/1999 | Gowan et al. |
| 5,967,066 A | 10/1999 | Giles et al. |
| 5,969,340 A | 10/1999 | Dragne et al. |
| 5,971,294 A | 10/1999 | Thompson et al. |
| 5,978,723 A | 11/1999 | Hale et al. |
| 6,009,354 A | 12/1999 | Flamme et al. |
| 6,012,996 A | 1/2000 | Lo |
| 6,029,907 A | 2/2000 | McKenzie |
| 6,070,538 A | 6/2000 | Flamme et al. |
| 6,070,539 A | 6/2000 | Flamme et al. |
| 6,079,340 A | 6/2000 | Flamme et al. |
| 6,086,042 A | 7/2000 | Scott et al. |
| 6,089,743 A | 7/2000 | Mcquinn et al. |
| 6,093,926 A | 7/2000 | Mertins et al. |
| 6,112,999 A | 9/2000 | Fingleton et al. |
| 6,122,581 A | 9/2000 | McQuinn |
| 6,138,922 A | 10/2000 | Hartman et al. |
| 6,145,455 A | 11/2000 | Gust et al. |
| 6,149,071 A | 11/2000 | Maccallummhor et al. |
| 6,189,466 B1 | 2/2001 | Sinclair et al. |
| 6,189,807 B1 | 2/2001 | Miller et al. |
| 6,196,473 B1 | 3/2001 | Beeren et al. |
| 6,199,000 B1 | 3/2001 | Keller et al. |
| 6,209,563 B1 | 4/2001 | Seid et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,240,861 B1 | 6/2001 | Memory |
| 6,250,564 B1 | 6/2001 | Chahley |
| 6,269,757 B1 | 8/2001 | Kiest |
| 6,285,938 B1 | 9/2001 | Lang et al. |
| 6,305,583 B1 | 10/2001 | Ward et al. |
| 6,373,057 B1 | 4/2002 | Penfold |
| 6,486,761 B1 | 11/2002 | Czarnetzki et al. |
| 6,522,948 B1 | 2/2003 | Benneweis |
| 6,533,334 B1 | 3/2003 | Bonn |
| 6,584,920 B1 | 7/2003 | Cresswell |
| 6,598,944 B1 | 7/2003 | Wolff et al. |
| 6,606,542 B2 | 8/2003 | Hauwiller et al. |
| 6,661,514 B1 | 12/2003 | Tevs et al. |
| 6,666,384 B2 | 12/2003 | Prandi |
| 6,678,580 B2 | 1/2004 | Benneweis |
| 6,698,368 B2 | 3/2004 | Cresswell |
| 6,708,080 B2 | 3/2004 | Benneweis |
| 6,720,684 B2 | 4/2004 | Czimmek |
| 6,755,390 B2 | 6/2004 | Masuda et al. |
| 6,776,355 B2 | 8/2004 | Ringer et al. |
| 6,851,377 B2 | 2/2005 | Mayerle et al. |
| 6,853,276 B2 | 2/2005 | Smith |
| 6,877,675 B2 | 4/2005 | Benneweis |
| 6,877,717 B2 | 4/2005 | Collins et al. |
| 6,959,907 B2 | 11/2005 | Hironaka |
| 6,994,406 B1 | 2/2006 | Krawczyk et al. |
| 7,124,964 B2 | 10/2006 | Bui |
| 7,147,241 B2 | 12/2006 | Beaujot et al. |
| 7,152,540 B1 | 12/2006 | Sauder et al. |
| 7,156,322 B1 | 1/2007 | Heitzman et al. |
| 7,162,961 B2 | 1/2007 | Grimm |
| 7,195,027 B2 | 3/2007 | Goossens et al. |
| 7,243,899 B2 | 7/2007 | Acar et al. |
| 7,311,004 B2 | 12/2007 | Giles |
| 7,347,221 B2 | 3/2008 | Berger et al. |
| 7,395,769 B2 | 7/2008 | Jensen |
| 7,441,746 B2 | 10/2008 | Sugiyama |
| 7,472,660 B2 | 1/2009 | Mariman et al. |
| 7,478,603 B2 | 1/2009 | Riewerts et al. |
| 7,490,564 B2 | 2/2009 | Allan et al. |
| 7,502,665 B2 | 3/2009 | Giles et al. |
| 7,626,288 B2 | 12/2009 | Protze |
| 7,654,473 B2 | 2/2010 | Hibberd |
| 7,685,951 B2 | 3/2010 | Beaujot et al. |
| 7,690,440 B2 | 4/2010 | Dean et al. |
| 7,694,638 B1 | 4/2010 | Riewerts et al. |
| 7,706,926 B2 | 4/2010 | Peterson |
| 7,742,842 B2 | 6/2010 | Giles et al. |
| 7,789,321 B2 | 9/2010 | Hitt |
| 7,826,930 B2 | 11/2010 | Giles et al. |

(56) References Cited

U.S. PATENT DOCUMENTS

| | | | |
|---|---|---|---|
| 7,848,865 B2 | 12/2010 | Di Federico et al. |
| 7,917,249 B2 | 3/2011 | Jacobsen et al. |
| 7,954,731 B2 | 6/2011 | Antonucci et al. |
| 8,078,367 B2 | 12/2011 | Sauder et al. |
| 8,109,448 B2 | 2/2012 | Giles |
| 8,141,504 B2 | 3/2012 | Dean et al. |
| 8,170,825 B2 | 5/2012 | Beaujot et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,196,534 B2 | 6/2012 | Meyer et al. |
| 8,246,004 B2 | 8/2012 | Kratzer |
| 8,401,704 B2 | 3/2013 | Pollock et al. |
| 8,488,874 B2 | 7/2013 | Zaman et al. |
| 8,523,085 B2 | 9/2013 | Grimm et al. |
| 8,590,859 B2 | 11/2013 | Kurz |
| 8,634,993 B2 | 1/2014 | McClure |
| 8,635,963 B2 | 1/2014 | Friggstad |
| 8,701,707 B2 | 4/2014 | Moosmann et al. |
| 8,733,257 B2 | 5/2014 | Beaujot et al. |
| 8,733,259 B2 | 5/2014 | Beaujot |
| 8,739,830 B2 | 6/2014 | Bradbury et al. |
| 8,825,310 B2 | 9/2014 | Kowalchuk |
| 8,844,838 B2 | 9/2014 | Funseth et al. |
| 8,868,300 B2 | 10/2014 | Kocer et al. |
| 8,915,200 B2 | 12/2014 | Barsi et al. |
| 8,919,676 B2 | 12/2014 | Funseth et al. |
| 9,052,031 B2 | 6/2015 | Leidig |
| 9,061,296 B2 | 6/2015 | Peterson |
| 9,073,070 B2 | 7/2015 | Funseth et al. |
| 9,080,684 B2 | 7/2015 | Stahr |
| 9,113,591 B2 | 8/2015 | Shivak |
| 9,144,190 B2 | 9/2015 | Henry et al. |
| 9,266,124 B2 | 2/2016 | Humpal |
| 9,453,585 B2 | 9/2016 | Sato et al. |
| 9,470,332 B2 | 10/2016 | Miura |
| 9,504,212 B2 | 11/2016 | Michael et al. |
| 9,506,578 B2 | 11/2016 | Lee |
| 9,635,848 B2 | 5/2017 | Needham et al. |
| 9,702,475 B2 | 7/2017 | Scheffel et al. |
| 9,781,916 B2 | 10/2017 | Preheim et al. |
| 9,894,829 B2 | 2/2018 | Shivak |
| 10,058,879 B2 | 8/2018 | Needham |
| 10,173,236 B2 | 1/2019 | Preheim et al. |
| 10,189,031 B2 | 1/2019 | Funseth et al. |
| 10,368,538 B2 | 8/2019 | Preheim et al. |
| 10,518,284 B2 | 12/2019 | Thurow et al. |
| 10,568,257 B2 | 2/2020 | Shivak |
| 10,799,898 B2 | 10/2020 | Posselius et al. |
| 10,821,460 B2 | 11/2020 | Batcheller et al. |
| 11,051,505 B2 | 7/2021 | Humpal et al. |
| 11,071,247 B2 | 7/2021 | Shivak et al. |
| 11,134,668 B2 | 10/2021 | Preheim et al. |
| 11,160,204 B2 | 11/2021 | Michael |
| 11,236,841 B2 | 2/2022 | Krosschell et al. |
| 11,944,030 B2 | 4/2024 | Shivak et al. |
| 12,016,326 B2 | 6/2024 | Kocer et al. |
| 12,029,214 B2 | 7/2024 | Preheim et al. |
| 12,055,234 B2 | 8/2024 | Krosschell et al. |
| 2002/0030119 A1 | 3/2002 | Proharam |
| 2002/0107609 A1 | 8/2002 | Benneweis |
| 2003/0028321 A1 | 2/2003 | Upadhyaya et al. |
| 2003/0070597 A1 | 4/2003 | Cresswell |
| 2003/0234301 A1 | 12/2003 | Swan |
| 2004/0036048 A1 | 2/2004 | Petersen |
| 2004/0104370 A1 | 6/2004 | Suzuki |
| 2004/0128045 A1 | 7/2004 | Benneweis |
| 2005/0000277 A1 | 1/2005 | Giles |
| 2005/0048196 A1 | 3/2005 | Yanagita et al. |
| 2005/0051749 A1 | 3/2005 | Lee |
| 2005/0076818 A1 | 4/2005 | Grimm |
| 2005/0092951 A1 | 5/2005 | Groetzinger |
| 2005/0125083 A1 | 6/2005 | Kiko |
| 2005/0173979 A1 | 8/2005 | Voss |
| 2006/0086295 A1 | 4/2006 | Jensen |
| 2006/0097210 A1 | 5/2006 | Fong et al. |
| 2006/0237562 A1 | 10/2006 | Hedegard |
| 2006/0265106 A1 | 11/2006 | Giles et al. |
| 2006/0273189 A1 | 12/2006 | Grimm et al. |
| 2007/0039880 A1 | 2/2007 | Mayerle |
| 2008/0110476 A1 | 5/2008 | Amestoy et al. |
| 2008/0114497 A1 | 5/2008 | Giles et al. |
| 2008/0114498 A1 | 5/2008 | Giles |
| 2008/0147282 A1 | 6/2008 | Kormann |
| 2008/0163807 A1 | 7/2008 | Dean et al. |
| 2008/0230624 A1 | 9/2008 | Giles et al. |
| 2008/0283633 A1 | 11/2008 | Nozaki et al. |
| 2008/0296398 A1 | 12/2008 | Hickman et al. |
| 2009/0078178 A1 | 3/2009 | Beaujot |
| 2009/0101371 A1 | 4/2009 | Melanson et al. |
| 2009/0112372 A1 | 4/2009 | Peterson |
| 2009/0114210 A1 | 5/2009 | Guice et al. |
| 2009/0134237 A1* | 5/2009 | Giles ............... B01F 25/31242 239/8 |
| 2009/0184182 A1 | 7/2009 | Beeren |
| 2009/0271136 A1 | 10/2009 | Beaujot et al. |
| 2010/0032492 A1 | 2/2010 | Grimm et al. |
| 2010/0096476 A1 | 4/2010 | Callies et al. |
| 2010/0101469 A1 | 4/2010 | Landphair et al. |
| 2010/0132600 A1 | 6/2010 | Dean et al. |
| 2010/0163774 A1 | 7/2010 | Rimboym et al. |
| 2010/0269921 A1 | 10/2010 | Pifer et al. |
| 2011/0054743 A1 | 3/2011 | Kocer et al. |
| 2011/0160920 A1 | 6/2011 | Orr et al. |
| 2011/0179984 A1 | 7/2011 | Beaujot et al. |
| 2011/0204272 A1 | 8/2011 | Kratzer |
| 2011/0210186 A1 | 9/2011 | Kugler et al. |
| 2012/0045013 A1 | 2/2012 | Chen et al. |
| 2012/0080624 A1 | 4/2012 | Stahr et al. |
| 2012/0153051 A1 | 6/2012 | Kah, Jr. et al. |
| 2012/0168530 A1 | 7/2012 | Ellingson et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0216732 A1 | 8/2012 | Ballard et al. |
| 2012/0228395 A1 | 9/2012 | Needham |
| 2012/0241533 A1 | 9/2012 | Moeller et al. |
| 2012/0271467 A1 | 10/2012 | Grimm et al. |
| 2013/0032737 A1 | 2/2013 | Neilson et al. |
| 2013/0037633 A1 | 2/2013 | Walter et al. |
| 2013/0092746 A1 | 4/2013 | Scott et al. |
| 2013/0119154 A1 | 5/2013 | Sawyer |
| 2013/0192503 A1 | 8/2013 | Henry et al. |
| 2013/0269578 A1 | 10/2013 | Grimm |
| 2013/0292590 A1 | 11/2013 | Stahr |
| 2013/0306894 A1 | 11/2013 | Weis et al. |
| 2013/0320105 A1 | 12/2013 | Schmidt |
| 2013/0320106 A1 | 12/2013 | Schmidt |
| 2013/0333601 A1 | 12/2013 | Shivak |
| 2014/0014863 A1 | 1/2014 | Najmolhoda et al. |
| 2014/0026995 A1 | 1/2014 | Mayr et al. |
| 2014/0048002 A1 | 2/2014 | Grimm et al. |
| 2014/0084196 A1 | 3/2014 | Heyer et al. |
| 2014/0091243 A1 | 4/2014 | Leidig |
| 2014/0216315 A1 | 8/2014 | Beaujot et al. |
| 2014/0263705 A1 | 9/2014 | Michael et al. |
| 2014/0263708 A1 | 9/2014 | Thompson et al. |
| 2014/0263709 A1 | 9/2014 | Kocer et al. |
| 2014/0277780 A1 | 9/2014 | Jensen et al. |
| 2014/0299673 A1 | 10/2014 | Grimm et al. |
| 2014/0312141 A1 | 10/2014 | Ravishankar |
| 2014/0333398 A1 | 11/2014 | Nila et al. |
| 2014/0361094 A1* | 12/2014 | Michael ............... A01C 23/042 239/727 |
| 2015/0115058 A1 | 4/2015 | Wilger |
| 2015/0257331 A1 | 9/2015 | Shivak |
| 2015/0336116 A1 | 11/2015 | Gerdes |
| 2015/0367352 A1 | 12/2015 | Burchardt |
| 2015/0367357 A1 | 12/2015 | Humpal et al. |
| 2015/0367358 A1 | 12/2015 | Funseth et al. |
| 2015/0375247 A1* | 12/2015 | Funseth ............... B05B 1/20 239/69 |
| 2016/0015020 A1 | 1/2016 | Needham et al. |

(56) References Cited

U.S. PATENT DOCUMENTS

| | | | |
|---|---|---|---|
| 2016/0017792 | A1 | 1/2016 | Fletcher et al. |
| 2016/0044862 | A1 | 2/2016 | Kocer et al. |
| 2016/0084382 | A1 | 3/2016 | Pisasale |
| 2016/0136671 | A1 | 5/2016 | Kocer |
| 2016/0175869 | A1 | 6/2016 | Sullivan et al. |
| 2016/0178422 | A1 | 6/2016 | Humpal et al. |
| 2016/0227755 | A1 | 8/2016 | Preheim et al. |
| 2016/0251008 | A1 | 9/2016 | Jeon et al. |
| 2017/0018345 | A1 | 1/2017 | Raff et al. |
| 2017/0050206 | A1* | 2/2017 | Bullock ............... F16L 41/12 |
| 2017/0079200 | A1* | 3/2017 | Posselius ........... B05B 12/1418 |
| 2017/0095834 | A1 | 4/2017 | Kinard |
| 2017/0120263 | A1 | 5/2017 | Needham |
| 2017/0251656 | A1 | 9/2017 | Kolb et al. |
| 2017/0284285 | A1 | 10/2017 | Lenk et al. |
| 2017/0314580 | A1 | 11/2017 | Steensma et al. |
| 2017/0348718 | A1 | 12/2017 | Preheim et al. |
| 2018/0042214 | A1 | 2/2018 | Preheim et al. |
| 2018/0111148 | A1 | 4/2018 | Batcheller et al. |
| 2018/0288934 | A1 | 10/2018 | Shivak |
| 2019/0029170 | A1 | 1/2019 | Wilger |
| 2019/0040972 | A1 | 2/2019 | Schrader |
| 2019/0047694 | A1 | 2/2019 | Zivan et al. |
| 2019/0321844 | A1 | 10/2019 | Schrader et al. |
| 2019/0350187 | A1 | 11/2019 | Kocer et al. |
| 2019/0373880 | A1 | 12/2019 | Kocer et al. |
| 2020/0037519 | A1 | 2/2020 | Wonderlich et al. |
| 2020/0101480 | A1 | 4/2020 | Schrader et al. |
| 2020/0107538 | A1 | 4/2020 | Preheim et al. |
| 2020/0113170 | A1 | 4/2020 | Davis et al. |
| 2020/0113171 | A1 | 4/2020 | Davis et al. |
| 2020/0214193 | A1 | 7/2020 | Shivak |
| 2020/0253111 | A1 | 8/2020 | Schlipf et al. |
| 2021/0076977 | A1 | 3/2021 | Abeyratne et al. |
| 2021/0102637 | A1 | 4/2021 | Krosschell et al. |
| 2021/0144906 | A1 | 5/2021 | Shivak et al. |
| 2021/0176977 | A1 | 6/2021 | Bremer et al. |
| 2021/0219538 | A1 | 7/2021 | Krosschell et al. |
| 2021/0289693 | A1 | 9/2021 | Harmon et al. |
| 2021/0400946 | A1 | 12/2021 | Burgers et al. |
| 2022/0062934 | A1 | 3/2022 | Ferren et al. |
| 2022/0079132 | A1 | 3/2022 | Preheim et al. |
| 2022/0088627 | A1 | 3/2022 | Chaim et al. |
| 2022/0099213 | A1 | 3/2022 | Krosschell et al. |
| 2022/0104427 | A1 | 4/2022 | Michael |
| 2023/0141050 | A1 | 5/2023 | Sibley et al. |
| 2024/0307911 | A1 | 9/2024 | Kocer et al. |
| 2024/0324580 | A1 | 10/2024 | Preheim et al. |
| 2024/0418289 | A1 | 12/2024 | Krosschell et al. |
| 2024/0424506 | A1 | 12/2024 | Kocer |

FOREIGN PATENT DOCUMENTS

| | | | |
|---|---|---|---|
| AU | 2005247004 | | 12/2006 |
| AU | 2006202376 | B2 | 12/2006 |
| AU | 2009203181 | A1 | 2/2010 |
| AU | 2012201357 | A1 | 9/2012 |
| AU | 2013203361 | A1 | 10/2013 |
| AU | 2013204455 | A1 | 3/2014 |
| AU | 2013248190 | | 5/2014 |
| AU | 2013277513 | B2 | 3/2017 |
| AU | 2017285727 | B2 | 7/2020 |
| AU | 2020357581 | A1 | 5/2022 |
| AU | 2020357581 | | 8/2023 |
| AU | 2021209314 | | 8/2023 |
| AU | 2023214344 | | 8/2023 |
| CA | 2229852 | A1 | 8/1998 |
| CA | 2517031 | A1 | 9/2004 |
| CA | 2528708 | A1 | 11/2006 |
| CA | 2549300 | A1 | 12/2006 |
| CA | 2674527 | A1 | 2/2010 |
| CA | 2770013 | A1 | 9/2012 |
| CA | 2811726 | A1 | 10/2013 |
| CA | 2813949 | A1 | 2/2014 |
| CA | 2830306 | | 4/2014 |
| CA | 2926448 | A1 | 4/2015 |
| CA | 2926448 | C | 9/2020 |
| CN | 102435019 | A | 5/2012 |
| CN | 202255911 | U | 5/2012 |
| CN | 102266829 | B | 12/2012 |
| CN | 203264929 | U | 11/2013 |
| DE | 102011053182 | | 3/2013 |
| DE | 112017003084 | T5 | 6/2019 |
| EP | 0086029 | A1 | 8/1983 |
| EP | 0576121 | B1 | 3/1996 |
| EP | 969712 | | 1/2000 |
| EP | 0961659 | | 10/2002 |
| EP | 0963255 | B1 | 10/2002 |
| EP | 0847307 | B2 | 1/2003 |
| EP | 0837735 | B1 | 2/2004 |
| EP | 1426112 | B1 | 6/2011 |
| EP | 2249876 | B1 | 8/2012 |
| EP | 3530115 | A1 | 8/2019 |
| FR | 2964047 | A1 | 3/2012 |
| GB | 990346 | A | 4/1965 |
| GB | 2322573 | A | 9/1998 |
| JP | 2759711 | B2 | 5/1998 |
| JP | 2000139245 | A | 5/2000 |
| JP | 2005161221 | A | 6/2005 |
| JP | 2010127694 | A | 6/2010 |
| SU | 1285443 | A1 | 1/1987 |
| WO | WO-9712688 | A1 | 4/1997 |
| WO | WO-WO1997012688 | A1 | 4/1997 |
| WO | WO-98037751 | | 9/1998 |
| WO | WO-9842178 | A1 | 10/1998 |
| WO | WO-9916007 | A1 | 4/1999 |
| WO | WO-1999016007 | A1 | 4/1999 |
| WO | WO-2004023865 | | 3/2004 |
| WO | WO-2004081499 | | 9/2004 |
| WO | WO-2005048704 | A2 | 6/2005 |
| WO | WO-2005090979 | A1 | 9/2005 |
| WO | WO-2008059984 | A1 | 5/2008 |
| WO | WO-2008112930 | A1 | 9/2008 |
| WO | WO-2010105221 | A1 | 9/2010 |
| WO | WO-2012022903 | A1 | 2/2012 |
| WO | 2013001948 | | 1/2013 |
| WO | WO-2013135430 | A1 | 9/2013 |
| WO | WO-2013191990 | A2 | 12/2013 |
| WO | WO-2013191990 | A3 | 12/2013 |
| WO | WO-2014201008 | A1 | 12/2014 |
| WO | WO-2014210043 | A1 | 12/2014 |
| WO | WO-2015058091 | A1 | 4/2015 |
| WO | WO-2016145081 | A2 | 9/2016 |
| WO | WO-2016145081 | A3 * | 11/2016 ........... A01C 23/042 |
| WO | WO-2017124175 | A1 | 7/2017 |
| WO | WO-2017192625 | A1 | 11/2017 |
| WO | WO-2017223252 | A1 | 12/2017 |
| WO | WO-2018129323 | A1 | 7/2018 |
| WO | WO-2018129376 | A2 | 7/2018 |
| WO | WO-2018129376 | A3 | 7/2018 |
| WO | WO-2021066962 | A1 | 4/2021 |
| WO | WO-2021263024 | A1 | 12/2021 |
| WO | 2022094138 | | 5/2022 |
| WO | 2023278009 | | 1/2023 |
| WO | WO-2024192167 | A1 | 9/2024 |
| WO | 2024263873 | | 12/2024 |

OTHER PUBLICATIONS

"U.S. Appl. No. 13/776,285, Non Final Office Action mailed Jul. 30, 2014", 15 pgs.
"U.S. Appl. No. 13/776,285, Notice of Allowance mailed Jan. 27, 2015", 5 pgs.
"U.S. Appl. No. 13/776,285, Notice of Allowance mailed May 4, 2015", 6 pgs.
"U.S. Appl. No. 13/776,285, Response filed Dec. 30, 2014 to Non Final Office Action mailed Jul. 30, 2014", 25 pgs.
"U.S. Appl. No. 13/832,678, Advisory Action mailed Jun. 3, 2016", 3 pgs.
"U.S. Appl. No. 13/832,678, Final Office Action mailed Mar. 17, 2016", 12 pgs.
"U.S. Appl. No. 13/832,678, Non Final Office Action mailed Oct. 1, 2015", 15 pgs.

(56) References Cited

OTHER PUBLICATIONS

"U.S. Appl. No. 13/832,678, Notice of Allowance mailed Jul. 20, 2016", 13 pgs.
"U.S. Appl. No. 13/832,678, Response filed May 12, 2016 to Final Office Action mailed Mar. 17, 2016", 10 pgs.
"U.S. Appl. No. 13/832,678, Response filed Jul. 27, 2015 to Restriction Requirement mailed Jun. 9, 2015", 7 pgs.
"U.S. Appl. No. 13/832,678, Response filed Dec. 31, 2015 to Non Final Office Action mailed Oct. 1, 2015", 10 pgs.
"U.S. Appl. No. 13/832,678, Restriction Requirement mailed Jun. 9, 2015", 7 pgs.
"U.S. Appl. No. 14/300,761, Advisory Action mailed Dec. 12, 2017", 3 pgs.
"U.S. Appl. No. 14/300,761, Examiner Interview Summary mailed Nov. 22, 2017", 3 pgs.
"U.S. Appl. No. 14/300,761, Final Office Action mailed Aug. 31, 2017", 11 pgs.
"U.S. Appl. No. 14/300,761, Final Office Action mailed Nov. 27, 2018", 16 pgs.
"U.S. Appl. No. 14/300,761, Final Office Action mailed Dec. 18, 2020", 14 pgs.
"U.S. Appl. No. 14/300,761, Non Final Office Action mailed Feb. 8, 2017", 13 pgs.
"U.S. Appl. No. 14/300,761, Non Final Office Action mailed Apr. 15, 2020", 17 pgs.
"U.S. Appl. No. 14/300,761, Non Final Office Action mailed May 24, 2018", 16 pgs.
"U.S. Appl. No. 14/300,761, Notice of Allowance mailed May 7, 2021", 16 pgs.
"U.S. Appl. No. 14/300,761, Notice of Allowance mailed Sep. 9, 2021", 16 pgs.
"U.S. Appl. No. 14/300,761, Response filed Apr. 19, 2021 to Final Office Action mailed Dec. 18, 2020", 19 pgs.
"U.S. Appl. No. 14/300,761, Response filed Jun. 7, 2017 to Non Final Office Action mailed Feb. 8, 2017", 16 pgs.
"U.S. Appl. No. 14/300,761, Response filed Oct. 15, 2020 to Non Final Office Action mailed Apr. 15, 2020", 17 pgs.
"U.S. Appl. No. 14/300,761, Response filed Oct. 24, 2018 to Non Final Office Action mailed May 24, 2018", 22 pgs.
"U.S. Appl. No. 14/300,761, Response filed Nov. 29, 2019 to Final Office Action mailed Nov. 27, 2018", 21 pgs.
"U.S. Appl. No. 14/300,761, Response filed Dec. 20, 2016 to Restriction Requirement mailed Oct. 20, 2016", 15 pgs.
"U.S. Appl. No. 14/300,761, Resposne filed Nov. 16, 2017 to Final Office Action mailed Aug. 31, 2017", 16 pgs.
"U.S. Appl. No. 14/300,761, Restriction Requirement mailed Oct. 20, 2016", (9 pgs).
"U.S. Appl. No. 14/727,535, Corrected Notice of Allowance mailed Jan. 12, 2018", 2 pgs.
"U.S. Appl. No. 14/727,535, Final Office Action mailed Jun. 21, 2017", 6 pgs.
"U.S. Appl. No. 14/727,535, Non Final Office Action mailed Feb. 16, 2017", 17 pgs.
"U.S. Appl. No. 14/727,535, Notice of Allowance mailed Aug. 24, 2017", 5 pgs.
"U.S. Appl. No. 14/727,535, Preliminary Amendment filed Jun. 2, 2015", 9 pgs.
"U.S. Appl. No. 14/727,535, Response filed Jan. 17, 2017 to Restriction Requirement mailed Nov. 17, 2016", 12 pgs.
"U.S. Appl. No. 14/727,535, Response filed May 6, 2017 to Non Final Office Action mailed Feb. 16, 2017", 18 pgs.
"U.S. Appl. No. 14/727,535, Response filed Aug. 14, 2017 to Final Office Action mailed Jun. 21, 2017", 9 pgs.
"U.S. Appl. No. 14/727,535, Restriction Requirement mailed Nov. 17, 2016", 6 pgs.
"U.S. Appl. No. 14/899,946, Final Office Action mailed Dec. 28, 2018", 41 pgs.
"U.S. Appl. No. 14/899,946, Non Final Office Action mailed Mar. 26, 2018", 37 pgs.
"U.S. Appl. No. 14/899,946, Response filed Aug. 27, 2018 to Non Final Office Action mailed Mar. 26, 2018", 27 pgs.
"U.S. Appl. No. 15/029,935, Final Office Action mailed Jul. 11, 2017", 6 pgs.
"U.S. Appl. No. 15/029,935, Non Final Office Action mailed Mar. 30, 2017", 21 pgs.
"U.S. Appl. No. 15/029,935, Notice of Allowance mailed Aug. 29, 2017", 5 pgs.
"U.S. Appl. No. 15/029,935, Preliminary Amendment filed Apr. 15, 2016", 3 pgs.
"U.S. Appl. No. 15/029,935, Reponse filed Aug. 16, 2017 to Final Office Action mailed Jul. 11, 2017", 11 pgs.
"U.S. Appl. No. 15/029,935, Response filed Jun. 15, 2017 to Non Final Office Action mailed Mar. 30, 2017", 12 pgs.
"U.S. Appl. No. 15/585,034, Non Final Office Action mailed Nov. 2, 2018", 25 pgs.
"U.S. Appl. No. 15/629,696, Corrected Notice of Allowability mailed Aug. 29, 2018", 4 pgs.
"U.S. Appl. No. 15/629,696, Corrected Notice of Allowability mailed Dec. 7, 2018", 2 pgs.
"U.S. Appl. No. 15/629,696, Ex Parte Quayle Action mailed May 3, 2018", 12 pgs.
"U.S. Appl. No. 15/629,696, Response filed Jul. 3, 2018 to Ex Parte Quayle Action mailed May 3, 2018", 13 pgs.
"U.S. Appl. No. 15/629,696, Response to Examiner's Reasons for Allowance filed Nov. 13, 2018", 2 pgs.
"U.S. Appl. No. 15/703,818, Corrected Notice of Allowability mailed Jul. 8, 2019", 2 pgs.
"U.S. Appl. No. 15/703,818, Non Final Office Action mailed Oct. 11, 2018", 6 pgs.
"U.S. Appl. No. 15/703,818, Notice of Allowance mailed Mar. 20, 2019", 5 pgs.
"U.S. Appl. No. 15/703,818, Preliminary Amendment filed Nov. 3, 2017", 6 pgs.
"U.S. Appl. No. 15/703,8181, Response filed Jan. 11, 2019 to Non Final Office Action mailed Oct. 11, 2018", 9 pgs.
"U.S. Appl. No. 15/821,113, Corrected Notice of Allowability mailed Jan. 2, 2020", 2 pgs.
"U.S. Appl. No. 15/821,113, Corrected Notice of Allowability mailed Jan. 28, 2020", 2 pgs.
"U.S. Appl. No. 15/821,113, Ex Parte Quayle Action mailed Aug. 9, 2019", 4 pgs.
"U.S. Appl. No. 15/821,113, Notice of Allowance mailed Sep. 27, 2019", 5 pgs.
"U.S. Appl. No. 15/821,113, Notice of Allowance mailed Oct. 22, 2019", 5 pgs.
"U.S. Appl. No. 15/821,113, Notice of Non-Compliant Amendment mailed Jun. 11, 2019", 4 pgs.
"U.S. Appl. No. 15/821,113, Preliminary Amendment filed Jun. 28, 2018", 7 pgs.
"U.S. Appl. No. 15/821,113, Response filed Apr. 29, 2019 to Restriction Requirement mailed Nov. 30, 2018", 10 pgs.
"U.S. Appl. No. 15/821,113, Response filed Jul. 11, 2019 to Notice of Non-Compliant Amendment mailed Jun. 11, 2019", 12 pgs.
"U.S. Appl. No. 15/821,113, Response filed Sep. 9, 2019 to Ex Parte Quayle Action mailed Aug. 9, 2019", 3 pgs.
"U.S. Appl. No. 15/821,113, Restriction Requirement mailed Nov. 30, 2018", 6 pgs.
"U.S. Appl. No. 16/447,779, Corrected Notice of Allowability mailed May 26, 2021", 2 pgs.
"U.S. Appl. No. 16/447,779, Corrected Notice of Allowability mailed Sep. 9, 2021", 2 pgs.
"U.S. Appl. No. 16/447,779, Non Final Office Action mailed Jan. 12, 2021", 9 pgs.
"U.S. Appl. No. 16/447,779, Notice of Allowance mailed May 20, 2021", 5 pgs.
"U.S. Appl. No. 16/447,779, Preliminary Amendment filed Dec. 30, 2019", 4 pgs.
"U.S. Appl. No. 16/447,779, Response filed Apr. 12, 2021 to Non Final Office Action mailed Jan. 12, 2021", 7 pgs.
"U.S. Appl. No. 16/476,016, Examiner Interview Summary mailed Apr. 15, 2022", 2 pgs.

(56) References Cited

OTHER PUBLICATIONS

"U.S. Appl. No. 16/476,016, Final Office Action mailed Jan. 11, 2022", 15 pgs.
"U.S. Appl. No. 16/476,016, Non Final Office Action mailed Jun. 24, 2022", 15 pgs.
"U.S. Appl. No. 16/476,016, Non Final Office Action mailed Aug. 31, 2021", 14 pgs.
"U.S. Appl. No. 16/476,016, Preliminary Amendment filed Jul. 3, 2019", 12 pgs.
"U.S. Appl. No. 16/476,016, Response filed Apr. 11, 2022 to Final Office Action mailed Jan. 11, 2022", 18 pgs.
"U.S. Appl. No. 16/476,016, Response filed Jul. 28, 2021 to Restriction Requirement mailed Apr. 30, 2021", 12 pgs.
"U.S. Appl. No. 16/476,016, Response filed Nov. 29, 2021 to Non Final Office Action mailed Aug. 31, 2021", 19 pgs.
"U.S. Appl. No. 16/476,016, Restriction Requirement mailed Apr. 30, 2021", 8 pgs.
"U.S. Appl. No. 16/731,325, Corrected Notice of Allowability mailed Jun. 15, 2021", 2 pgs.
"U.S. Appl. No. 16/731,325, Ex Parte Quayle Action mailed Oct. 22, 2020", 5 pgs.
"U.S. Appl. No. 16/731,325, Examiner Interview Summary mailed Oct. 23, 2020", 2 pgs.
"U.S. Appl. No. 16/731,325, Notice of Allowance mailed Feb. 18, 2021", 8 pgs.
"U.S. Appl. No. 16/731,325, Notice of Allowance mailed Mar. 23, 2021", 5 pgs.
"U.S. Appl. No. 16/731,325, Notice of Allowance mailed Dec. 7, 2020", 5 pgs.
"U.S. Appl. No. 16/731,325, Preliminary Amendment filed Mar. 24, 2020", 8 pgs.
"U.S. Appl. No. 16/731,325, Response filed Nov. 20, 2020 to Ex Parte Quayle Action mailed Oct. 22, 2020", 10 pgs.
"U.S. Appl. No. 17/001,539, 312 Amendment filed Oct. 5, 2021", 3 pgs.
"U.S. Appl. No. 17/001,539, Notice of Allowance mailed Jun. 3, 2021", 12 pgs.
"U.S. Appl. No. 17/001,539, Notice of Allowance mailed Sep. 15, 2021", 11 pgs.
"U.S. Appl. No. 17/001,539, Supplemental Notice of Allowability mailed Dec. 23, 2021", 4 pgs.
"U.S. Appl. No. 17/161,453, Preliminary Amendment filed Jan. 28, 2021", 8 pgs.
"U.S. Appl. No. 17/410,852, Preliminary Amendment filed Dec. 10, 2021", 8 pgs.
"U.S. Appl. No. 17/465,644, Preliminary Amendment filed Dec. 17, 2021", 11 pgs.
"U.S. Appl. No. 17/504,601, Preliminary Amendment filed Dec. 22, 2021", 7 pgs.
"Application Serial No. PCT/US2014/061150, International Preliminary Report on Patentability mailed Oct. 16, 2015", 10 pgs.
"U.S. Appl. No. 15/629,696, Notice of Allowance mailed Aug. 13, 2018", 5 pgs.
"Australian Application Serial No. 2013277513, First Examiners Report mailed Jul. 26, 2016", 3 pgs.
"Australian Application Serial No. 2013277513, Notice of Acceptance mailed Nov. 8, 2016", 2 pgs.
"Australian Application Serial No. 2013277513, Response filed Oct. 28, 2016 to First Examiners Report mailed Jul. 26, 2016", 20 pgs.
"Australian Application Serial No. 2014278310, First Examiners Report mailed on Jul. 28, 2017", 5 pgs.
"Australian Application Serial No. 2017285727, First Examination Report mailed May 21, 2019", 2 pgs.
"Australian Application Serial No. 2018205225, First Examination Report mailed Apr. 15, 2020", 8 pgs.
"Australian Application Serial No. 2018205225, Response filed Jan. 19, 2021 to First Examination Report mailed Apr. 15, 2020", 14 pgs.
"Australian Application Serial No. 2018205225, Response filed Apr. 13, 2021 to Subsequent Examiners Report mailed Feb. 11, 2021", 24 pgs.
"Australian Application Serial No. 2018205225, Subsequent Examiners Report mailed Feb. 11, 2021", 6 pgs.
"Brazilian Application Serial No. 1120160085175, Office Action mailed Nov. 6, 2018", (w/ English Translation), 6 pgs.
"Canadian Application Serial No. 2,877,195, Office Action mailed Jun. 18, 2019", 3 pgs.
"Canadian Application Serial No. 2,877,195, Office Action mailed Dec. 9, 2020", 3 pgs.
"Canadian Application Serial No. 2,877,195, Response filed Apr. 8, 2021 to Office Action mailed Dec. 9, 2020", 16 pgs.
"Canadian Application Serial No. 2,877,195, Response filed Dec. 18, 2019 to Office Action mailed Jun. 18, 2019", 10 pgs.
"Canadian Application Serial No. 2,877,195, Voluntary Amendment filed Nov. 16, 2020", 13 pgs.
"Canadian Application Serial No. 2,926,448, Examiner's Rule 30(2) Requisition mailed Oct. 3, 2018", 3 pgs.
"Canadian Application Serial No. 2,926,448, Office Action mailed Jan. 5, 2018", 5 pgs.
"Canadian Application Serial No. 2,926,448, Response filed Mar. 19, 2019 to Examiner's Rule 30(2) Requisition mailed Oct. 3, 2018", 7 pgs.
"Canadian Application Serial No. 2,926,448, Response filed Jun. 26, 2018 to Office Action mailed Jan. 5, 2018", 19 pgs.
"Canadian Application Serial No. 3,049,391, Office Action mailed Sep. 4, 2020", 4 pgs.
"Canadian Application Serial No. 3,049,391, Office Action mailed Dec. 1, 2021", 4 pgs.
"Canadian Application Serial No. 3,049,391, Response filed Mar. 3, 2021 to Office Action mailed Sep. 4, 2020", 11 pgs.
"Canadian Application Serial No. 3,049,391, Response filed Mar. 15, 2022 to Office Action mailed Dec. 1, 2021", 8 pgs.
"European Application Serial No. 13807150.1, Communication Pursuant to Article 94(3) EPC mailed Nov. 8, 2017", 5 pgs.
"European Application Serial No. 13807150.1, Extended European Search Report mailed Jan. 8, 2016", 8 pgs.
"European Application Serial No. 13807150.1, Office Action mailed Jan. 26, 2016", 1 pg.
"European Application Serial No. 13807150.1, Office Action mailed Feb. 3, 2015", 3 pgs.
"European Application Serial No. 13807150.1, Response filed Aug. 3, 2015 to Office Action mailed Feb. 3, 2015", 10 pgs.
"European Application Serial No. 13807150.1, Response filed Aug. 5, 2016 to Office Action mailed Jan. 26, 2016", 14 pgs.
"European Application Serial No. 18736496.3, Extended European Search Report mailed Sep. 15, 2020", 9 pgs.
"European Application Serial No. 18736496.3, Response filed Apr. 12, 2021 to Extended European Search Report mailed Sep. 15, 2020", 31 pgs.
"European Application Serial No. 18736496.3, Response to Communication Pursuant to Rules 161(2) and 162 EPC filed Feb. 28, 2020", 14 pgs.
"International Application Serial No. PCT/US2013/045445, International Preliminary Report on Patentability mailed Dec. 31, 2014", 7 pgs.
"International Application Serial No. PCT/US2013/045445, International Search Report mailed Nov. 27, 2013", 3 pgs.
"International Application Serial No. PCT/US2013/045445, Written Opinion mailed Nov. 27, 2013", 9 pgs.
"International Application Serial No. PCT/US2014/041717, International Preliminary Report on Patentability mailed May 6, 2015", 11 pgs.
"International Application Serial No. PCT/US2014/041717, International Search Report mailed Oct. 15, 2014", 2 pgs.
"International Application Serial No. PCT/US2014/041717, Response and Amendment filed Apr. 5, 2015 to Written Opinion mailed Oct. 15, 2014", 15 pgs.
"International Application Serial No. PCT/US2014/041717, Written Opinion mailed Oct. 15, 2014", 7 pgs.
"International Application Serial No. PCT/US2014/043926, International Preliminary Report on Patentability Jan. 7, 2016", 11 pgs.

(56) References Cited

OTHER PUBLICATIONS

"International Application Serial No. PCT/US2014/043926, International Search Report mailed Nov. 3, 2014", 2 pgs.
"International Application Serial No. PCT/US2014/043926, Written Opinion mailed Nov. 3, 2014", 9 pgs.
"International Application Serial No. PCT/US2014/061150, International Search Report mailed Feb. 4, 2015", 2 pgs.
"International Application Serial No. PCT/US2014/061150, Written Opinion mailed Feb. 4, 2015", 7 pgs.
"International Application Serial No. PCT/US2017/030694, International Preliminary Report on Patentability mailed May 29, 2018", 23 pgs.
"International Application Serial No. PCT/US2017/030694, International Search Report mailed Aug. 1, 2017", 3 pgs.
"International Application Serial No. PCT/US2017/030694, Response filed Mar. 2, 2018 to Written Opinion mailed Aug. 1, 2017", 4 pgs.
"International Application Serial No. PCT/US2017/030694, Written Opinion mailed Aug. 1, 2017", 8 pgs.
"International Application Serial No. PCT/US2017/038622, International Preliminary Report on Patentability mailed Jan. 3, 2019", 7 pgs.
"International Application Serial No. PCT/US2017/038622, International Search Report mailed Sep. 28, 2017", 2 pgs.
"International Application Serial No. PCT/US2017/038622, Written Opinion mailed Sep. 29, 2017", 5 pgs.
"International Application Serial No. PCT/US2018/012590, International Preliminary Report on Patentability mailed Jul. 18, 2019", 15 pgs.
"International Application Serial No. PCT/US2018/012590, International Search Report mailed Apr. 13, 2018", 4 pgs.
"International Application Serial No. PCT/US2018/012590, Invitation to Pay Additional Fees and Partial Search Report mailed Feb. 21, 2018", 2 pgs.
"International Application Serial No. PCT/US2018/012590, Written Opinion mailed Apr. 13, 2018", 13 pgs.
"International Application Serial No. PCT/US2018/012661, International Search Report mailed Jun. 21, 2018", 4 pgs.
"International Application Serial No. PCT/US2018/012661, Invitation to Pay Additional Fees and Partial Search Report mailed Mar. 15, 2018", 2 pgs.
"International Application Serial No. PCT/US2018/012661, Written Opinion mailed Jun. 21, 2018", 9 pgs.
"International Application Serial No. PCT/US2020/047696, International Search Report mailed Nov. 23, 2020", 2 pgs.
"International Application Serial No. PCT/US2020/047696, Written Opinion mailed Nov. 23, 2020", 4 pgs.
Bevly, David M, et al., "Carrier-Phase Differential GPS for Control of a Tractor Towed Implement", Proceedings of the 13th International Technical Meeting of the Satellite Division of The Institute of Navigation (ION GPS 2000), (2000), 2263-2268.
Dietz, John, "A five-part program for efficient farming", Farming, (Apr. 2000), 1-4.
Elmore, Clyde L., "Soil Solarization A Nonpesticidal Method for Controlling Diseases, Nematodes, and Weeds", University of California Division of Agriculture and Natural Resources Publication 21377, (1997), 1-17.
Van Zuydam, R. P, "A driver's steering aid for an agricultural implement, based on an electronic map and Real Time Kinematic DGPS", Computers and Electronics in Agriculture, 24(3), (Dec. 1999), 153-163.
Van Zuydam, R. P, "Centimeter-Precision Guidance of Agricultural Implements in the Open Field by Means of Real Time Kinematic DGPS", Proceedings of the Fourth International Conference on Precision Agriculture, (1999), 1023-1034.
"Agrifac Pulse-width modulation (PWM) spraying", (c) 2021 Agrifac Machinery B.V. [online]. [archived Jan. 16, 2021]. Retrieved from the Internet: <URL: https://web.archive.org/web/20210116150413/https://www.agrifac.com/optional-spray-technology/strictsprayplus/>, (Jan. 16, 2021), 15 pgs.

"U.S. Appl. No. 13/832,735, Final Office Action mailed Aug. 5, 2016", 29 pgs.
"U.S. Appl. No. 13/832,735, Non Final Office Action mailed Feb. 19, 2016", 26 pgs.
"U.S. Appl. No. 13/832,735, Non Final Office Action mailed Jul. 15, 2015", 22 pgs.
"U.S. Appl. No. 13/832,735, Response filed May 19, 2016 to Non Final Office Action mailed Feb. 19, 2016", 13 pgs.
"U.S. Appl. No. 13/832,735, Response filed Nov. 16, 2015 to Non-Final Office Action mailed Jul. 15, 2015", 16 pgs.
"U.S. Appl. No. 16/476,016, Examiner Interview Summary mailed Oct. 4, 2022", 2 pgs.
"U.S. Appl. No. 16/476,016, Final Office Action mailed Nov. 15, 2022", 20 pgs.
"U.S. Appl. No. 16/476,016, Response filed Oct. 24, 2022 to Non Final Office Action mailed Jun. 24, 2022", 22 pgs.
"U.S. Appl. No. 16/476,069, Examiner Interview Summary mailed Mar. 18, 2022", 2 pgs.
"U.S. Appl. No. 16/476,069, Non Final Office Action mailed Nov. 12, 2021", 13 pgs.
"U.S. Appl. No. 16/476,069, Preliminary Amendment filed Jul. 3, 2019", 13 pgs.
"U.S. Appl. No. 16/476,069, Response filed Apr. 11, 2022 to Non Final Office Action mailed Nov. 12, 2021", 12 pgs.
"U.S. Appl. No. 16/476,069, Response filed Jul. 27, 2021 to Restriction Requirement mailed May 3, 2021", 10 pgs.
"U.S. Appl. No. 16/476,069, Restriction Requirement mailed May 3, 2021", 9 pgs.
"U.S. Appl. No. 17/224,955, Non Final Office Action mailed Mar. 7, 2022", 7 pgs.
"Australian Application Serial No. 2017285727, Response filed Mar. 23, 2020 to First Examination Report mailed May 21, 2019", 10 pgs.
"Brazilian Application Serial No. 1120160085175, Office Action mailed Jan. 18, 2022", (w/ Concise Statement of Relevance), 26 pgs.
"Brazilian Application Serial No. 1120160085175, Office Action mailed Mar. 25, 2020", (w/ English Translation), 6 pgs.
"Brazilian Application Serial No. 1120160085175, Response filed Jul. 27, 2020 to Office Action mailed Mar. 25, 2020", (w/ English Translation of Claims), 102 pgs.
"Brazilian Application Serial No. 1120180747017, Office Action mailed Jul. 22, 2021", (w/ English Translation), 5 pgs.
"Brazilian Application Serial No. 1120180747017, Opinion for non-patenteability (RPI 7.1) mailed Mar. 29, 2022", (w/ English Translation), 18 pgs.
"Brazilian Application Serial No. 1120180747017, Response filed Oct. 20, 2021 to Office Action mailed Jul. 22, 2021", (w/ English Translation of Claims), 14 pgs.
"Brazilian Application Serial No. 1120180747017, Voluntary Amendment filed Jun. 22, 2020", (w/ English Translation), 44 pgs.
"Canadian Application Serial No. 2,877,195, Examiner's Rule 86(2) Report filed Nov. 21, 2022", 3 pgs.
"Canadian Application Serial No. 2,926,448, Examiner's Rule 30(2) Requisition mailed Jul. 23, 2019", 3 pgs.
"Canadian Application Serial No. 2,926,448, Response filed Dec. 11, 2019 to Examiner's Rule 30(2) Requisition mailed Jul. 23, 2019", 4 pgs.
"Canadian Application Serial No. 3,013,670, Examiner's Rule 30(2) Requisition mailed Sep. 11, 2019", 5 pgs.
"Canadian Application Serial No. 3,013,670, Response filed Mar. 11, 2020 to Examiner's Rule 30(2) Requisition mailed Sep. 11, 2019", 68 pgs.
"Canadian Application Serial No. 3,049,391, Office Action mailed Sep. 26, 2022", 4 pgs.
"Canadian Application Serial No. 3,049,421, Office Action mailed Jun. 4, 2021", 3 pgs.
"Canadian Application Serial No. 3,049,421, Office Action mailed Nov. 5, 2020", 3 pgs.
"Canadian Application Serial No. 3,049,421, Office Action mailed Nov. 29, 2021", 4 pgs.
"Canadian Application Serial No. 3,049,421, Response filed Mar. 1, 2021 to Office Action mailed Nov. 5, 2020", 19 pgs.

(56) References Cited

OTHER PUBLICATIONS

"Canadian Application Serial No. 3,049,421, Response filed Mar. 25, 2022 to Office Action mailed Nov. 29, 2021", 18 pgs.
"Canadian Application Serial No. 3,049,421, Response filed Oct. 1, 2021 to Office Action mailed Jun. 4, 2021", 33 pgs.
"European Application Serial No. 18735853.6, Communication Pursuant to Article 94(3) EPC mailed Jun. 18, 2021", 4 pgs.
"European Application Serial No. 18735853.6, Extended European Search Report mailed Jun. 16, 2020", 8 pgs.
"European Application Serial No. 18735853.6, Response filed Jan. 11, 2021 to Extended European Search Report mailed Jun. 16, 2020", 16 pgs.
"European Application Serial No. 18735853.6, Response filed Feb. 24, 2020 to Communiciation pursuant to Rules 161(2) and 162 EPC mailed Aug. 13, 2019", 16 pgs.
"European Application Serial No. 18735853.6, Response filed Oct. 28, 2021 to Communication Pursuant to Article 94(3) EPC mailed Jun. 18, 2021", 17 pgs.
"German Application Serial No. 11 2017 003 084.6, Office Action mailed Feb. 5, 2019", (w/ English Translation), 5 pgs.
"German Application Serial No. 11 2017 003 084.6, Response filed May 8, 2019 to Office Action mailed Feb. 5, 2019", (w/ Concise Statement of Relevance), 17 pgs.
"International Application Serial No. PCT/US2018/012661, International Preliminary Report on Patentability mailed Jul. 18, 2019", 11 pgs.
"International Application Serial No. PCT/US2020/047696, International Preliminary Report on Patentability mailed Apr. 14, 2022", 6 pgs.
"International Application Serial No. PCT/US2021/026252, International Search Report mailed Jun. 15, 2021", 2 pgs.
"International Application Serial No. PCT/US2021/026252, Written Opinion mailed Jun. 15, 2021", 4 pgs.
"International Application Serial No. PCT/US2021/038955, International Search Report mailed Sep. 29, 2021", 2 pgs.
"International Application Serial No. PCT/US2021/038955, Written Opinion mailed Sep. 29, 2021", 5 pgs.
"Wilger 2019-20 Manufacturer's Suggested Retail Price List", (Revised Sep. 1, 2019), 20 pgs.
Madsen, Jesper, et al., "Measurement of droplet size and velocity distributions in sprays using Interferometric Particle Imaging (IPI) and Particle Tracking Velocimetry (PTV)", Proceedings 9th International Conference on Liquid Atomization and Spray Systems—ICLASS 2003, (Jan. 2003), 9 pgs.
"U.S. Appl. No. 16/476,016, Examiner Interview Summary mailed Jan. 27, 2023", 2 pgs.
"U.S. Appl. No. 16/476,016, Non Final Office Action mailed Mar. 28, 2023", 22 pgs.
"U.S. Appl. No. 16/476,016, Response filed Feb. 15, 2023 to Final Office Action mailed Nov. 15, 2022", 24 pgs.
"U.S. Appl. No. 17/161,453, Non Final Office Action mailed Mar. 15, 2023", 17 pgs.
"Australian Application Serial No. 2020357581, First Examination Report mailed Feb. 2, 2023", 2 pgs.
"Australian Application Serial No. 2021209314, First Examination Report mailed Jan. 9, 2023", 5 pgs.
"Canadian Application Serial No. 2,877,195, Office Action mailed Jun. 5, 2023", 3 pgs.
"Canadian Application Serial No. 2,877,195, Response filed Mar. 20, 2023 to Examiner's Rule 86(2) Report filed Nov. 21, 2022", 7 pgs.
"Canadian Application Serial No. 3,049,391, Response filed Jan. 20, 2023 to Office Action mailed Sep. 26, 2022", 7 pgs.
"Canadian Application Serial No. 3153465, Examiners Rule 86(2) Report mailed Jan. 13, 2023", 3 pgs.
"Canadian Application Serial No. 3153465, Response filed May 1, 2023 to Examiners Rule 86(2) Report mailed Jan. 13, 2023", 2 pgs.
"Electrostatic Dispersal Solutions", https://web.archive.org/web/20170928035648/https://www.4rysprays.com/, (Captured on Sep. 28, 2017), 6 pgs.

"European Application Serial No. 18736496.3, Communication Pursuant to Article 94(3) EPC mailed Mar. 24, 2023", 10 pgs.
"European Application Serial No. 20872967.3, Response to Communication Pursuant to Rules 161 and 162 EPC filed Nov. 17, 2022", 9 pgs.
"U.S. Appl. No. 17/161,453, Response filed Jun. 15, 2023 to Non Final Office Action mailed Mar. 15, 2023", 15 pgs.
"U.S. Appl. No. 16/476,016, Response filed Jun. 28, 2023 to Non Final Office Action mailed Mar. 28, 2023", 23 pgs.
"U.S. Appl. No. 16/476,016, Examiner Interview Summary mailed Jun. 29, 2023", 2 pgs.
"Canadian Application Serial No. 3,049,391, Examiners Rule 86(2) Report mailed Jul. 6, 2023", 5 pgs.
"Australian Application Serial No. 2021209314, Response filed Jul. 6, 2023 to First Examination Report mailed Jan. 9, 2023", 10 pgs.
"U.S. Appl. No. 16/476,016, Final Office Action mailed Jul. 20, 2023", 21 pgs.
"U.S. Appl. No. 17/410,852, Non Final Office Action mailed Aug. 1, 2023", 9 pgs.
"European Application Serial No. 18736496.3, Response filed Aug. 3, 2023 to Communication Pursuant to Article 94(3) EPC mailed Mar. 24, 2023", 10 pgs.
"U.S. Appl. No. 17/161,453, Final Office Action mailed Sep. 7, 2023", 7 pgs.
"European Application Serial No. 20872967.3, Extended European Search Report mailed Sep. 29, 2023", 9 pgs.
"Canadian Application Serial No. 2,877,195, Response filed Oct. 4, 2023 to Office Action mailed Jun. 5, 2023", 7 pgs.
"U.S. Appl. No. 17/465,644, Restriction Requirement mailed Oct. 13, 2023", 6 pgs.
"U.S. Appl. No. 16/476,016, Response filed Oct. 24, 2023 to Final Office Action mailed Jul. 20, 2023", 21 pgs.
"U.S. Appl. No. 17/410,852, Response filed Nov. 1, 2023 to Non Final Office Action mailed Aug. 1, 2023", 15 pgs.
"U.S. Appl. No. 16/476,016, Advisory Action mailed Nov. 3, 2023", 3 pgs.
"Canadian Application Serial No. 3,049,391, Response filed Nov. 2, 2023 to Examiners Rule 86(2) Report mailed Jul. 6, 2023", 7 pgs.
"U.S. Appl. No. 17/161,453, Response filed Nov. 7, 2023 to Final Office Action mailed Sep. 7, 2023", 8 pgs.
"U.S. Appl. No. 17/410,852, Final Office Action mailed Nov. 14, 2023", 8 pgs.
"U.S. Appl. No. 16/476,016, Pre-Appeal Brief Request filed Nov. 20, 2023", 5 pgs.
"U.S. Appl. No. 17/161,453, Notice of Allowance mailed Nov. 22, 2023", 5 pgs.
"U.S. Appl. No. 17/465,644, Response filed Dec. 13, 2023 to Restriction Requirement mailed Oct. 13, 2023", 11 pgs.
"European Application Serial No. 18736496.3, Communication Pursuant to Article 94(3) EPC mailed Dec. 12, 2023", 13 pgs.
"U.S. Appl. No. 16/476,016, Decision on Pre-Appeal Brief Request mailed Dec. 18, 2023", 2 pgs.
"U.S. Appl. No. 16/476,016, Examiner Interview Summary mailed Jan. 16, 2024", 2 pgs.
"U.S. Appl. No. 16/476,016, Notice of Allowance mailed Feb. 14, 2024", 8 pgs.
"U.S. Appl. No. 17/410,852, Response filed Feb. 14, 2024 to Final Office Action mailed Nov. 14, 2023", 10 pgs.
"U.S. Appl. No. 17/161,453, Corrected Notice of Allowability mailed Feb. 23, 2024", 3 pgs.
"U.S. Appl. No. 16/476,016, Corrected Notice of Allowability mailed Feb. 22, 2024", 3 pgs.
"U.S. Appl. No. 17/410,852, Notice of Allowance mailed Feb. 28, 2024", 5 pgs.
"U.S. Appl. No. 17/161,453, Corrected Notice of Allowability mailed Feb. 29, 2024", 2 pgs.
"U.S. Appl. No. 17/410,852, Corrected Notice of Allowability mailed Mar. 6, 2024", 2 pgs.
"U.S. Appl. No. 17/410,852, Corrected Notice of Allowability mailed Mar. 13, 2024", 2 pgs.
"U.S. Appl. No. 16/476,016, Corrected Notice of Allowability mailed Mar. 13, 2024", 2 pgs.

(56) References Cited

OTHER PUBLICATIONS

"U.S. Appl. No. 17/465,644, Notice of Allowance mailed Mar. 21, 2024", 12 pgs.
"U.S. Appl. No. 16/476,016, Corrected Notice of Allowability mailed Apr. 16, 2024", 2 pgs.
"U.S. Appl. No. 16/476,016, Notice of Allowability mailed May 21, 2024", 3 pgs.
"U.S. Appl. No. 18/669,983, Preliminary Amendment filed May 28, 2024", 3 pgs.
"Brazilian Application Serial No. BR112022006486-1, Office Action mailed Jul. 13, 2024", w English translation, 9 pgs.
"European Application Serial No. 18736496.3, Response filed Jun. 10, 2024 to Communication Pursuant to Article 94(3) EPC mailed Dec. 12, 2023", 13 pgs.
"International Application Serial No. PCT US2024 019793, International Search Report mailed Jun. 27, 2024", 5 pgs.
"International Application Serial No. PCT US2024 019793, Written Opinion mailed Jun. 27, 2024", 10 pgs.
"U.S. Appl. No. 17/465,644, Supplemental Notice of Allowability mailed Jun. 27, 2024", 2 pgs.
"U.S. Appl. No. 17/504,601, Restriction Requirement mailed Jul. 8, 2024", 7 pgs.
"U.S. Appl. No. 17/504,601, Response filed Jul. 22, 2024 to Restriction Requirement mailed Jul. 8, 2024", 14 pgs.
"U.S. Appl. No. 17/504,601, Notice of Non-Compliant Amendment mailed Jul. 29, 2024", 2 pgs.
"U.S. Appl. No. 18/750,201, Preliminary Amendment filed Sep. 5, 2024", 12 pgs.
"U.S. Appl. No. 17/410,852, Corrected Notice of Allowability mailed May 31, 2024", 2 pgs.
"U.S. Appl. No. 18/669,983, Preliminary Amendment filed Jun. 4, 2024", 7 pgs.
"U.S. Appl. No. 17/504,601, Non Final Office Action mailed Sep. 16, 2024", 12 pgs.
"U.S. Appl. No. 17/504,601, Response filed Sep. 11, 2024 to Notice of Non-Compliant Amendment mailed Jul. 29, 2024", 14 pgs.
"Australian Application Serial No. 2023214344, First Examination Report mailed Sep. 9, 2024", 2 pgs.
"International Application Serial No. PCT/US2024/034956, International Search Report mailed Oct. 8, 2024", 5 pgs.
"International Application Serial No. PCT/US2024/034956, Written Opinion mailed Oct. 8, 2024", 8 pgs.
"Brazil Application Serial No. BR112022006486-1, Response filed Oct. 25, 2024 to Office Action mailed Jul. 13, 2024", w English Claims, 227 pgs.
"U.S. Appl. No. 18/669,983, Non Final Office Action mailed Jan. 10, 2025", 12 pgs.
"Australian Application Serial No. 2023258379, First Examination Report mailed Jan. 16, 2025", 4 pgs.
"U.S. Appl. No. 17/504,601, Response filed Feb. 13, 2025 to Non Final Office Action mailed Sep. 16, 2024", 17 pgs.
"U.S. Appl. No. 17/504,601, Final Office Action mailed Mar. 7, 2025", 13 pgs.
"English Translation of WO-2013001948-A1", 23 pgs.
"Australian Application Serial No. 2023258379, Response filed Mar. 13, 2025 to First Examination Report mailed Jan. 16, 2025", 3 pgs.

\* cited by examiner

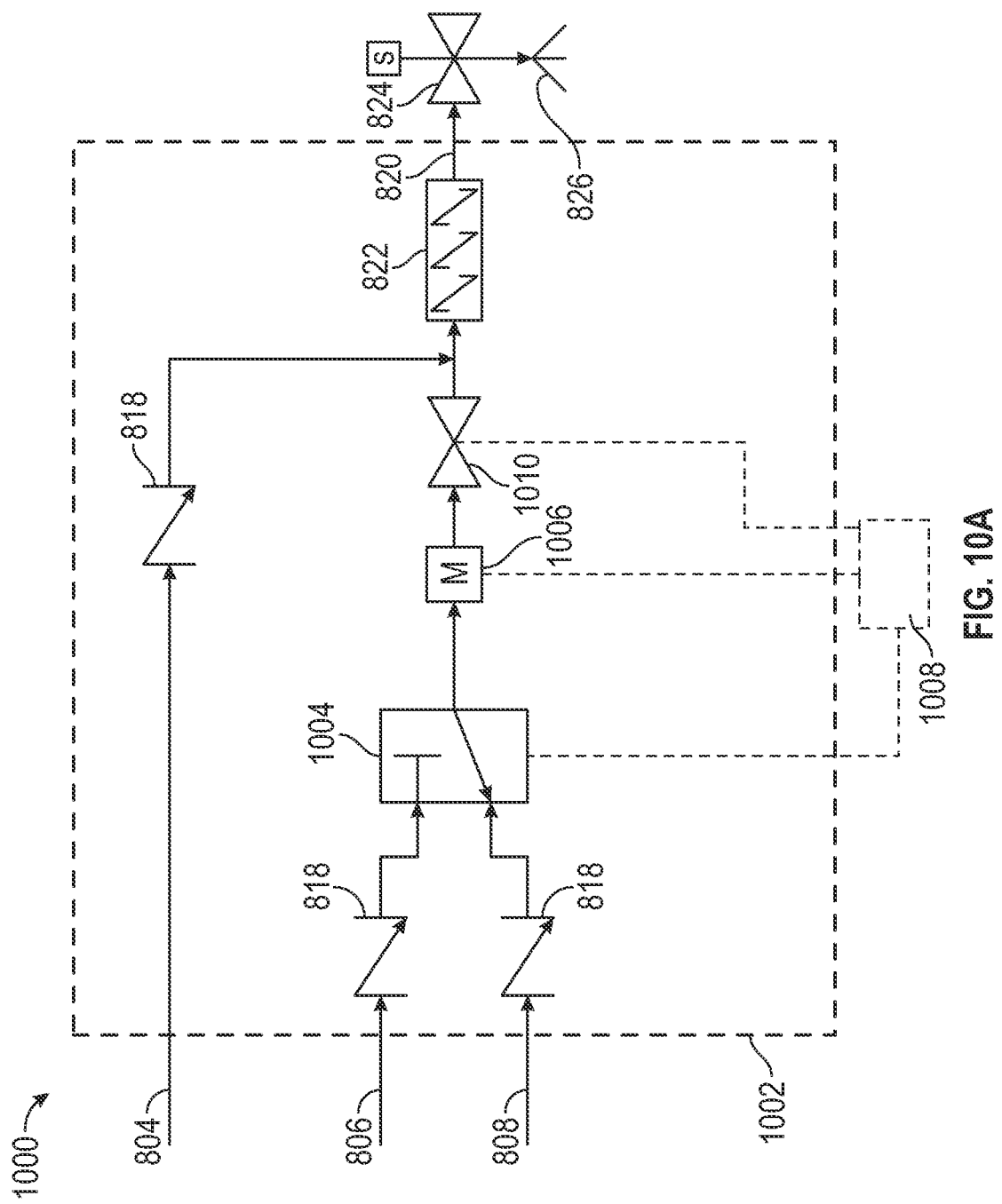

LOCALIZED PRODUCT INJECTION SYSTEM AND METHODS FOR SAME

CROSS-REFERENCE TO RELATED PATENT DOCUMENTS

This patent application is a continuation of U.S. application Ser. No. 16/476,016, filed Jul. 3, 2019, which is a U.S. national stage application filed under 35 U.S.C. § 371 from International Application Serial No. PCT/US2018/012590, which was filed 5 Jan. 2018, and published as WO2018/129323 on 12 Jul. 2018, and which claims the benefit of priority of Kocer et al., U.S. Provisional Patent Application Ser. No. 62/442,897 entitled "LOCALIZED PRODUCT INJECTION SYSTEM," filed on Jan. 5, 2017, which applications are hereby incorporated by reference herein in their entirety.

This patent application is also related to U.S. application Ser. No. 14/300,761, filed on Jun. 10, 2014, entitled LOCALIZED PRODUCT INJECTION SYSTEM FOR AN AGRICULTURAL SPRAYER; incorporated herein by reference.

This patent application is also related to U.S. application Ser. No. 13/832,735 filed on Mar. 15, 2013, entitled MULTI-SECTION APPLICATOR WITH VARIABLE-RATE SECTIONS; incorporated herein by reference.

This patent application is also related to U.S. application Ser. No. 13/832,678 filed on Mar. 15, 2013, entitled REAL TIME INJECTION FOR AGRICULTURAL SPRAYERS; incorporated herein by reference.

This patent application is also related to U.S. Application Ser. No. 61/803,942 filed on Mar. 21, 2013, entitled GEAR FLOW DIVIDER FOR AGRICULTURAL PRODUCT INJECTION; incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, South Dakota, USA. All Rights Reserved.

TECHNICAL FIELD

This document pertains generally, but not by way of limitation, to the application of products (granular, fluid or gaseous) and supplementing of the products.

BACKGROUND

Agricultural sprayers are used to distribute agricultural products, such as fertilizers, insecticides, herbicides and fungicides to crops. Agricultural sprayers include one or more distribution booms that are long enough (e.g., 60 feet to 150 feet) to spray multiple rows of crops in a single pass. Agricultural fields are often irregular in shape and contain one or more of contour changes, tree lines, hillsides, ponds or streams. Irregular field shapes and contour changes provide challenges in even distribution of agricultural products and can lead to waste of agricultural products. Additionally, the configuration of the agricultural sprayer itself may cause unpredictable variation in application of agricultural products.

Agricultural sprayers include a reservoir for a carrier substance. The reservoir is in communication, by way of a header tube or pipe, with a plurality of sections provided along one or more carrier booms (e.g., boom tubes). The header is the main line extending between the reservoir and the carrier booms. Each of the plurality of sections includes multiple sprayer nozzles that distribute the carrier substance received by the section. The carrier substance is used as a vehicle to carry and distribute one or more injection products dispersed into the carrier substance, for instance herbicides, pesticides, fertilizers or the like.

In one example, the injection product is retained in a reservoir separate from the reservoir for the carrier substance. The injection product is pumped from the reservoir and delivered from the reservoir to the header of the carrier substance. In some examples, an inline mixer (e.g., a static mixer) mixes the injected chemical with the carrier substance upstream from or within the header. The header then delivers the mixture to the boom tubes, and the mixture is distributed to the sections and finally the nozzles associated with each of the sections.

OVERVIEW

The present inventors have recognized, among other things, that a problem to be solved can include minimizing lag time and latency between the introduction of an injection product to a carrier flow and application (dispensing) of the carrier flow with the proper concentration of the injection product. In an example, the present subject matter can provide a solution to this problem, such as by providing a localized product injection system in communication with a carrier substance distribution system. The localized product injection system communicates with the carrier substance distribution system locally, for instance at the plurality of product dispensers such as one or more of the sprayer sections or the individual sprayer nozzles of the sprayer sections.

In one example, the localized product injection system includes a plurality of localized injection interfaces that maintain a pressurized source of the injection product immediately adjacent to each of the product dispensers and accordingly ready for instantaneous injection to the flow of the carrier substance immediately prior to dispensing through product dispensers. For instance, each of the plurality of localized injection interfaces includes an interface valve and an injection port. Because the interface valve is positioned at the corresponding product dispenser, upon operation of the interface valve the injection product is instantaneously provided through the injection port to the dispenser (e.g., one or more of a sprayer section or sprayer nozzle). In another example, each of the plurality of localized injection interfaces includes a local pump (e.g., for one or more injection products) that pressurizes the injection product immediately adjacent to each of the product dispensers. Accordingly, lag time for delivery and in-line mixing through a header, the boom tubes associated with each carrier boom, and the sections on each carrier boom are eliminated (including eliminated and minimized). Instead, the localized injection interfaces provide a pressurized source of the injection product at the product dispensers that is ready for instantaneous injection (e.g., at the product dispensers) and mixing with the carrier flow immediately prior to dispensing.

This overview is intended to provide an overview of subject matter of the present patent application. It is not intended to provide an exclusive or exhaustive explanation of the invention. The detailed description is included to provide further information about the present patent application.

DETAILED DESCRIPTION

In the drawings, which are not necessarily drawn to scale, like numerals may describe similar components in different views. Like numerals having different letter suffixes may represent different instances of similar components.

The drawings illustrate generally, by way of example, but not by way of limitation, various embodiments discussed in the present document.

Figure 8A:
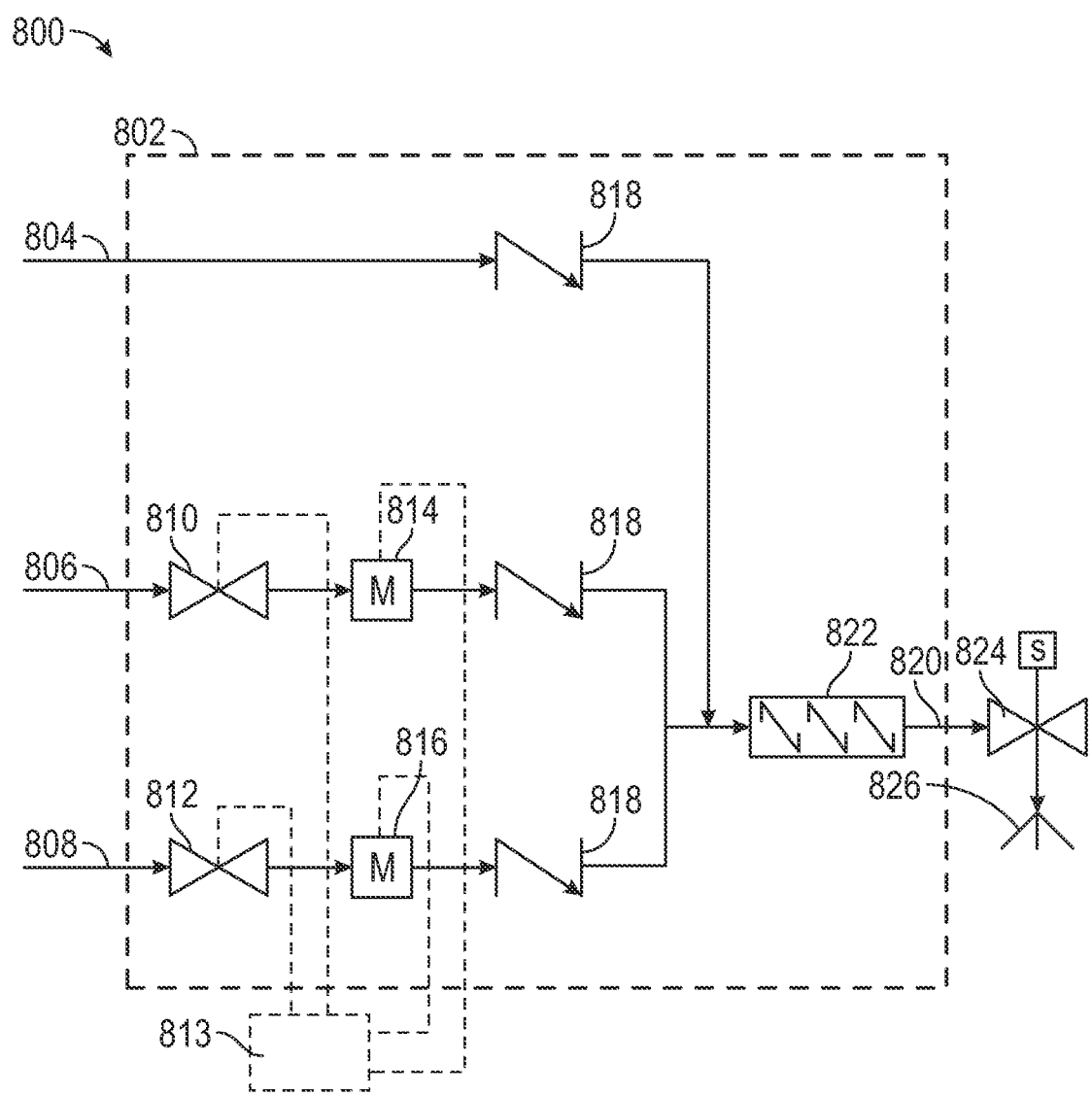
Figure 8B:
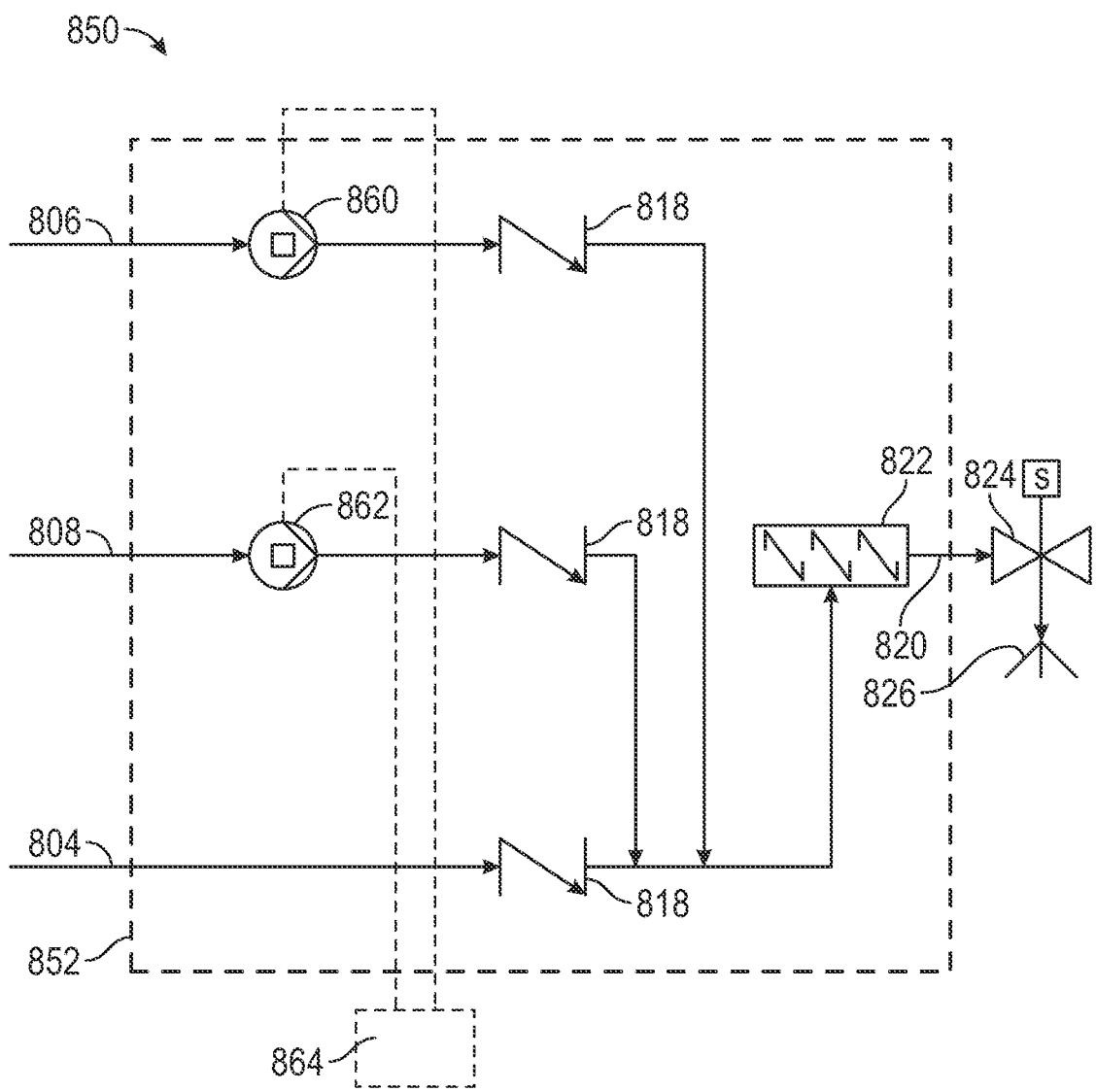

FIGS. 8A-B are schematic views of additional examples of localized injection interfaces in communication with a product dispenser.

Figure 9A:
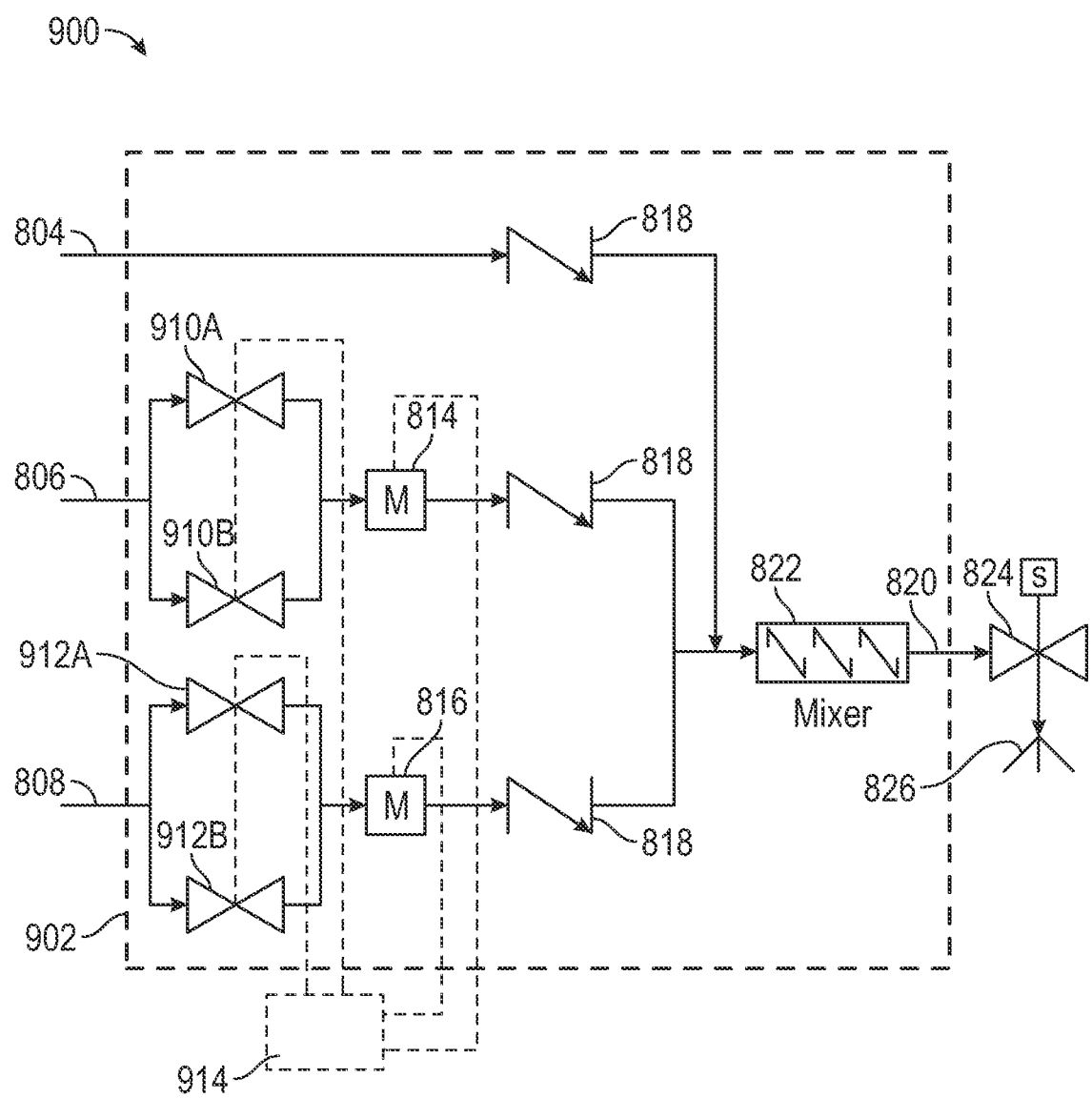
Figure 9B:
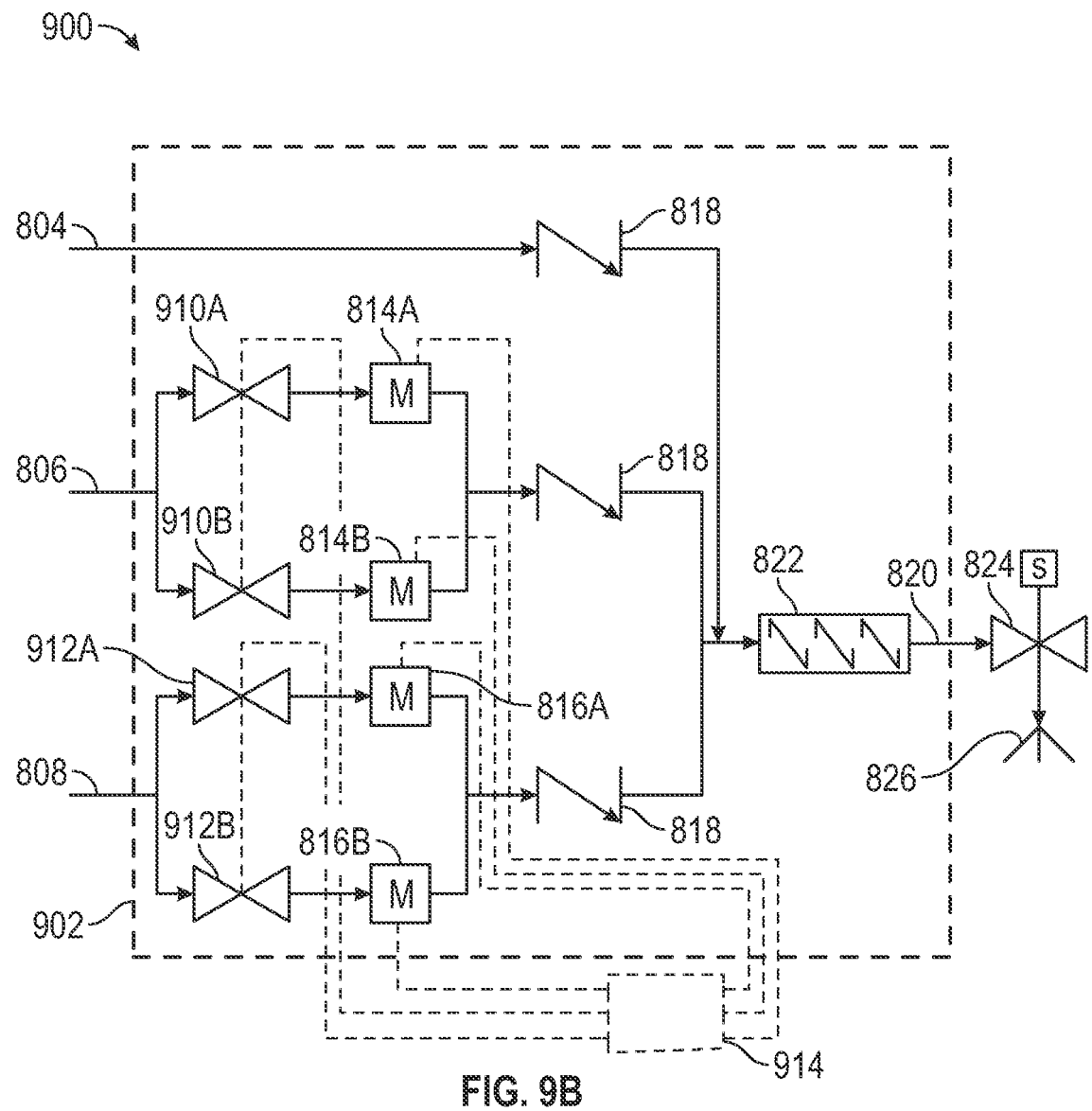
Figure 9C:
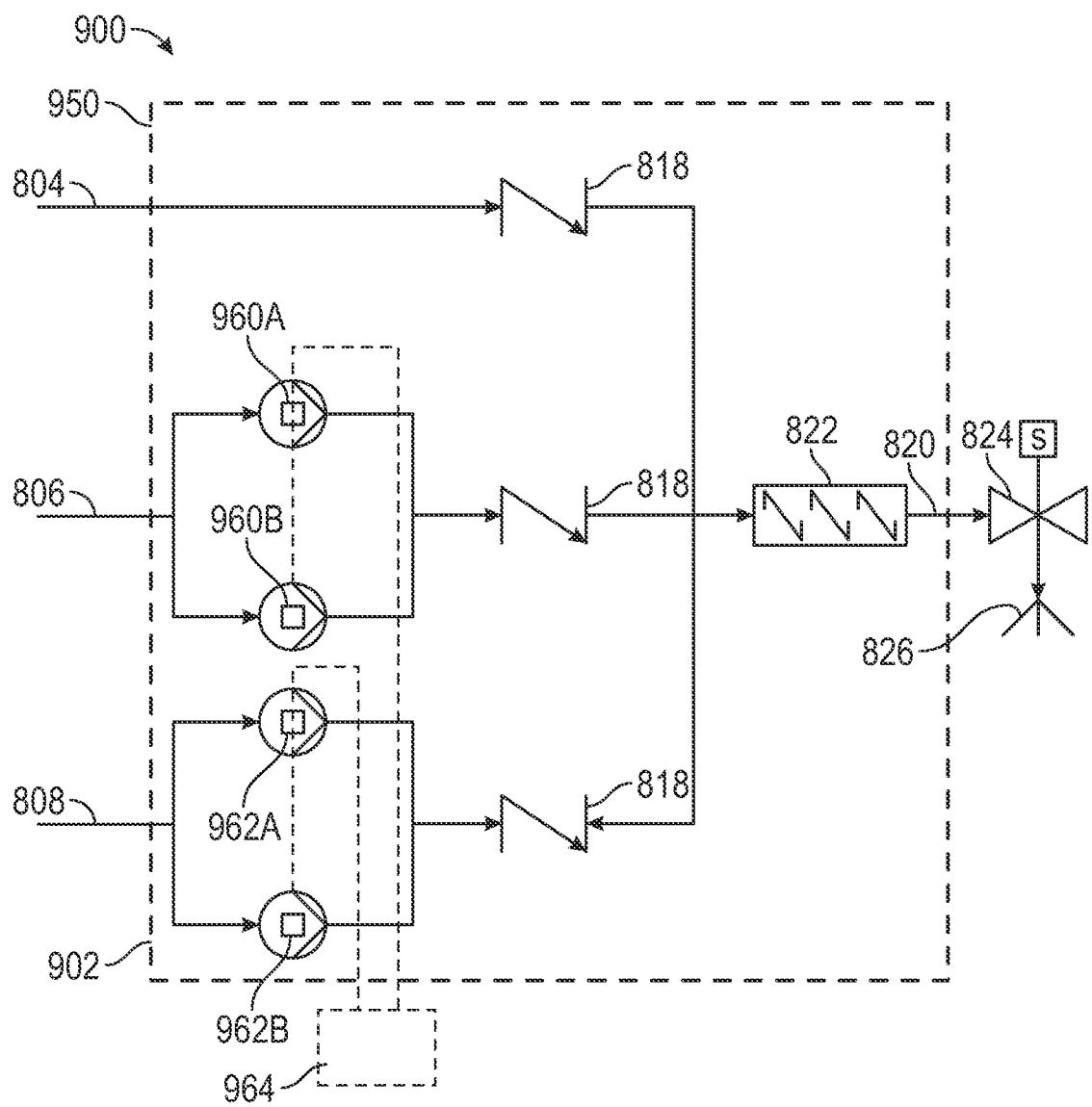

FIGS. 9A-C are schematic views of other examples of localized injection interfaces in communication with a product dispenser.

Figure 10B:
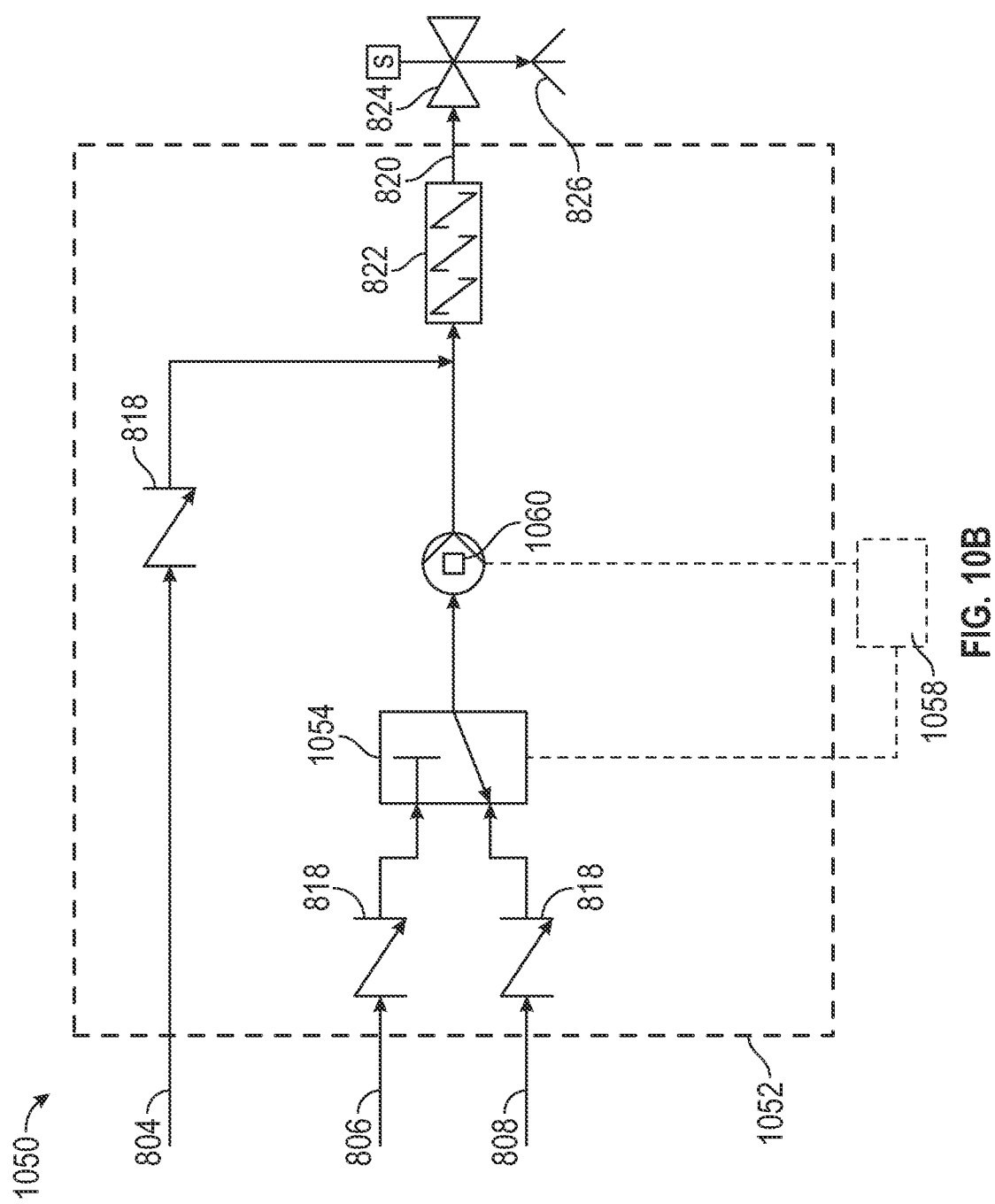

FIGS. 10A-B are schematic views of supplemental examples of localized injection interfaces in communication with a product dispenser.

Figure 11:
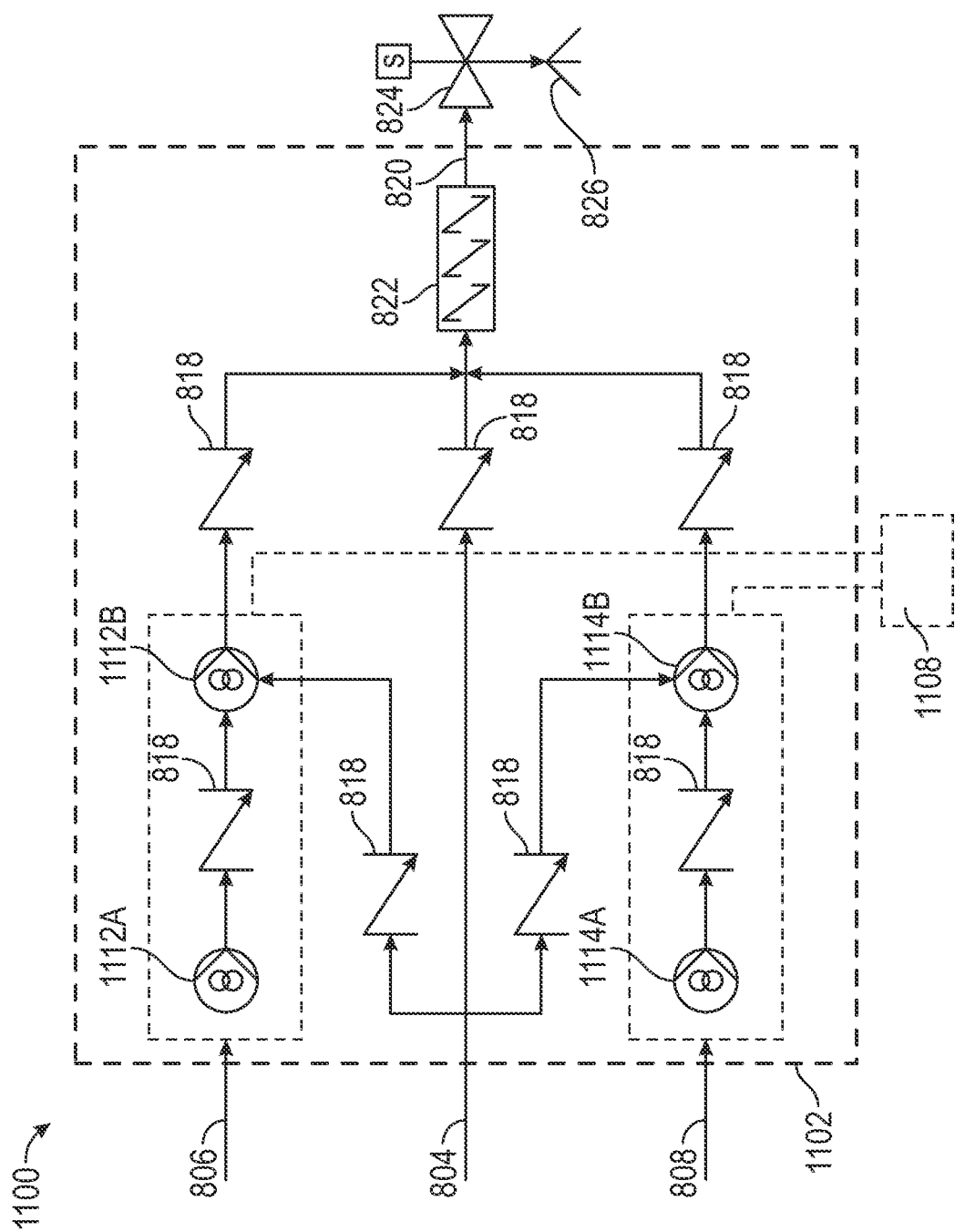

FIG. 11 is a schematic view of one example of a localized injection interface including a gear pump and mixing assembly.

Figure 12:
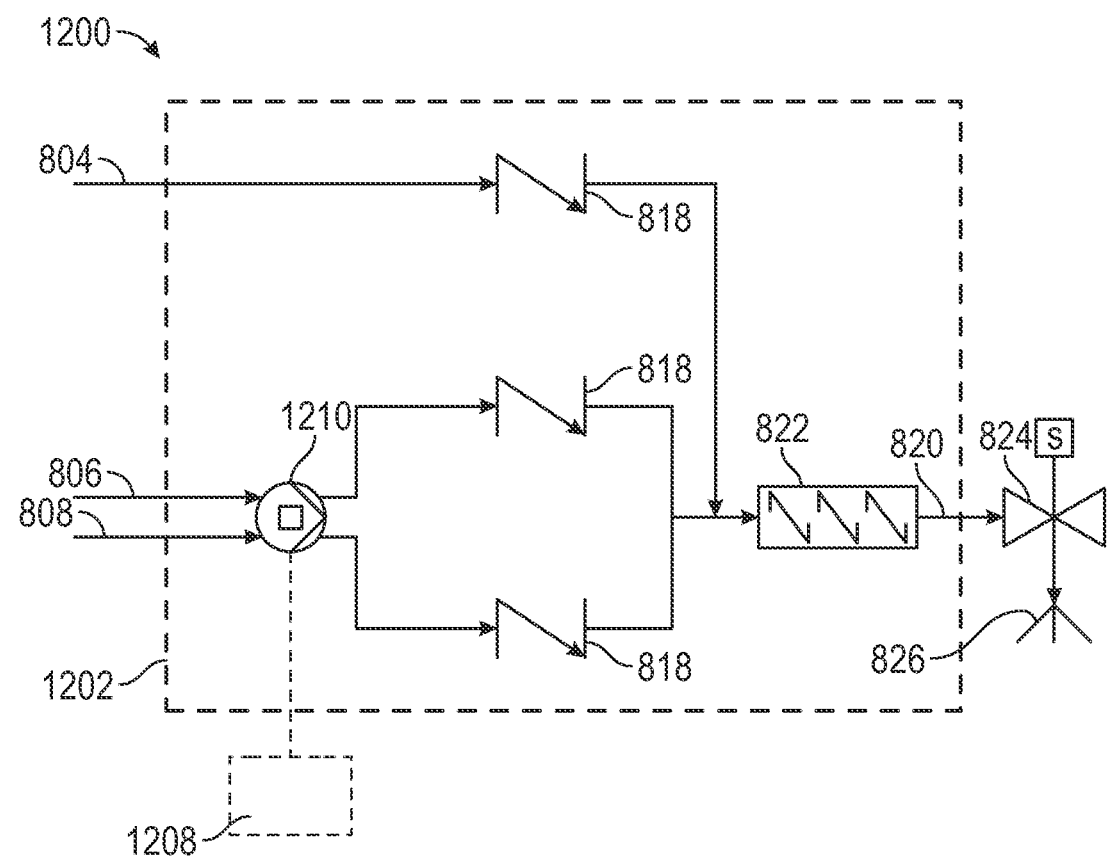

FIG. 12 is a schematic view of one example of a localized injection interface including a multi-flow pump.

Figure 13:
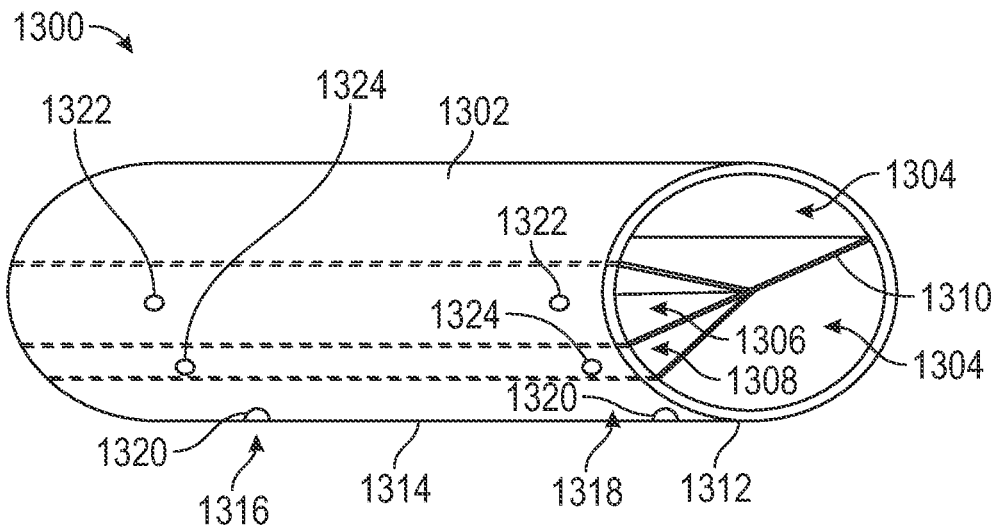

FIG. 13 is a perspective view of one example of a composite boom tube.

Figure 14A:
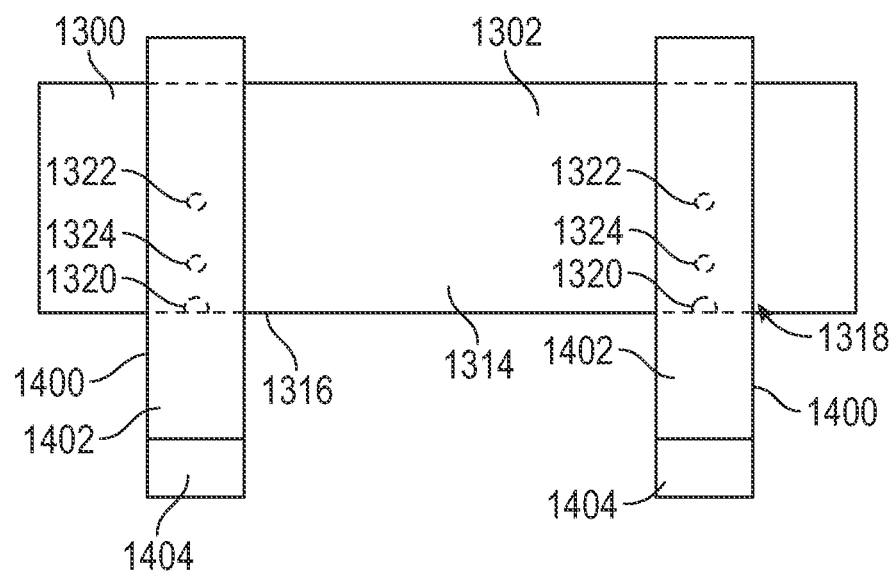

FIG. 14A is a side view of one example of a localized injection interface coupled with the composite boom tube shown in FIG. 13.

Figure 14B:
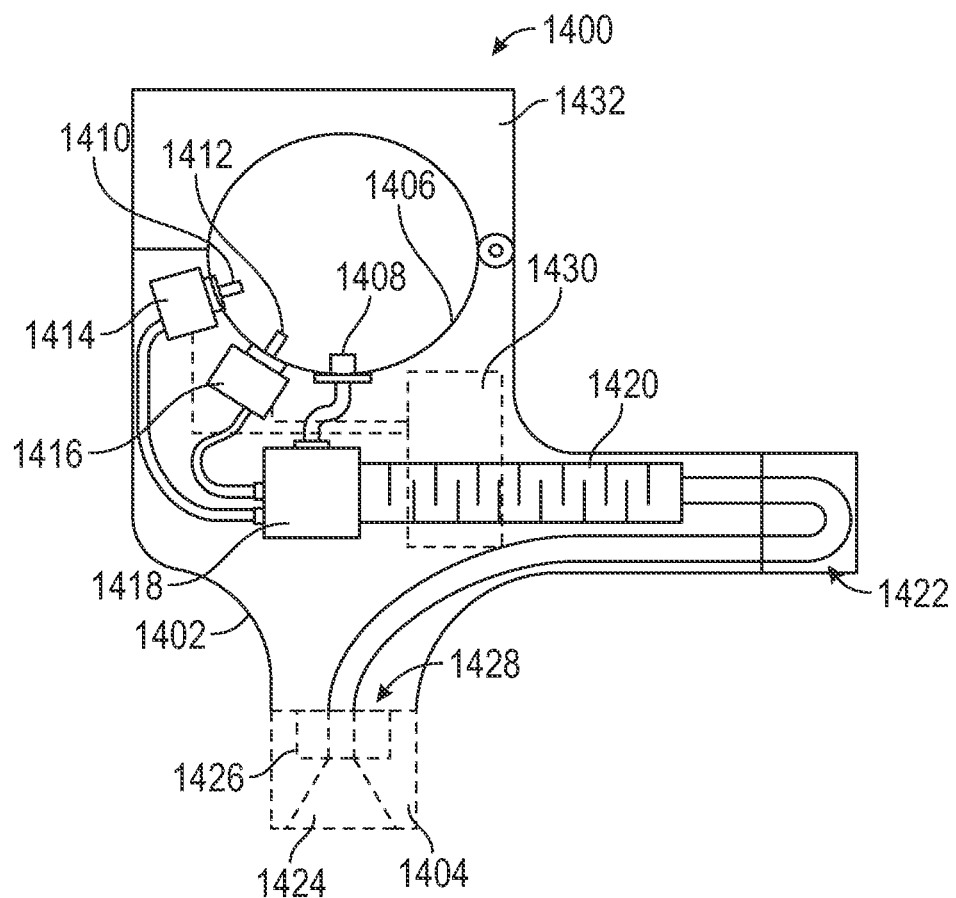

FIG. 14B is a front view of the localized injection interface.

Figure 15:
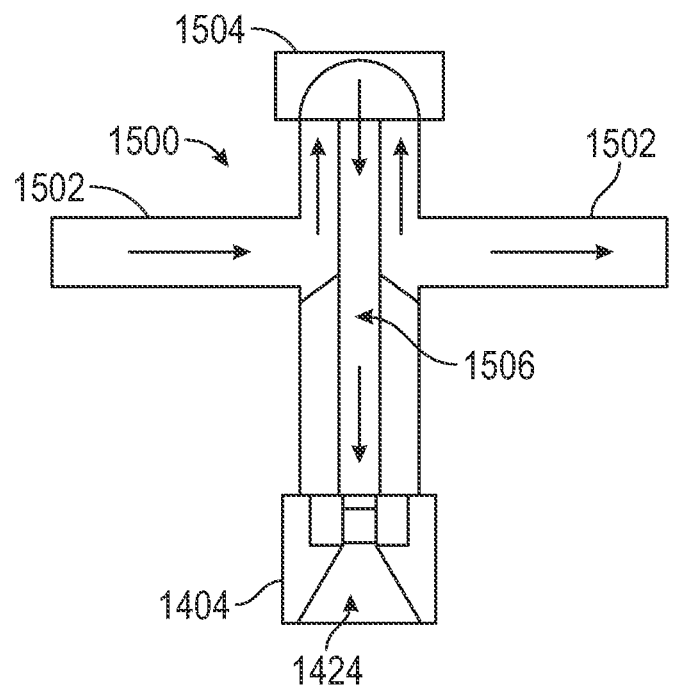

FIG. 15 is a cross sectional view showing one example of a nozzle assembly.

Figure 16:
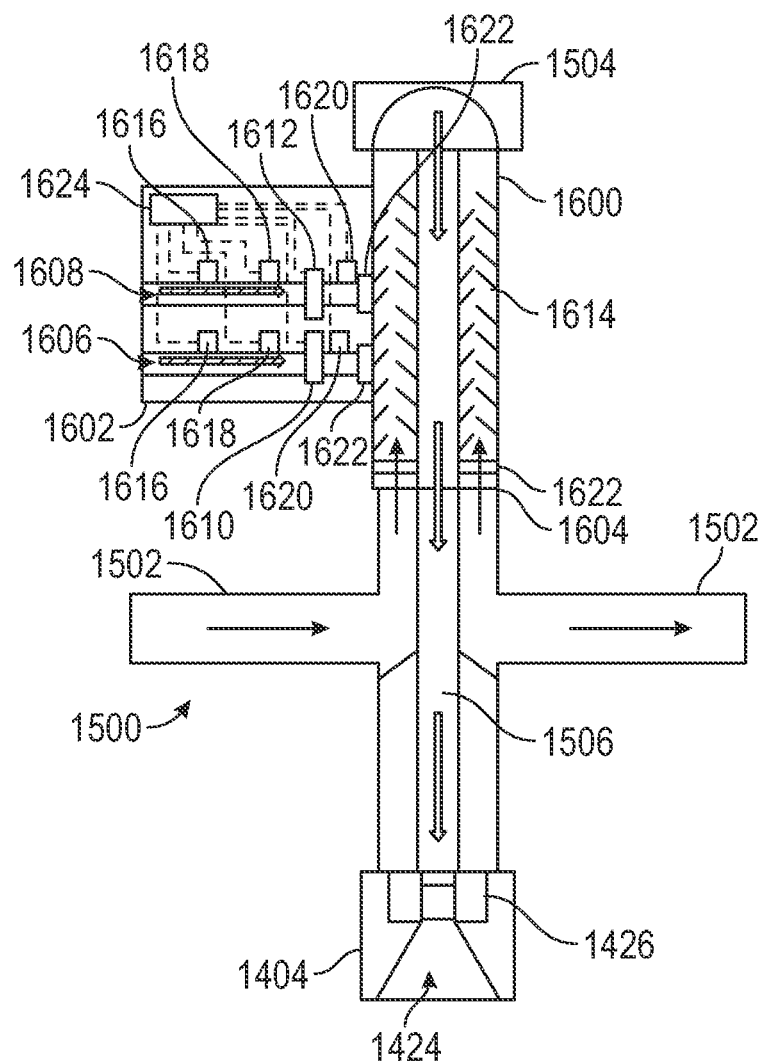

FIG. 16 is a cross sectional view of an example localized injection interface installed with the nozzle assembly shown in FIG. 15.

Figure 17:
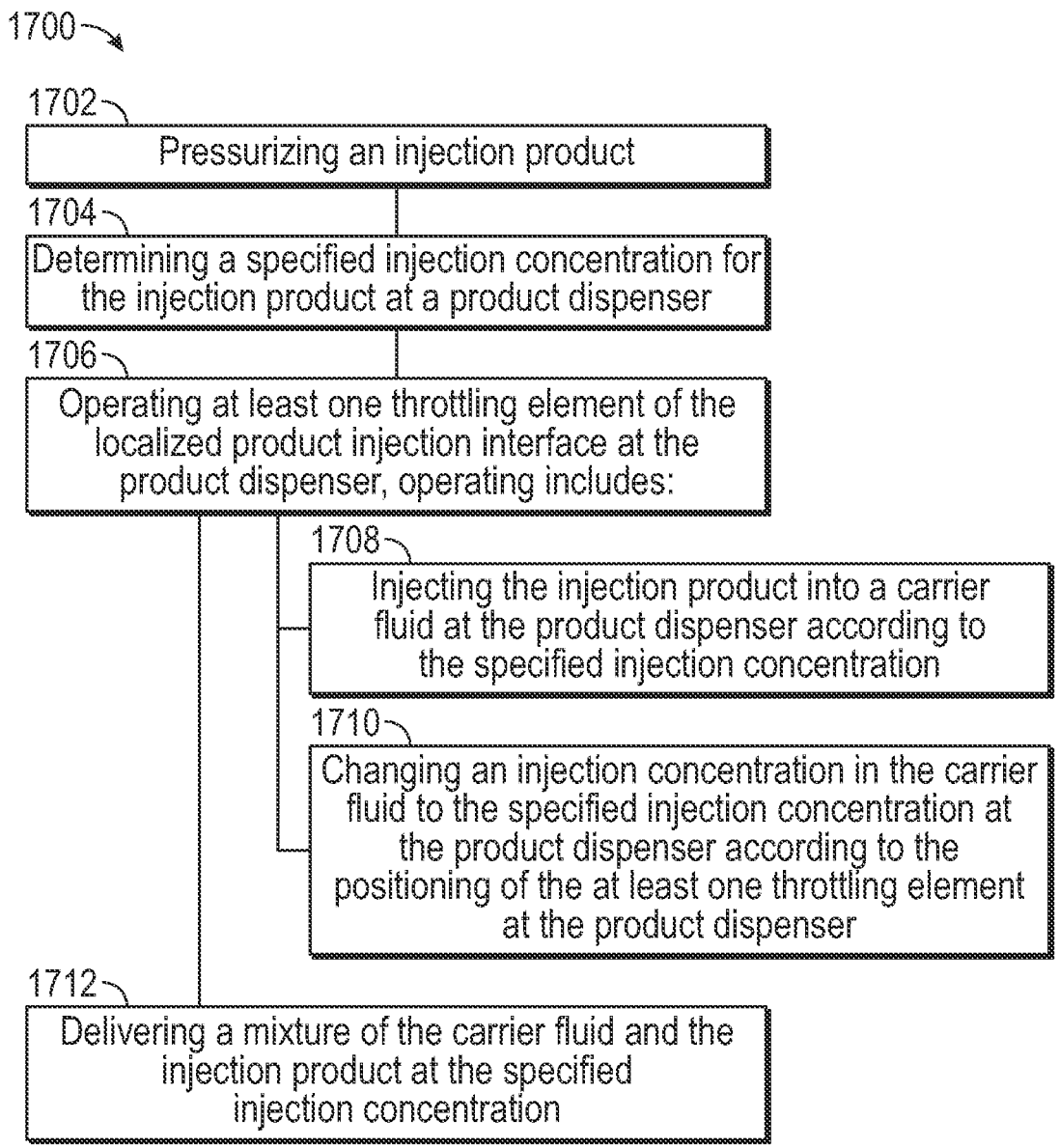

FIG. 17 is a block diagram showing one example of a method for using a localized product injection interface.

DETAILED DESCRIPTION

Figure 1A:
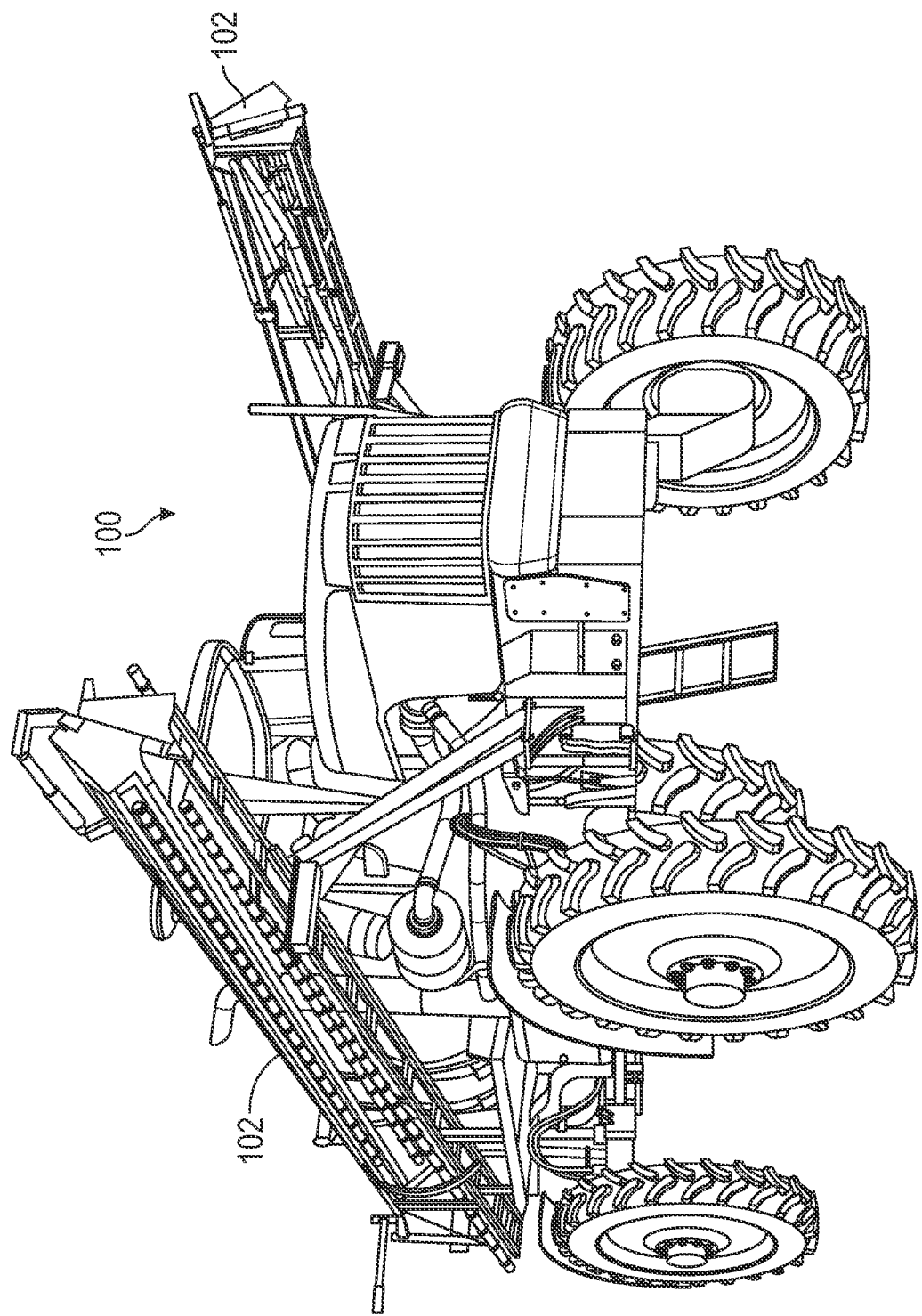
FIG. 1A is a perspective view of one example of an agricultural sprayer.

FIG. 1A shows one example of a sprayer 100. As shown, sprayer 100 is a vehicle based sprayer including an agricultural product dispensing system carried by the vehicle. In another example, the sprayer 100 includes, but is not limited to, a trailer housed sprayer configured for coupling with a vehicle, such as a tractor or the like. As shown in FIG. 1A, the sprayer 100 includes at least two sprayer booms 102. The sprayer booms 102 shown in FIG. 1A are in a stowed configuration, for instance during transport of the sprayer 100 into a field. The sprayer is configured to apply one or more agricultural products including, but not limited to, fertilizers, herbicides, pesticides or the like. The sprayer 100 applies the agricultural product in a liquid form, for instance through one or more nozzle assemblies positioned along the sprayer boom 102 according to the spacing of rows of agricultural crops. As will be described herein, the sprayer 100 applies the agricultural product by mixing an injection product with a carrier fluid to achieve a desired concentration of the injection product (a fertilizer, herbicide, pesticide or the like) within the carrier fluid. In another example, the injection product includes a plurality of injection products, for instance injected separately by way of differing injection systems or injected as a common mixture of fluids (e.g., from a mixed injection reservoir) into the product dispensers including one or more of the boom sections and nozzle assemblies of the sprayer booms 102.

As will be described herein, an agricultural product is provided in a localized manner to each of the product dispensers whether boom sections or nozzles to provide individualized control of application of the agricultural product. Further, the instantaneous injection of the injection product locally to the carrier fluid stream prior to the product dispensers (boom sections, nozzle assemblies or the like) ensures lag time between a desired change in concentration of the injection product and the corresponding application of the adjusted agricultural product is minimized (e.g., negligible lag time or allows for near instant injection and dispensing of the resulting agricultural product). In contrast, other systems mix the injection product upstream from the product dispensers, for instance within the carrier fluid reservoir or at an interchange near a header pump for the carrier fluid. These systems have lag between the interchange and the product dispensers and further preclude the individualized control of the agricultural product (e.g., injection concentration) at the product dispensers. Stated another way, a localized product injection system as described herein provides a pressurized environment for the injection product at the one or more product dispensers (e.g., locally) for instance the boom sections, nozzles, nozzle assemblies or the like. Accordingly, the injection product is provided under pressure to the carrier fluid at the product dispensers immediately prior to application to an agricultural crop.

Figure 1B:
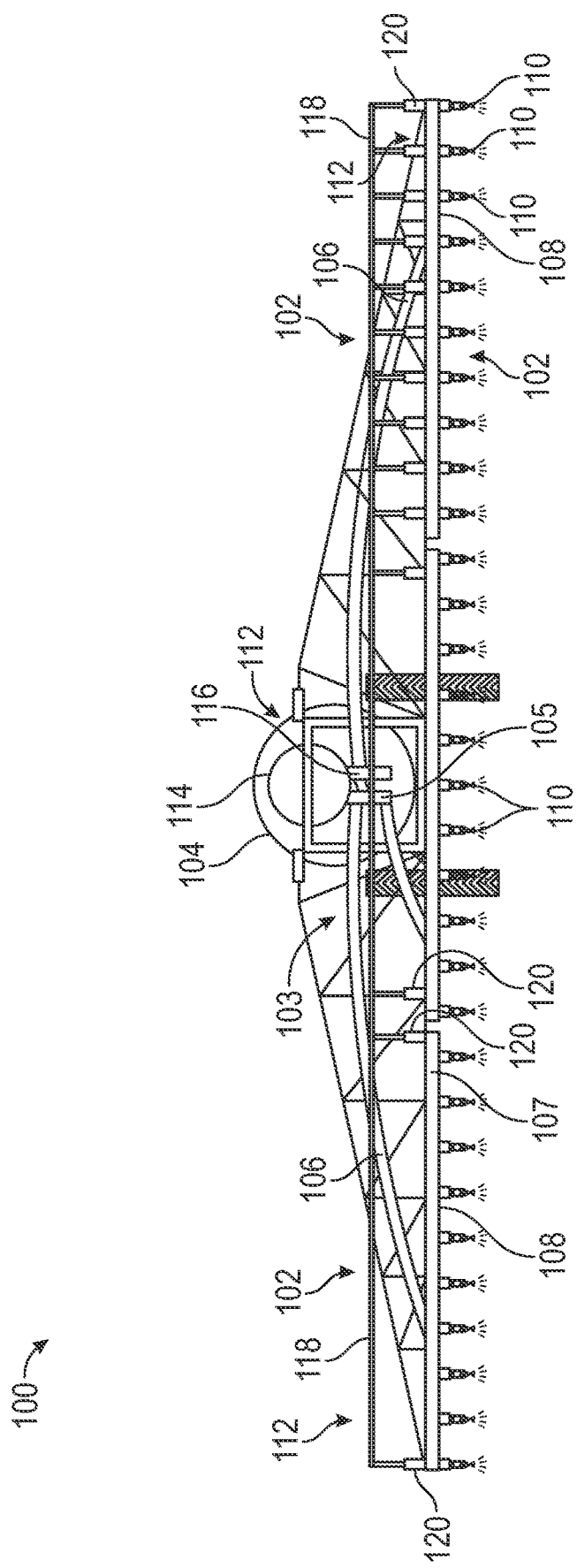
FIG. 1B is a schematic view of one example of an agricultural sprayer including a localized product injection system.

Referring now to FIG. 1B, a schematic representation of the sprayer 100 shown in FIG. 1A is provided. In this example the sprayer booms 102 are in a deployed configuration, for instance extending away from the vehicle 100 shown in FIG. 1A. As shown, the sprayer 100 includes a carrier system 103 including a carrier reservoir 104 positioned centrally within the vehicle or tender. The carrier reservoir 104 includes a carrier fluid therein, for instance water or the like. In another example, the carrier reservoir 104 includes a carrier fluid such as water mixed with an initial carrier product (e.g., a mixed carrier formulation). The carrier fluid in such an example includes, but is not limited to, a primary fertilizer, a primary chemical or water base and fertilizer mixture, spray adjuvant, surfactant or the like.

The carrier fluid is distributed from the carrier reservoir by way of a header 105 coupled with one or more boom tubes 106. The boom tubes 106 extend along the sprayer booms 102 as shown in FIG. 1B and correspondingly transport the carrier fluid the length of the sprayer booms. As further shown in FIG. 1B, the boom tubes 106 are in communication with one or more corresponding boom sections 108. The boom sections 108 are positioned along the sprayer booms 102 and each provide a plurality of nozzle assemblies 110. As will be described herein, the product dispensers 107 include, but are not limited to, one or more of the boom sections 108, the nozzle assemblies 110 or a combination of both. Carrier fluid is accordingly distributed from the carrier reservoir 104 through the header 105 into the boom tubes 106. The carrier fluid is then carried from the boom tubes 106 to one or more boom sections 108 and the associated nozzle assemblies 110 for application of the carrier fluid (mixed with the injection product as described herein) to the agricultural crops.

The localized product injection system 112 is also shown schematically in two different formats in FIG. 1B. In each of the formats the localized product injection system 112 includes an injection product input, such as an injection product reservoir 114, separate from the carrier reservoir 104. The injection product reservoir 114 includes a volume of the injection product therein (concentrated fertilizer, herbicide, pesticide or the like). The injection product reservoir 114 feeds into an injection header 116 which is in communication with one or more injection boom tubes 118 extending along the sprayer booms 102.

In one example, shown in FIG. 1B the injection boom tubes 118 are coupled with the product dispensers 107 (the boom sections 108) by one or more injection interfaces 120. For instance at the left side of FIG. 1B the injection interfaces 120 are provided at opposed ends of the boom section 108. In another example, the injection interfaces 120 are provided at a single or multiple locations along the boom section 108. The injection product is distributed to the boom section 108 through the injection interfaces 120. As will be described herein in one example the injection interfaces 120 include at least one throttling element, such as a control valve or pump configured to vary the flow of the injection product into the product dispenser 107 (in this case the boom section 108) for mixing with the carrier fluid prior to application. Additionally, in the examples described herein a reference to a control valve or pump is considered broadly to also include other throttling elements. For instance, the recitation of a pump or control valve each include the other (e.g., control valve or pump).

The second format of the localized product injection system 112 is also shown in the FIG. 1B schematic view. In this example the injection interfaces 120 are coupled with the nozzle assemblies 110 of one or more boom sections 108. For instance, as shown at the right portion of the sprayer 100 the injection interfaces 120 are provided at each of the nozzle assemblies 110. For instance the injection interfaces 120 provide individualized injection of the injection product to each of the nozzle assemblies 110. In contrast to injection to the boom sections 108 and corresponding individualized control of the injection product concentration in the boom sections, the injection interfaces 120 at the nozzle assemblies 110 provide individualized control of the concentration of the injection product at each of the nozzle assemblies 110. Accordingly, the controlled injection of the injection product by the injection interfaces allows for individualized control of the product dispensers, including individualized control of one or more of the boom sections 108 or the nozzle assemblies 110.

As further shown in FIG. 1B, the localized product injection system 112 provides a pressurized environment for the injection product at the injection interfaces 120 (whether the injection interfaces are at the boom section 108 or nozzle assemblies 110). That is to say, the injection product is maintained at a pressure for immediate injection into the carrier fluid of the carrier system 103 at the local injection interfaces 120 immediately prior to application of the resulting agricultural product through the product dispensers 107. Accordingly, there is no appreciable lag time between the injection of the injection product to the carrier fluid and application of the resulting agricultural product (including the carrier fluid and the injection product) to the agricultural crop. Additionally, the injection product is immediately mixed with the carrier fluid to the specified concentration, for instance with a static mixer, by virtue of the jet of the injection product into the carrier fluid stream from the injection interfaces 120 or the like. Specified concentration of the injection product is achieved at the product dispensers 107 according to an individualized concentration determination (e.g., with an automated controller) for each corresponding injection interface 120. Accordingly, the sprayer 100 shown in FIG. 1B including the localized product injection system 112 is able to individually control the content of the agricultural product (for instance the concentration of the injection product within the carrier fluid) at each of the injection interfaces 120 and the corresponding product dispensers 107. In the example where the injection interface 120 incudes a boom section 108 the sprayer 100 is thereby able to control the concentration of the injection product at each of the boom sections 108. In another format where the injection interfaces 120 are associated with each of the nozzle assemblies 110 each of the injection interfaces 120 are individually controlled to accordingly provide a desired concentration of the injection product at each of the nozzle assemblies 110.

The injected product is optionally used as a supplemental chemical with mixed carrier formulations for spot treatment in areas of the field where mixed carrier formulation is not sufficient to achieve the desired results (e.g., control of weeds, pests, or yield). In one prophetic example, an operator applies a primary herbicide (Monsanto brand Roundup®) from the carrier reservoir 104. The herbicide is mixed with water and a spray adjuvant in the carrier reservoir 104 for general application to the field for corresponding general weed control. The operator (or field map) is aware that the primary herbicide alone will not control certain weeds at certain areas of the field (e.g., because of resistance to the primary herbicide) and accordingly indexes locations for specified injections of the injection product. The operator uses a supplemental herbicide as an injection product in the injection product reservoir 114 (such as DuPont brand Assure®) to control weeds in those areas in addition to the mixed carrier formulation. Accordingly and as described herein, when the specified areas of the field are reached by the sprayer (e.g., the corresponding one or more product dispensers 107) the injection product including the supplemental herbicide is injected into the corresponding product dispensers 107 and the areas are sprayed with both primary and secondary herbicides. As the product dispensers move out of the designated areas (e.g., the injection product is no longer specified or specified at a differing concentration) the injection product is injected at a different concentration or shut off from injection to the carrier fluid.

Additionally, the injection product is provided from each of the injection interfaces 120 irrespective of the flow rate of the carrier fluid within the carrier system 103 (e.g., at high or low flow of the carrier fluid). For instance, in a low flow condition only a moderate or small amount of the agricultural product is applied to the agricultural crop corresponding to a low flow of the carrier fluid from carrier system 103. Because of the low flow rate of the carrier fluid in other systems an upstream added injection product has significant residence time and corresponding lag time in the system prior to application at a desired concentration. Stated another way, the lag time already present between addition of the injection product to the carrier fluid at the upstream and its actual application through a product dispenser is increased because of the minimized flow of the carrier fluid. In the sprayer 100 described herein having injection of the injection product locally at the product dispensers 107 the lag time is effectively eliminated (including substantially reduced). Instead, the localized product injection system 112 provides an immediate or instantaneous injection of the injection product at the injection interfaces 120 to the product dispensers 107 immediately prior to the application of the resulting agricultural product.

Figure 2A:
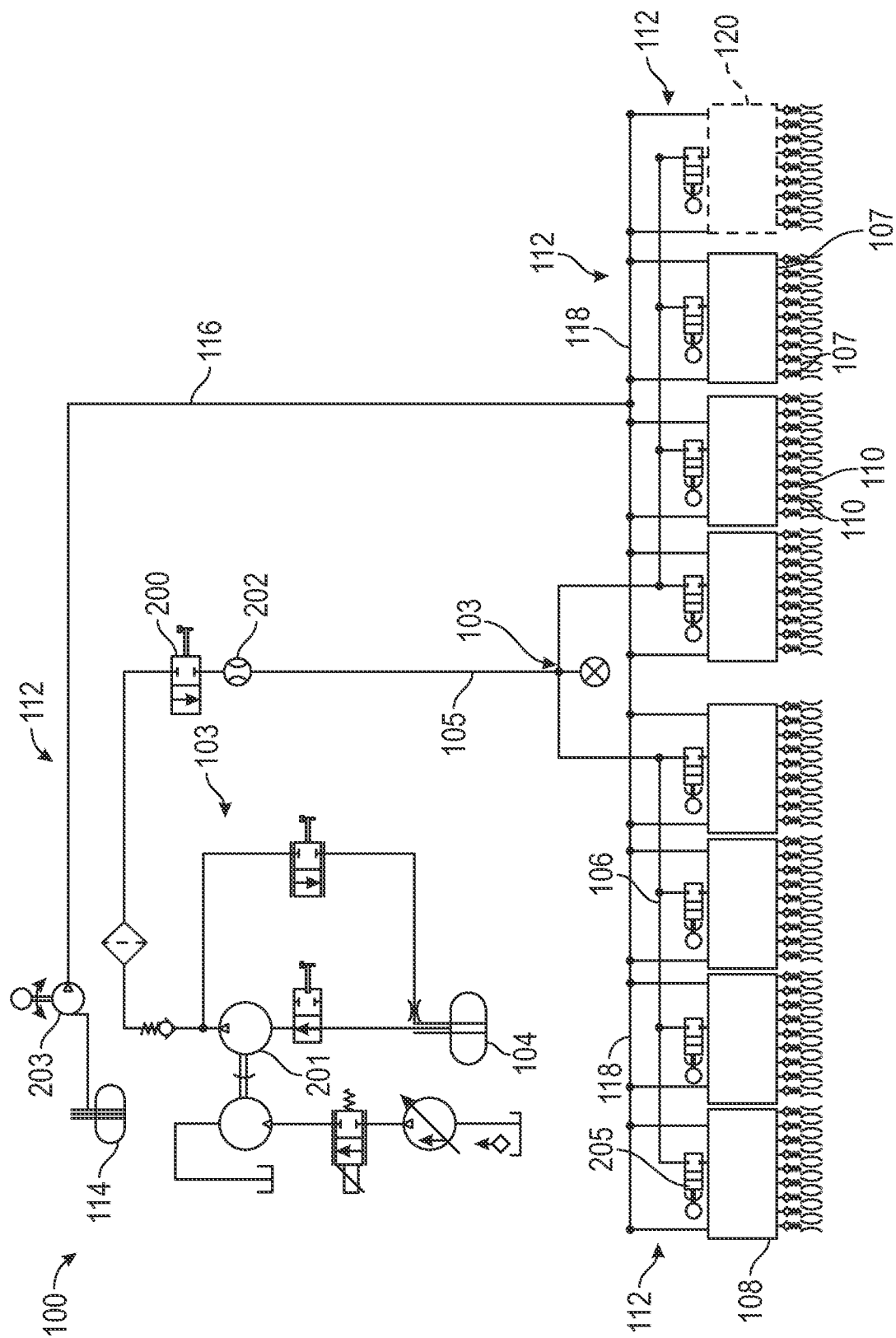
FIG. 2A is a schematic view of an agricultural sprayer including one example of a localized product injection system.

FIG. 2A shows a detailed example of a sprayer 100 including the localized product injection system 112. In the example shown in FIG. 2A the localized product injection system 112 is in the boom section format. For instance, the injection interfaces 120 are coupled with one or more boom sections 108 along the sprayer booms 102 and boom tubes 106 shown in FIG. 1B. The carrier system 103 is shown again in FIG. 2A and includes the carrier reservoir 104. As shown in FIG. 2A the carrier reservoir 104 communicates with the product pump 201 that pressurizes the carrier fluid and delivers it within the header 105 (also shown in FIG. 2A). In one example the carrier system 103 includes a carrier flow control valve 200 and a flow meter 202. The flow meter 202 cooperates with the carrier flow control valve 200 (e.g., with an intervening controller) to measure the output flow from the carrier reservoir 104 (produced by the product pump 201) and to facilitate actuating of the carrier flow control valve 200 to achieve the desired flow rate of carrier fluid to the plurality of boom sections 108 described herein. As further shown in FIG. 2A the header 105 extends to the boom tubes 106 extending to the left and right of the header 105. Each of the boom tubes 106 in turn feeds into a plurality of boom sections 108 and the boom sections 108 each have corresponding nozzle assemblies 110. Optionally, section valves 205 are interposed between each boom section 108 and the corresponding boom tubes 106. The sections valves 205 facilitate control of the carrier fluid flow to each of the boom sections 108.

As described herein and shown in the example provided in FIG. 2A, the product dispensers 107 include the boom sections 108. That is to say, the injection interfaces 120 are coupled with the boom sections 108 and thereby provide individualized control of the injection product to each of the boom sections 108 relative to the other boom sections.

Referring again to FIG. 2A, the localized product injection system 112 previously described and shown in FIG. 1B is shown in further detail. In this example, the injection product reservoir 114 communicates with an injection pump 203. The injection pump 203 delivers the injection fluid from the reservoir 114 to an injection header 116. The injection header 116 delivers the injection product to one or more injection boom tubes 118 extending to the left and right and shown in FIG. 2A. The injection boom tubes 118 distribute the injection product to a plurality of injection interfaces 120. As previously described, the injection interfaces 120 in the example shown in FIG. 2A deliver the injection product directly to each of the product dispensers 107 (e.g., the boom sections 108).

As shown in FIG. 2A the localized product injection system 112 is isolated from the carrier system 103 until localized introduction of the injection product at the injection interfaces 120. Accordingly, the localized product injection system 112 is able to maintain a pressurized environment for the injection product to the injection interfaces 120 (e.g., with the injection pump 203). At the injection interfaces 120 the pressurized injection product is delivered to each of the product dispensers 107 as determined, for instance, by a controller module described herein. Even in low flow situations with a low flow of carrier fluid, metered by the flow meter 202 and the carrier flow control valve 200, the injection product is provided in a pressurized manner and is thereby ready for instantaneous delivery to one or more of the boom sections 108. Accordingly, individualized and instantaneous control of the injection product (e.g., the concentration of the injection product) is achieved for each of the product dispensers 107 including the boom sections 108. The injection product is provided from the injection interfaces 120 locally relative to the boom sections and remote from the upstream carrier reservoir 104.

Figure 2B:
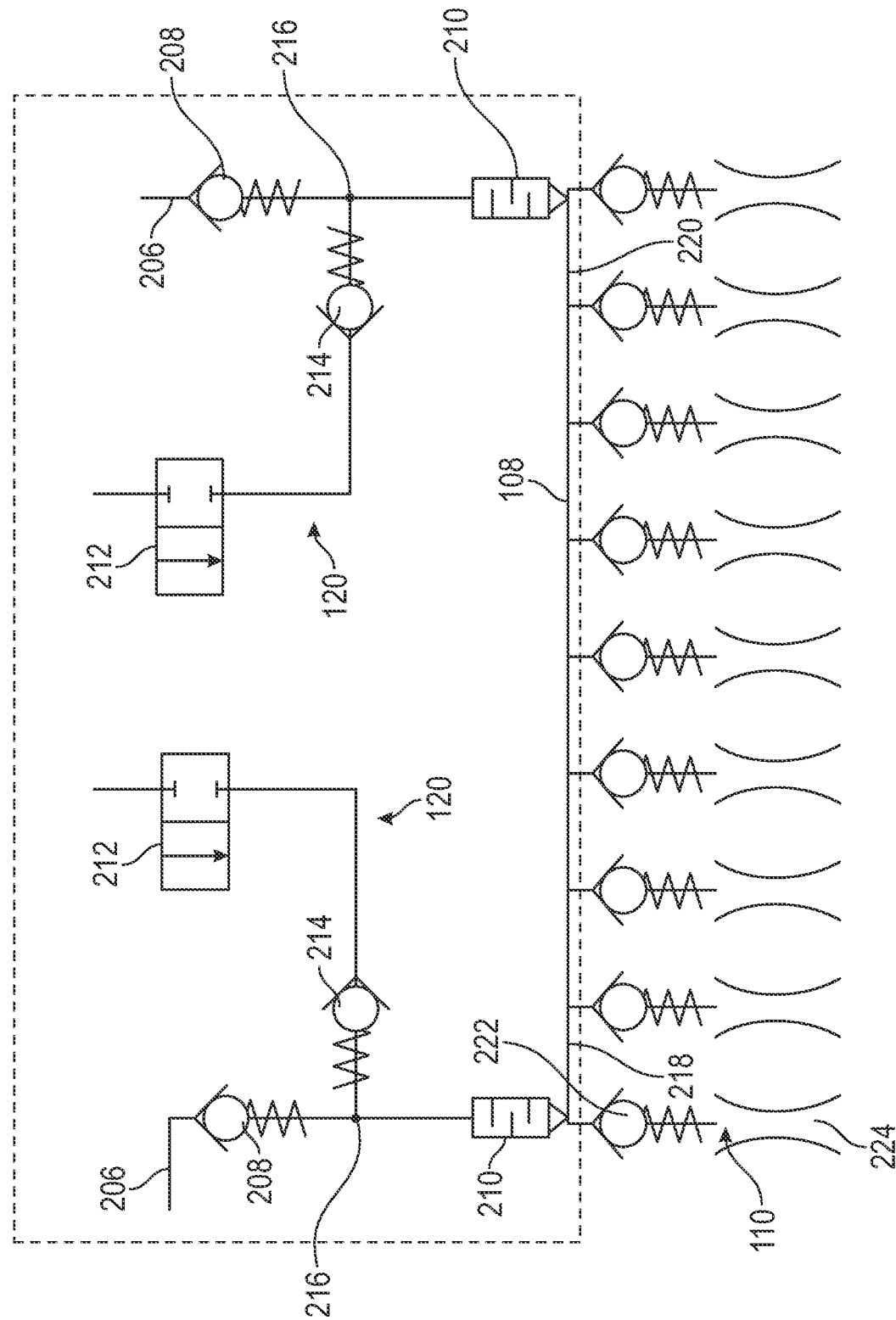
FIG. 2B is a detailed schematic view of one example of a localized injection interface in communication with a sprayer section of FIG. 2A.

Referring now to FIG. 2B, a detailed view of one of the boom sections 108 shown in FIG. 2A is provided. The boom section 108 extends from left to right on the page and includes a plurality of nozzle assemblies 110. In one example, the nozzle assemblies 110 each include a nozzle check valve 222 and a corresponding nozzle 224 (e.g., an atomizer nozzle, stream nozzle or the like). In the example shown in FIG. 2B nine nozzle assemblies 110 are provided in a spaced configuration along the boom section 108. Carrier lines 206 (e.g., carrier fluid inputs, carrier fluid fittings or the like) introduce carrier fluid to each of boom section first and second ends 218, 220. In one example each of the carrier lines 206 includes a check valve 208 and a mixer 210 such as a static mixer.

The localized product injection system 112 shown in FIG. 2B includes the injection interfaces 120. In the example shown in FIG. 2B, an injection interface 120 is associated with each of the carrier lines 206 (the carrier lines extending from the boom tube 106 of the carrier system 103 to the boom section 108). Each of the injection interfaces 120 delivers injection product (e.g., from an injection product input, such as an injection product fitting described herein) to the associated carrier line 206 in communication with the boom section first and second ends 218, 220.

In one example, the injection interfaces 120 include interface valves 212 in series with check valves 214. In one example the interface valves 212 include pulse width modulation valves or other control valves configured to provide a metered flow of the pressurized injection product through the injection interfaces 120 to injection ports 216 in communication with each of the carrier lines 206. In one example the actuation of the interface valves 212, for instance to a desired flow rate, delivers the designated amount of injection product to each of the corresponding carrier lines 206 at the injection ports 216. The solution of the carrier fluid and the injection product is delivered through the mixers 210 and mixed prior to delivery to the boom section 108. The mixed solution of the carrier fluid and the injection product (the agricultural product) is thereafter delivered from the boom section first and second ends 218, 220 throughout the boom section 108 and to each of the nozzle assemblies 110. Accordingly, each of the nozzle assemblies 110 associated with a particular boom section 108 delivers substantially the same agricultural product having the same injection product concentration. The injection interfaces 120 associated with the boom section 108 are operated independently relative to other injection interfaces 120 associated with other boom sections 108 of the sprayer 100. Accordingly individualized control and instantaneous delivery of the injection product to each of the boom sections 108 (e.g., with little to no lag time) is achieved for each of the boom sections 108. In another example, the injection ports 216 are downstream of the mixer 210. For instance, the injections ports 216 are interposed between the injection interfaces (optionally including the carrier line) and the product dispenser (e.g., the boom section 108 or nozzle assembly 110).

Figure 3A:
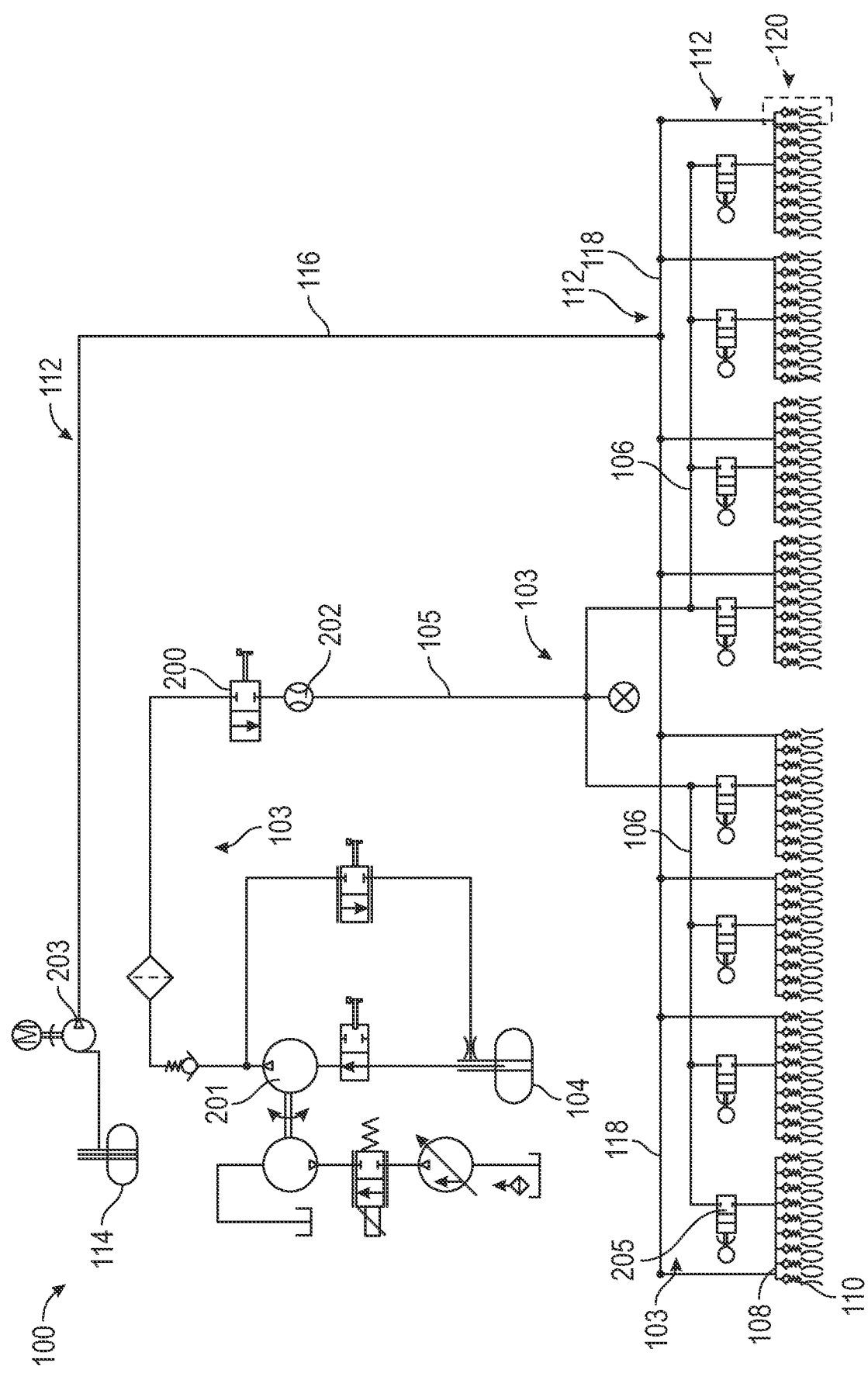
FIG. 3A is a schematic view of an agricultural sprayer including another example of a localized product injection system.
Figure 3B:
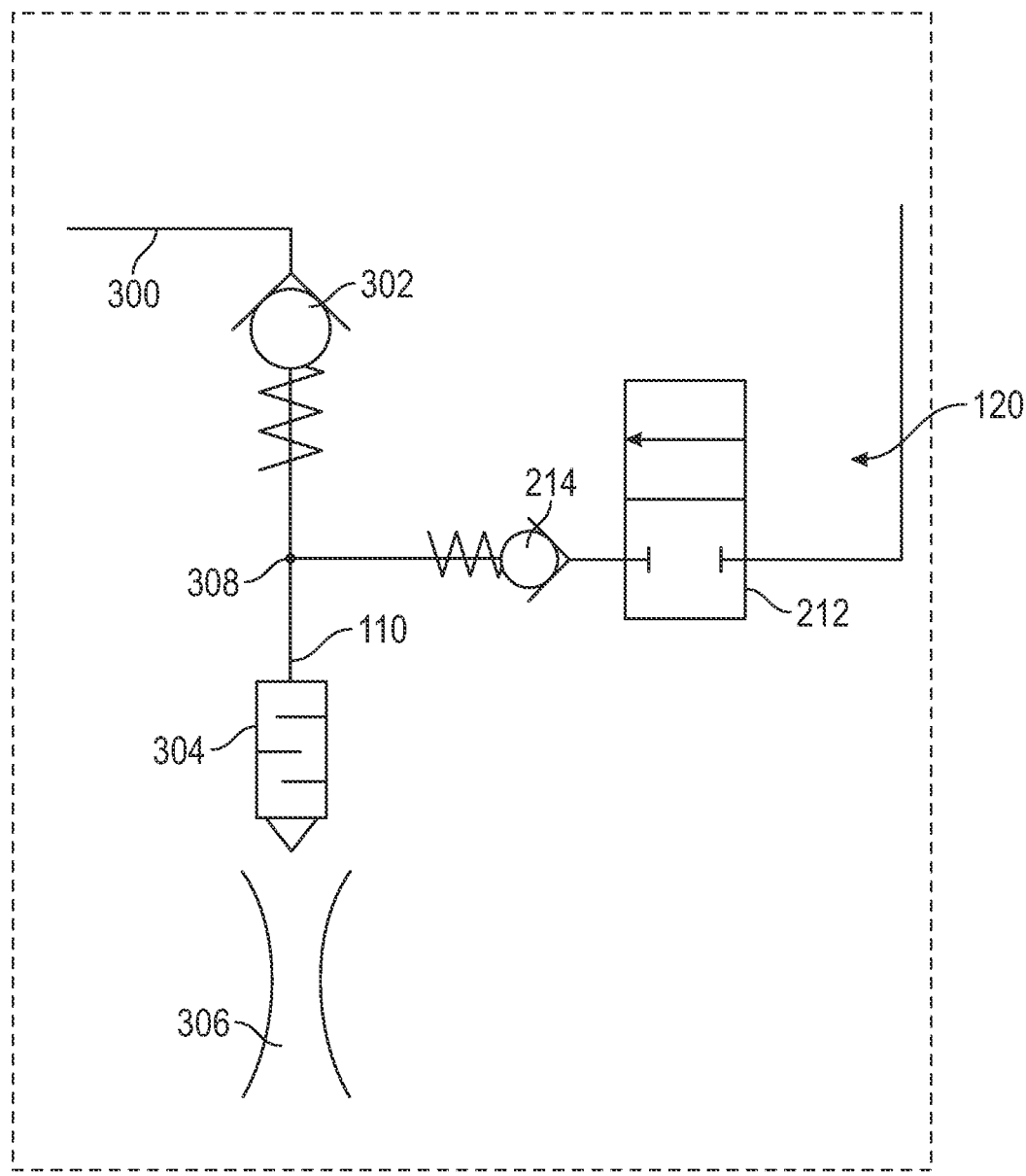
FIG. 3B is a detailed schematic view of another example of a localized injection interface in communication with a sprayer nozzle of FIG. 3A.

FIG. 3A shows another example of the sprayer 100. The example shown in FIG. 3A is similar in at least some regards to the sprayer 100 previously shown and described in FIGS. 2A and 2B. For instance, the sprayer 100 shown in FIGS. 3A and 3B includes an isolated localized product injection system 112 that is separate from the corresponding carrier system 103. As previously described herein, the localized product injection system 112 delivers an injection product from the injection product reservoir 114 to a plurality of boom sections 108. As shown in FIG. 3A and further shown in FIG. 3B, the injection interfaces 120 are each in communication with corresponding nozzle assemblies 110. Stated another way, the product dispensers 107 in the example shown in FIGS. 3A and 3B are the nozzle assemblies 110. Accordingly individualized control and instantaneous injection of the injection product are provided at each of the nozzle assemblies 110. Each of the injection interfaces 120, for instance along the length of the sprayer booms 102, are independently controlled according to determined concentrations of the injection product within the carrier fluid. The dispensed agricultural product from each of the nozzle assemblies thereby has a varying concentration of the injection product based on the independent control of the concentration provided by the injection interfaces 120.

Referring now to FIG. 3B, another example of the injection interface 120 is provided. For instance, as shown in FIG. 3B the injection interface 120 includes an interface valve 212 and a check valve 214 similar in at least some regards to the interface valve and check valves previously described and shown in FIG. 2B. In contrast to the previously described example, the injection interface 120 in this example includes an injection port 308 provided at the nozzle assembly 110 and downstream from a carrier line 300 (e.g., carrier fluid input, carrier fluid fitting or the like) communicating with the boom section 108 or boom tube 106. The nozzle assembly 110 includes a check valve 302 and an in-line mixer 304 (e.g., a static mixer). The nozzle assembly 110 further includes a nozzle 306, such as an atomizer or stream nozzle in communication with the mixer 304. As shown in FIG. 3B, the injection port 308 is coupled with the nozzle assembly 110, for instance the injection port is interposed between the check valve 302 and the mixer 304. In another example, the injection port 308 is downstream of the mixer 340. For instance, the injections port 308 is interposed between the injection interfaces 12 (optionally including the carrier line 300) and the product dispenser (e.g., the nozzle assembly 110 or the boom section 108).

In operation, the injection product is delivered through the injection boom tubes 118 to each of the injection interfaces 120, for instance through an injection product input, such as an injection product fitting described herein. The interface valve 212 meters the amount of injection product delivered to the corresponding nozzle assembly 110. For instance, the injection product is independently metered for each of the injection interfaces 120 according to control signals from a controller associated with each of the injection interfaces 120. The controller is configured to control each of the injection interfaces independently or in one or more groups or arrays. The injection product is delivered from the interface valve 212 through the check valve 214 and into the nozzle assembly 110 through the injection port 308. Prior to delivery through the nozzle 306 the injection product in combination with the carrier fluid is optionally mixed within the mixer 304 and thereafter delivered through the nozzle 306 as the agricultural product having the specified concentration of the injection product.

In a similar manner to the localized product injection system 112 shown in FIGS. 2A and 2B the localized product injection system 112 shown in FIGS. 3A and 3B is configured to provide an instantaneous addition of an injection product to the carrier fluid stream immediately prior to its dispensing through the nozzle 306 (e.g., local to the product dispenser 107). Accordingly, instantaneous changes in concentration of the injection product in an agricultural product, for instance for differing parts of a field, are achieved on an as-needed basis as the sprayer 100 moves through the field with little to no lag time.

Figure 4:
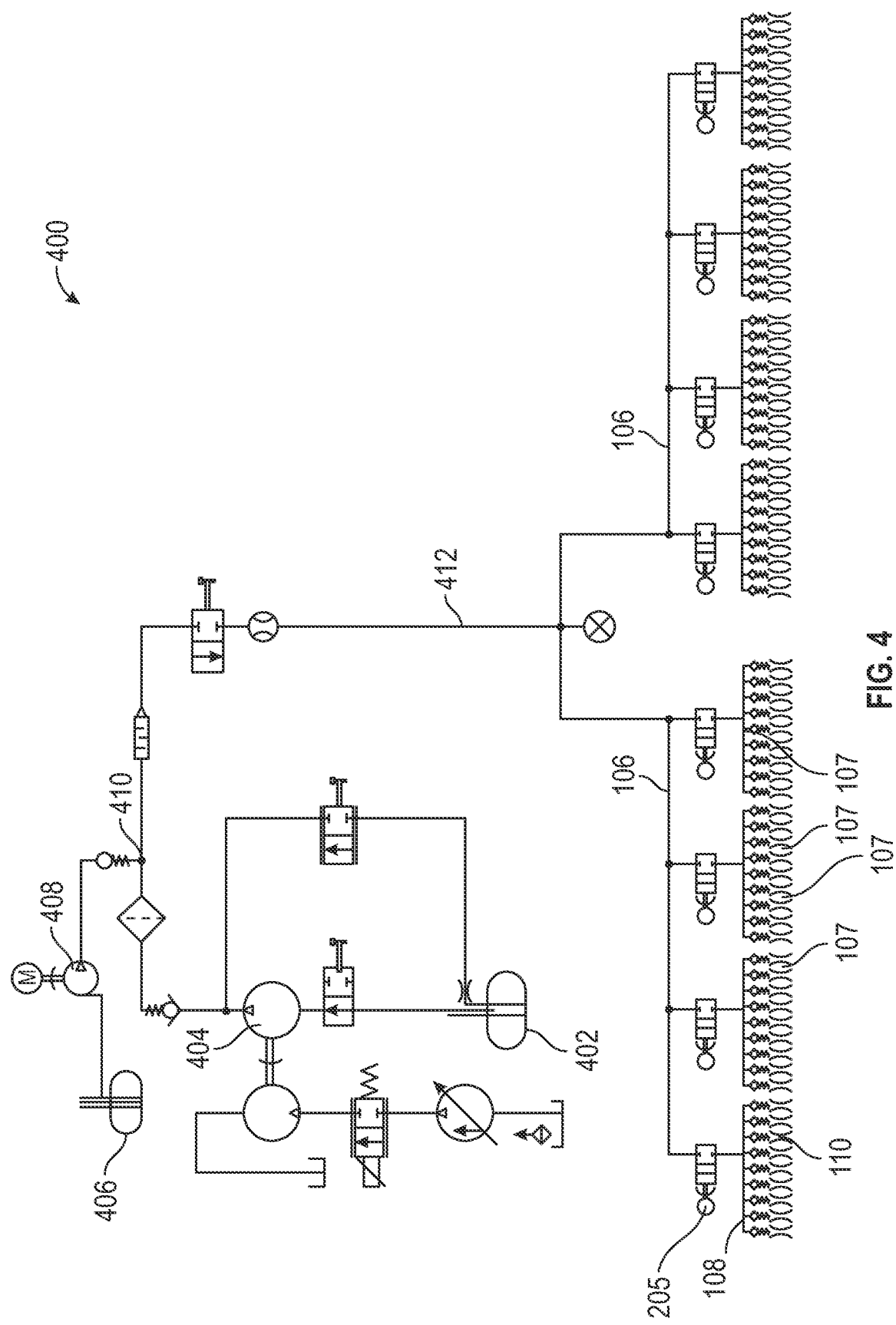
FIG. 4 is a schematic view of another example of an agricultural sprayer.

FIG. 4 shows another example of a sprayer 400. The sprayer 400 shown in FIG. 4 includes a consolidated system having the injection product reservoir 406 and the injection pump 408 feeding into an injection port 410 of a header 412 of the sprayer 400. For instance, the carrier fluid is pumped from a carrier reservoir 402 by a carrier pump 404 and supplemented with the injection product at the injection port 410 (e.g., by the injection pump 408). In one example, a mixer is provided downstream from the injection port 410 for mixing the injection product with the carrier fluid prior to delivery through the header 412 to the boom tubes 406, the boom sections 108 and the nozzle assemblies 110.

As shown in FIG. 4, the injection product is provided to the flow of carrier fluid upstream from the nozzle assemblies 110 and the boom sections 108. Accordingly, there is significant lag time from the time of introduction of the injection product to the carrier fluid and eventual distribution of the agricultural product including the injection product therein from the nozzle assemblies 110. Additionally, beyond the lag time each of the nozzle assemblies 110 and the boom sections 108 (the product dispensers 107) delivers an identical concentration of the injection product within the agricultural product across the sprayer 400. Accordingly, the sprayer 400 does not provide independent control or instantaneous introduction of the injection product to the product dispensers 107.

Figure 5:
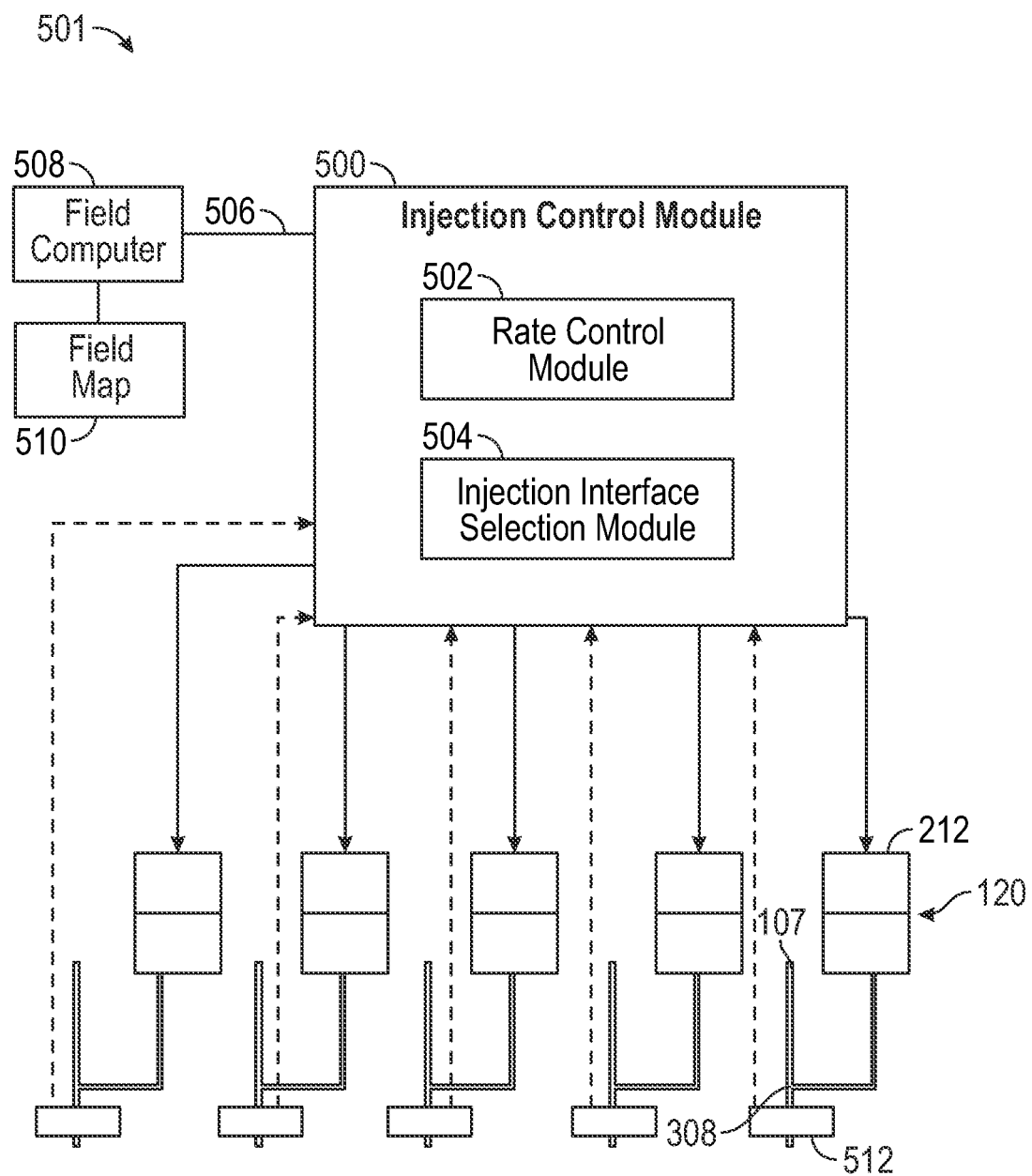
FIG. 5 is a schematic view of one example of an injection control module of a localized product injection system.
Figure 6:
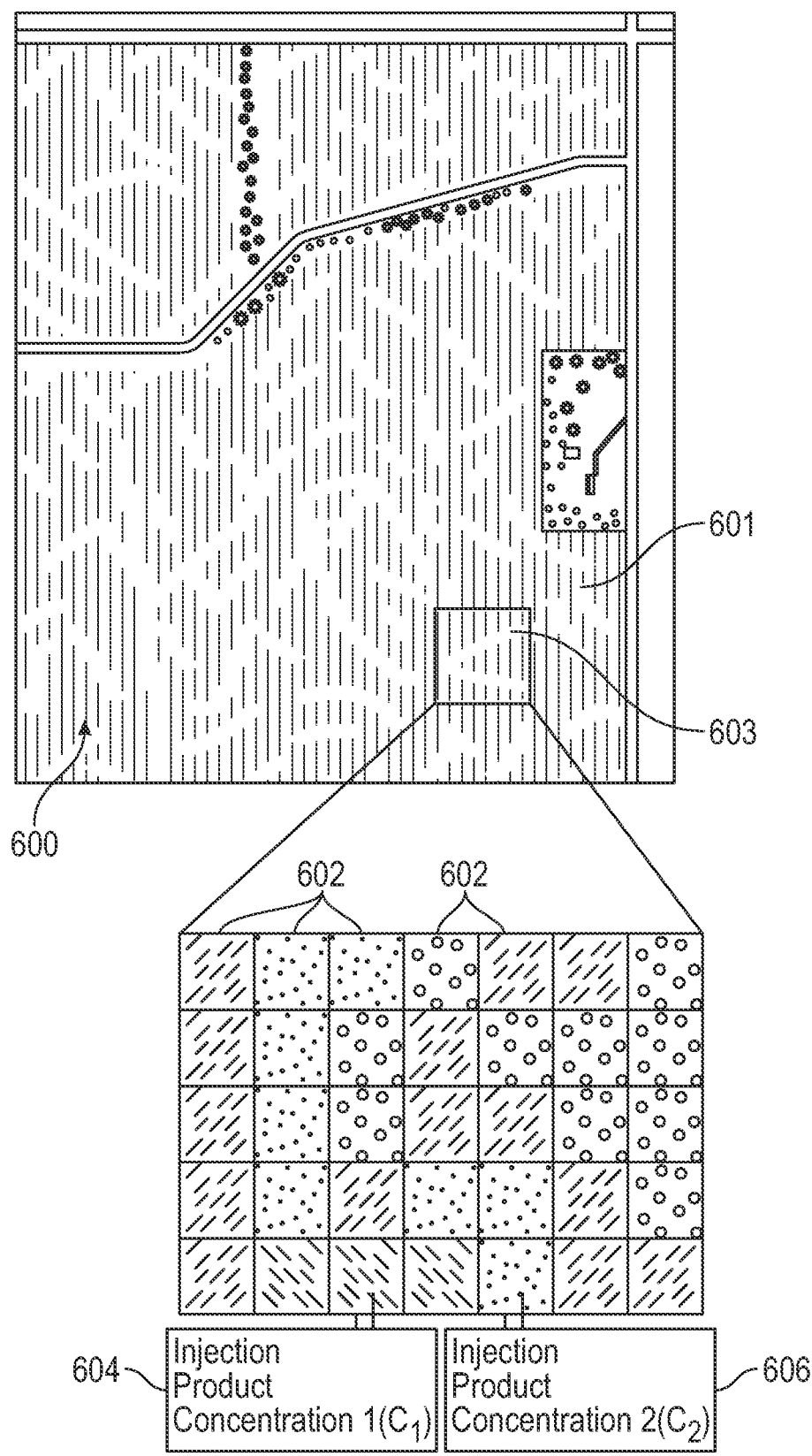
FIG. 6 is top view of one example of a field map including a plurality of zones indexed with concentration values for the injection product.
Figure 7:
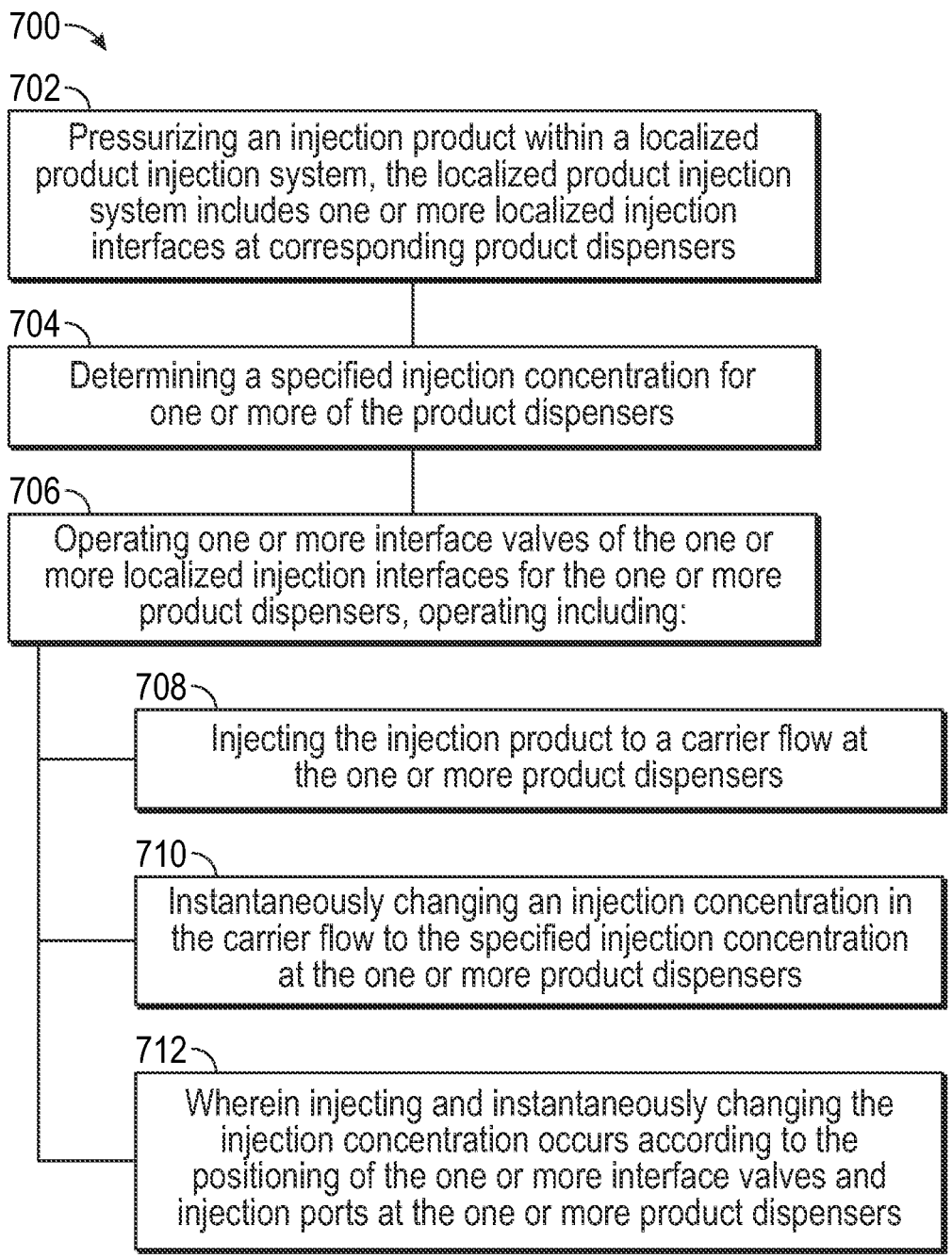
FIG. 7 is a block diagram showing one example of a method for using a localized product injection system.

FIG. 5 shows one example of a control system 501 for the sprayer 100. In the example shown in FIG. 5, the control system 501 controls a plurality of injection interfaces 120 (five interfaces are shown for exemplary purposes) associated with the nozzle assemblies 110 previously described herein. In a similar manner, the control system 501 is also configured for coupling the injection interfaces 120 associated with either of the nozzle assemblies 110 (as shown in FIG. 3B) as well as the boom sections 108 (shown in FIG.

2B). Stated another way, the control system 501 is used with injection interfaces 120 associated with any of the product dispensers 107.

Referring again to FIG. 5, the control system 501 includes an injection control module 500. The injection control module 500 is in communication with each of the injection interfaces 120, for instance by one or more of wired or wireless connections or the like. The injection control module 500 includes, in one example, a rate control module 502 configured to determine and generate signals for one or more of the injection interfaces 120 corresponding to independent injection flow rates. The flow rates correspond to injection product concentrations for a given flow rate of carrier fluid.

In another example, the injection control module 500 includes an injection interface selection module 504. The injection interface selection module 504 designates one or more of the injection interfaces 120 for adjustment of the injection flow rate of injection product (e.g., on, off, and graduated flow rates of the injection product). The injection interface selection module 504 selects one or more of the injection interfaces 120 for individualized control of the injection interfaces 120 to achieve a desired concentration (e.g., change in concentration) of the injection product in the carrier fluid. The rate control module 502 determines the corresponding rate for each of these selected injection interfaces 120, for instance in cooperation with the field computer interface 506 and a field computer 508 as described herein.

As further shown in FIG. 5, the injection interfaces 120 each include an interface valve 212 in communication with the injection control module 500 as previously described herein. The interface valve 212 accordingly allows for a controlled graduated flow of the injection product through the injection port 308 and into the corresponding product dispenser 107. As shown in FIG. 5, the injection port 308 is identical to the injection port 308 previously described and shown in FIG. 3B. In another example, the injection port 216 is used with the injection interface 120, for instance in a format corresponding to the example shown in FIGS. 2A and 2B, for the product dispenser 107 including the boom section 108.

As further shown in FIG. 5, an optional concentration sensor 512 is downstream from the injection port 308. In one example, the concentration sensor 512 includes a relative concentration sensor configured to detect the concentration of the injection product within the agricultural product based on a comparison of at least one characteristic of the agricultural product at a product dispenser 107 relative to the same at least one characteristic at another product dispenser 107. In another example, the concentration sensor 512 includes a sensor configured to measure one or more characteristics of the injection product (e.g., colors, translucency, or the like corresponding to concentration) relative to a look up table or other database. In still another example, the concentration sensor 512 includes an ultraviolet light sensor that assesses concentration based on color. For instance, a detectable tracer dye is added into the injection reservoir 114 shown in FIGS. 2A and 3A. The concentration sensor 512 is configured to measure the concentration of the tracer dye within the agricultural product and is thereby able to associate the measured concentration of the tracer dye with the corresponding concentration of the injection product. In yet another example, the concentration sensor 512 includes, but is not limited to, a pH detector configured to measure the alkalinity or acidity of the injection product within the agricultural product prior to dispensing through one or more of the product dispensers 107 including the boom sections 108 or nozzle assemblies 110.

As shown in FIG. 5 the concentration sensors 512 are in communication with the injection control module 500. In one example, the concentration sensors 512 cooperate with the injection control module 500 to provide for feedback control of the interface valves 212 of each of the injection interfaces 120. Stated another way, as a specified concentration is provided to one or more of the interface valves 212 the corresponding concentration sensors 512 for those injection interfaces 120 measure the concentration in an ongoing manner and accordingly allow for adjustments of the interface valves 212 to accordingly ensure the interface valve 212 is actuated to administer the appropriate concentration of the injection product to the carrier fluid. Accordingly, the agricultural product dispensed from each of the product dispensers 107 (the boom sections 108 or nozzle assemblies 110) has the concentration of the injection product determined by the injection control module 500 despite variations in the localized product injection system 112, in the carrier system 103 or the like.

In another example, the injection control module 500 includes a field computer interface 506. As shown, the field computer interface 506 provides an interface for coupling with a field computer 508 (part of the sprayer 100, with a leading vehicle such as a tractor, or a standalone device) and the field computer 508 includes a field map 510. As will be described herein the field map 510 includes a series of prescriptions of agricultural products, seed types, irrigation or the like for various zones. The differing prescriptions for each of the zones are determined through analysis of the field terrain, yields from previous crops, environmental conditions or the like.

The field map 510 provides a plurality of prescriptions for an agricultural product or agricultural products throughout the field (e.g., in one or more of the zones of the field). As the field computer 508 communicates with the injection control module 500 the injection control module uses the field map 510 and its associated zone based prescriptions to independently specify the flow rate of an injection product for each of the injection interfaces 120 for corresponding product dispensers 107.

Further, with GPS systems, mathematical representations of the product dispensers 107 (e.g., the boom sections 108 or nozzle assemblies 110) along the sprayer booms 102, or the like the location of each of the product dispensers 107 of the sprayer 100 is continuously determined on the field map. As one or more product dispensers 107 of the sprayer 100 are within a zone or are poised to enter a zone the injection control module 500 (e.g., with the injection interface selection module 504) selects the corresponding injection interfaces 120 for adjustment of the injection product concentration based on the field map prescription. As discussed herein, the injection product concentration is changed instantaneously at the product dispensers 107 (e.g., with minimal lag time) relative to the application of the resulting agricultural product according to the prescription. Accordingly, as one or more of the product dispensers 107 are positioned within or are poised to enter into a particular zone having a prescribed concentration of the injection product the rate control module 502 assesses the corresponding injection product concentration and actuates the interface valves 212 of the injection interfaces 120 associated with the one or more corresponding product dispensers 107. The interface valves 212 are operated (opened, closed or graduated therebetween) to achieve the flow rate of the injection product that results in the specified concentration for that portion of the field map.

The injection product is thereby introduced in an instantaneous manner at the product dispensers 107 (e.g., locally to the dispensers) immediately prior to dispensing of the agricultural product having the desired concentration to that corresponding portion of the field. The sprayer 100 described herein is able to instantaneously deliver an accurate concentration of the injection product to the carrier system at one or more of the injection interfaces 120 by way of individualized control of each of those injection interfaces 120. Accordingly, with the field map 510 having various prescriptions and a plurality of product dispensers 107 with individually controlled injection interfaces 120 a multitude of injection product concentrations are provided across the sprayer 102 to accordingly provide the agricultural product with varying concentrations of the injection product to a corresponding variety of different parts of the field.

FIG. 6 shows one example of a field 601 including at least one subdivision such as a field section 603. The field section 603 is enlarged in the detailed view provided immediately below the field 601. As shown in the detailed view of the field section 603, the field section is divided into a plurality of zones 602. Two exemplary zones 604, 606 are provided. As shown, each of the zones 604, 606 has a corresponding stippling, crosshatching or the like denoting a particular concentration of an injection product for an agricultural product (e.g., for a fungicide, herbicide, pesticide, fertilizer or the like). In one example, the zones 602 of the field 601 are indexed to a field map 600. The field map 600 including the zones 602 provides a consolidated series of prescriptions for application of the agricultural product with varying concentrations of an injection product therein.

As previously described, the field map 600 is accessed by the field computer 508 and the injection control module 500. Optionally, the injection control module 500 accesses the field map 600 directly. As described herein, as one or more of the product dispensers 107 (e.g., boom sections 108 or nozzle assemblies 110) is within or is poised to enter one of the zones 602, for instance zone 604 or zone 606, the injection control module uses the prescription for the agricultural product for that zone to control the concentration of the injection product for the corresponding product dispensers 107. Accordingly, prior to entering the zone, while entering the zone, or while within the zone the injection control module 500 (e.g., the injection interface selection module 504) selects the relevant injection interfaces 120 corresponding to the product dispensers 107. The rate control module 502 uses the prescriptions provided in the field map 510 (e.g., zones 604, 606) to accordingly signal the interface valves 212 with the flow rates of the injection product corresponding to the specified concentration of the injection product. The injection product is then instantaneously delivered to the carrier fluid flow at the product dispensers 107 to ensure timely delivery of the injection product into the carrier system for corresponding delivery of the agricultural product (with the specified concentration of injection product) to the instant zone 602 of the field 601.

Accordingly, the sprayer 100 described herein including for instance the localized product injection system 112 (described in examples shown in FIGS. 2A through 3B), is configured to provide instantaneous individualized control of injection product concentration at each of a plurality of product dispensers 107. The injection product is immediately and locally distributed to the respective product dispensers 107 immediately prior to the desired application of the agricultural product.

As previously described herein, because the localized product injection system 112 is isolated from the carrier system 103, excepting the injection ports 216, 308 (see FIGS. 2B, 3B), even in low flow conditions of the carrier fluid through the carrier system 103 the injection product is still delivered at pressure and with the desired independently controlled concentrations to the corresponding product dispensers 107. Lag time that would otherwise delay the introduction of the injection product with the desired concentration is accordingly mitigated or eliminated even in low flow conditions because of the immediate introduction at the product dispensers 107.

FIG. 7 shows one example of a method 700 for using a localized product injection system, such as the system 112 described herein. In describing the method 700 reference is made to one or more components, features, functions or the like described herein. Where convenient reference is made to the components, features functions or the like with reference numerals.

Reference numerals provided are exemplary and are not exclusive. For instance, the features, components, functions and the like described in the method 700 include, but are not limited to, the corresponding numbered elements, other corresponding features described herein, both numbered and unnumbered as well as their equivalents.

At 702, the method 700 includes pressurizing an injection product within a localized product injection system 112. The localized product injection system 112 includes one or more localized injection interfaces 120 and corresponding product dispensers 107. In one example and as shown for instance in FIGS. 2A and 2B the product dispensers 107 include, but are not limited to, boom sections 108. In another example, the product dispensers 107 include, but are not limited to, nozzle assemblies, such as the nozzle assemblies 110 shown for instance in FIGS. 3A and 3B.

At 704, a specified injection concentration is determined for one or more of the product dispensers 107. In one example, determining the specified injection concentration for the one or more product dispensers 107 includes determining an injection concentration for the corresponding injection interfaces 120 associated with those product dispensers 107. For instance and as described herein, the one or more product dispensers 107 pass through a plurality of zones such as the zones 604, 606 of a field map 600. In one example, the field map 60) and one or more of GPS positioning, mathematical algorithms, combinations of the same, or the like are assessed by an injection control module 500 to determine the locations of the corresponding product dispensers 107 relative to the zones 602. Concentrations of the injection product are indexed to each of the zones 602. As the product dispensers 107 enter, are poised to enter, or are within the zones 602 (e.g., exemplary zones 604, 606) the corresponding concentrations are associated with the product dispensers and the respective injection interfaces by the injection control module 500.

At 706, the method 700 includes operating one or more interface valves 212 of the injection interfaces 120 for the corresponding one or more product dispensers 107. Operating of the one or more interface valves 120 includes, at 708, injecting the injection product to a carrier fluid of a carrier system 103 at the one or more product dispensers 107 (e.g., at the boom sections 108 or nozzle assemblies 110). Operating the one or more interface valves 120 includes, at 710, instantaneously (e.g., near instantaneously or instantaneously) changing the injection concentration in the carrier flow to the specified injection concentration at the one or more product dispensers 107. At 712, the injecting and instantaneous change of the injection concentration occurs according to the positioning of the one or more interface valves 212 (of the injection interfaces 120) and the corresponding injection ports (216, 308) at the one or more product dispensers 107. Stated another way, by positioning the injection interfaces 120 at the product dispensers 107 the concentration of the injection product in the agricultural product is immediately changed prior to dispensing the resulting agricultural product from the sprayer 102.

In another example, the injection control module 500 independently controls the one or more injection interfaces as described herein. With the concentrations of the injection product associated with the one or more injection interfaces 120 (e.g., through use of a field map 600 having a plurality of zones 602), the injection control module 500 actuates the interface valves 212 of the corresponding injection interfaces 120 to independently provide flow of the injection product to the product dispensers 107 as prescribed.

Several options for the method 700 follow. In one example, pressurizing the injection product includes pressurizing the injection product to each of the one or more localized injection interfaces 120 positioned at the one or more product dispensers 107. Stated another way and as described herein, the localized product injection system 112 is isolated from the carrier system 103 and interfaces with the carrier system at the injection interfaces 120 (local to the product dispensers 107). By maintaining a pressurized environment at the injection interfaces 120 the injection product is instantaneously injected into the carrier flow at the product dispensers 107. Accordingly, the pressurized system 112 separate from the carrier system 103 ensures the injection product is instantaneously delivered to the carrier fluid to accordingly provide agricultural product at the one or more product dispensers 107 having the desired concentration of the injection product with little to no lag time between injection and application. As stated herein by providing the injection interfaces 120 at the product dispensers 107 (as opposed to upstream near the carrier reservoir 104) the agricultural product having the specified injection concentration is immediately applied through the product dispensers 107, for instance the boom sections 108 and the nozzle assemblies 110. Stated another way, lag time otherwise present with upstream mixing of the injection product into a flow of the carrier fluid is avoided. Instead, the instantaneous injection and corresponding instantaneous change in concentration of the injection product within the carrier fluid generates an agricultural product having the desired injection concentration immediately prior to its application to the agricultural crop.

In still another example, the method 700 includes measuring the injection concentration in the agricultural product (carrier fluid) at the one or more product dispensers 107. For instance, in one example the product dispensers 107 include corresponding concentration sensors 512 (see FIG. 5). A flow rate of the injection product is changed or controlled according to the measured injection concentration and the specified injection concentration. For instance where the injection control module 500 specifies a desired injection product concentration (having a corresponding flow rate) the concentration sensor 512 communicates with the injection control module 500 to provide feedback control to accordingly tune the concentration to achieve the specified injection concentration specified by the rate control module 502.

In another example, operating the one or more interface valves 212 includes individually operating the one or more interface valves 212 (e.g., independently or as arrays). For instance, as described herein and shown for instance in FIGS. 5, 2B and 3B the injection interfaces 120 are independently operable relative to the other injection interfaces 120 of the sprayer 100. Accordingly, the localized product injection system 112 provides varying flow rates of the injection product to each of the product dispensers 107 according to individualized specified concentrations. In one example, the individualized specified concentrations are provided by the injection control module 500 configured to assess and determine injection product concentrations from a field map 510 having one or more varying prescriptions for the agricultural product.

FIGS. 8A and 8B show examples of injection interfaces 800, 850. Referring first to FIG. 8A, the injection interface 800 includes a plurality of inputs, for instance, a carrier fluid input 804 and one or more injection project inputs such as the injection product inputs 806, 808. As described herein, the injection product (or injection products) delivered through the injection product inputs 806, 808 are mixed with carrier fluid delivered in an isolated or separated passage such as the carrier fluid input 804 to a mixing chamber 822 shown in FIG. 8A for mixing of the agricultural product (e.g., with one or more of the injection products at a specified concentration relative to the carrier fluid) and delivery of the agricultural product through an injection port 820 to a nozzle, such as the nozzle assembly 824. The injection port 820 includes, but is not limited to, a fitting configured for coupling with one or more nozzle assemblies 824 including nozzle assemblies having control valves, multiple nozzles, configurable nozzles having controllable nozzle orifices (e.g., including controllable fixed orifices and controllable variable orifices with one or more orifice plates configured to change an orifice profile) or the like.

In one example, the injection interface 800 is a physical component configured for coupling with one or more components of a product injection system, for instance, one or more of the systems previously described herein. For instance, the injection interface 800 includes an interface body 802 providing one or more of the injection product inputs 806, 808, the carrier fluid input 804 or the like as fittings. For instance, as described herein, in one example, an injection interface 800 includes a clamping feature configured to position and bias one or more features such as fittings of the injection product inputs 806, 808 and carrier fluid input 804 into communication with one or more corresponding passages, for instance, of the composite boom tube. The injection interface 800 provides for localized injection and mixing of one or more injection products to a flow of carrier fluid local to a product dispenser, such as the nozzle assembly 824 including a nozzle 826. Accordingly, instantaneous injection and mixing of the one or more injection products (e.g., with minimal lag time) is provided to facilitate the dispensing of the agricultural product at the specified concentration through the nozzle 826.

Referring again to FIG. 8A, the injection interface 800 includes a mixing chamber 822 in communication with each of the carrier fluid input 804 and the one or more injection product inputs 806, 808. The mixing chamber 822 includes at least one mixing structure configured to mix each of the carrier fluid 804 and the one or more injection products and accordingly provide an agricultural product having the specified concentration (e.g., including a varied concentration, maintained concentration or the like) distributed in the carrier fluid as described herein. The least one mixing structure includes, but is not limited to, one or more of vanes, flutes, passages, residence chambers or the like. The mixing chamber 822 blends the injection product (including one or more injection products) with the carrier fluid 804 to provide the agricultural product at the specified concentration. Additionally, the mixing chamber 822 facilitates the instantaneous (including near instantaneous, with minimal lag time or the like) change of concentration of the one or more injection products 806, 808 in the agricultural product by way of the one or more mixing structures provided locally relative to the product dispenser, such as the nozzle assembly 824, for instance, shown in FIG. 8A.

As further shown in FIG. 8A, one or more throttling elements 810, 812 are associated with each of the one or more injection product inputs 806, 808. The throttling elements 810, 812 (in this example, one or more control valves) are configured to control the flow rate of the one or more injection products to the carrier fluid and the mixing chamber 822. For instance, the throttling elements 810, 812 when used together, for instance, with the injection interface 800, provide control of each of the injection products, for instance, from the injection product inputs 806, 808 to the carrier fluid. Accordingly, independent control of the injection products 806, 808 according to one or more prescriptions or the like is provided by the throttling elements 810, 812. In other examples, as described herein, the throttling elements include, but are not limited to, one or more pumps configured to deliver the injection product to the carrier fluid for mixing locally relative to the nozzle assembly 824.

In the example shown in FIG. 8A, each of the throttling elements 810, 812 (control valves in this example) are in communication with the control unit 813 associated with each of the control valves. As further shown in FIG. 8A, the control unit 813 is in communication with one or more optional sensors including, but not limited to, flow meters 814, 816 associated with the respective injection product inputs 806, 808. In another example, the optional sensors include pressure transducers positioned upstream and downstream relative to the throttling elements 810, 812 to measure a pressure differential and corresponding determine a flow rate.

In one example, the sensors, such as flow meters 814, 816, are in communication with the control unit 813 and the control unit is in communication with each of the throttling elements 810, 812 as described herein to provide feedback control of the throttling elements 810, 812. For instance, where a specified concentration (including maintenance or variation of a concentration) is provided to the control unit 813 (e.g., from a master control unit such as the injection control module 500 in FIG. 5) the control unit operates the throttling elements 810, 812 to provide the specified concentration (including concentrations) of each of the one or more injection products from the inputs 806, 808 to the carrier fluid provided by the carrier fluid input 804. In one example, the flow meters 814, 816 measure the flow downstream from the throttling elements 810, 812 and are used in a feedback control loop by the control unit 813 to control the flow rate through the throttling elements 810, 812 to thereby provide the specified concentration (corresponding to the flow rates) of the one or more injection products to the carrier fluid.

In another example, operation of the throttling elements 810, 812, for instance, control valves are graduated according to known positions or indexing of one or more valve features, for instance, valve operators, displacement of valve operators, duty cycles or the like. Accordingly, operation of the throttling elements 810, 812 by the control unit 813 optionally uses an open loop system to provide one or more flow rates of the one or more injection products from the injection product inputs 806, 808 to the carrier fluid according to the known characteristics of the throttling elements 810, 812.

In one example, the control unit 813 of the injection interface 800 is included in the physical assembly of the injection interface 800, for instance, within the interface body 802. In another example, the control unit 813 is a remote control unit or component of a master control unit associated with and controlling one or more injection interfaces 800. In the previous example, where the control unit is associated with each individual injection interface 800, the control unit 813 is, in one example, in communication with a master or overall controlling unit, such as the injection control module 500 shown in FIG. 5A, that provides one or more specified concentrations to the control unit 813 to facilitate operation of the throttling elements 810, 812.

As further shown in FIG. 8A, in one example, each of the carrier fluid input 804, the injection product input 806 and the injection product input 808 include one or more check valves 818. The check valves 818 associated with the injection product inputs 806, 808 are provided downstream relative to the throttling elements 800, 812. The check valves 818 ensure one way delivery of one or more of the injection products and the carrier fluid to the mixing chamber 822.

As shown, the injection interface 800 provided in FIG. 8A includes one or more throttling elements 810, 812 including control valves in the example shown. The control valves, in one example, are used in combination with one or more features such as pumps or the like provided at an upstream location relative to the injection interfaces 800, for instance, proximate to an injection product reservoir to provide a pressurized flow of the one or more injection products through each of the inputs 806, 808. Accordingly, the environment of the injection product, for instance, from the injection product reservoir to the mixing chamber 822 provides a pressurized source of the injection product that is accordingly delivered in a local manner to the mixing chamber 822 for instantaneous mixing of the injection product with the carrier fluid to provide an agricultural product having the one or more injection products at one or more specified concentrations. This facilitates immediate changes in concentrations of the injection products and immediate delivery of corresponding agricultural products having varied injection product concentrations from the nozzle 826 on an as-needed basis with little to no lag time.

In another example, and as previously described herein, the throttling elements 810, 812 include pumps. In this example, the pressurized environment for the injection product extends, for instance, from at least the pumps to the mixing chamber 822. Accordingly, in this example, the injection product is also provided in a local pressurized fashion to the mixing chamber 822 to facilitate the instantaneous control of injection product concentration in the carrier fluid and ensure immediate delivery of the resulting agricultural product through the nozzle assembly 824. In this example, the one or more injection products are delivered from injection product reservoirs in a passive manner including, but not limited to, gravity feeding, remote distribution of injection products by upstream pumps followed by stepping up of pressure with the throttling element pumps, negative pressure pumping (e.g., vacuum pumping) by the throttling elements 810, 812 or the like.

As shown in FIG. 8A, one or more throttling elements 810, 812 and the nozzle assembly 824 optionally include one or more automated valves. For instance, in one example, the control valves associated with each of the throttling elements 810, 812 or the nozzle assembly 824 include one or more controllable valves configured for remote control, for instance, by a control unit 813, master control unit or the like. In one example, the control valves used in one or more of the throttling elements 810, 812 or the nozzle assembly 824 include, but are not limited to, pulse width modulation valves configured to cycle between on and off configurations at one or more duty cycles and thereby provide corresponding flow rates of one or more of the injection products in the examples of the inputs 806, 808, or the mixed agricultural product in the example of the nozzle assembly 824 to the nozzle 826.

FIG. 8B shows another example of an injection interface 850 similar in at least some regards to the injection interface 800 shown in FIG. 8A. In this example, the injection interface 850 includes an interface body 852, for instance, having one or more component displacement pumps as the throttling elements 860, 862. In this example, the throttling elements 860, 862 include one or more metering pumps configured to provide controlled specified flow rates corresponding to specified concentrations of the one or more injection products to carrier fluid, for instance, through the carrier fluid input 804. The metering pumps include, but are not limited to, one or more positive displacement piston pumps, diaphragm pumps, peristaltic pumps, gear pumps or the like.

As shown in FIG. 8B, each of the injection product inputs 806, 808 extend through the corresponding throttling elements 860, 862 pumps, in this example, to the carrier fluid input 804. Each of the injection products and the carrier fluid mix in the mixing chamber 822 for delivery to the nozzle assembly 824 and the nozzle 826.

In the example shown in FIG. 8B, a control unit 864 is in communication with each of the throttling elements 860, 862, in this example, metering pumps as shown. Optionally, flow meters are provided at the injection interface 850 (e.g., downstream or upstream) relative to the throttling elements 860, 862 and in communication with the control unit 864. In this example, the flow meters or other sensors such as pressure transducers are used by the control unit 864 to control each of the throttling elements 860, 862 with feedback control. In another example, the calibrated operation of the metering pumps of the throttling elements 860, 862 is used in an open loop control scheme to accordingly deliver a specified flow rate of the one or more injection products to the carrier fluid corresponding to calibrated displacements of the throttling elements 860, 862.

In operation, the injection interface 850 operates similarly to the injection interface 800 previously described herein. For instance, specified concentrations of each of the injection projects are provided to the control unit 864 and the throttling elements 860, 862 (in this example, metering pumps) are operated to provide corresponding flow rates of the one or more injection products through the corresponding check valves 818 to the carrier fluid for mixing at the mixing chamber 822. As the specified concentrations of each of the injection products 806, 808 change the control unit 864 correspondingly increases or decreases the flow rate of each of the injection products to the carrier fluid to accordingly change the specified concentration of the injection product within the carrier fluid and deliver an agricultural product having each of the injection products at the (changed) specified concentrations to the nozzle assembly 824. This facilitates instantaneous mixing and delivery of the agricultural product with specified concentrations of one or more injection products to the nozzle 826 for delivery to a field.

FIGS. 9A, 9B and 9C show additional examples of injection interfaces. Referring first to FIG. 9A, the injection interface 900 is shown with a carrier fluid input 804 and one or more injection product inputs 806, 808. The injection product inputs 806, 808 are configured, for instance, to provide one or more flows of injection products to the injection interface 900 for mixing, for instance at the mixing chamber 822, and delivery of the agricultural product having a specified concentration of the one or more injection products to a nozzle assembly 824 including a nozzle 826. As previously described, the mixed agricultural product is provided with the specified concentration in an instantaneous manner (e.g., with no or minimal lag) to thereby facilitate the instantaneous change in concentration of one or more of the injection products and the agricultural product for application from the nozzle 826 (e.g., according to prescribed changes in concentration, variation in carrier fluid flow rate and corresponding variation in injection product flow rate to maintain a concentration or the like).

Referring again to FIG. 9A, in this example, the injection interface 900 includes one or more throttling elements such as throttling elements 910A, 910B and 912A, 912B provided in parallel. With regard to the injection product input 806, the throttling elements 910A and 910B (in this example, control valves) are provided in parallel and accordingly deliver injection product to the mixing chamber 822 together. As further shown in FIG. 9A, the throttling elements 910A, 910B are in communication with a flow meter, such as the flow meter 814 or other sensor, configured to detect a characteristic corresponding to the concentration of the injection product (e.g., flow rate of the injection product relative to the carrier fluid flow rate) prior to delivery to the mixing chamber 822. In a similar manner, the injection product input 808 includes parallel throttling elements 912A, 912B.

In each of the examples provided herein, for the injection product inputs 806, 808 the throttling elements 910A, 910B and 912A, 912B, the throttling elements include control valves. In another example, for instance, as shown in FIG. 9C, the parallel throttling elements include one or more of pumps, control valves, alone or in combination including mixed arrangements of a pump and control valves in parallel or the like. In a similar manner to the previously described throttling elements 910A, 910B, the throttling elements 912A, 912B are in parallel and deliver a flow of the injection product through one or more sensors, such as a flow meter 816 or other sensor configured to measure a flow rate or the like of the injection product to the mixing chamber 822. The flow meters 814, 816 are coupled with a control unit, such as the control unit 914. The output from the flow meters 814, 816, for instance, a measured flow rate (or pressure differential in an option with pressure transducers) through one or more of the respective throttling elements associated with the various injection product inputs 806, 808 is used by the control unit 914 to further control and refine the flow rates through the throttling elements. As with the previous examples described herein, in one example, the control unit 914 is provided as part of the injection interface 900, for instance, the control unit 914 is a component within or coupled with the interface body 902. In another example, the control unit 914 is a remote control unit remote relative to the injection interface 900 and includes, but is not limited to, a master control unit, a module associated with a master control unit (such as the injection control module 500 in FIG. 5) configured to operate one or more injection interfaces 900.

In operation, the injection interface 900 shown in FIG. 9A is, in one example, operated across a range of flow rates according to the maximum flow rates of one or more of the throttling elements 910A, 910B or 912A, 912B. For instance, where the injection product input 806 is provided over a range of flow rates, the throttling elements 910A, 910B are configured to supply a portion of that range of flow rates. In one example, the throttling element 910A is configured to provide a flow rate of the injection product from the injection product input 806 at flow rates up to a maximum flow rate for the element 910A, for instance, ten fluid ounces per minute or less. Where additional flow of the injection product is specified above the maximum flow rate, for instance by the control unit 914, the supplemental throttling element 910B is operated to provide additional flow to the mixing chamber 822 and the nozzle assembly 824 coupled at the injection port 820, providing dual throttling elements 910A, 910B and 912A, 912B facilitates the use of smaller and potentially less expensive components to accordingly decrease the overall expense of the injection interface 900 while at the same time allowing for a relatively wide range of flow rates of the injection products.

Optionally, the control unit 914 operates both of the throttling elements 910A, 910B in a load offsetting manner, for instance providing dual flow through each of the elements 910A, 910B to facilitate delivery of the specified flow rate to the mixing chamber 822 while at the same time minimizing one or more other characteristics through the throttling elements 910A, 910B including, for instance, pressure drop. In a similar manner, the throttling elements 912A, 912B are, in one example, operated by the control unit 914 in a corresponding manner to the throttling elements 910A, 910B described previously herein.

Optionally, the flow meters 814, 816 are, in one example, used in combination with the respective throttling elements to provide feedback control. The control unit 914 uses flow rates, pressure differentials or the like for refining of the actual flow rates of each of the respective injection products to the mixing chamber 822 to achieve a flow rate corresponding to the specified concentration in the resulting agricultural product delivered to the nozzle assembly 824 and its nozzle 826.

FIG. 9B shows another example of the injection interface 900 previously shown in FIG. 9B. Many of the components of the injection interface 900 shown in FIG. 9B correspond to components shown in FIG. 9A. For instance, the injection interface 900 includes throttling elements 910A, 910B associated with the injection product input 806 and throttling elements 912A, 912B associated with the second injection product input 808. As further shown in FIG. 9B, the carrier fluid input 804 delivers a flow of carrier fluid to the mixing chamber 822 in a parallel fashion relative to the injection product inputs 806, 808. As with previous examples herein, and in the example shown in FIG. 9B, check valves 818 are interposed between the inputs 804, 806, 808 and the mixing chamber 822 to prevent backflow of one or more of the fluids into an opposing parallel line.

In the example shown in FIG. 9B, the injection interface 900 includes one or more sensors, such as flow meters, provided in parallel with the respective throttling elements 910A, 910B or 912A, 912B. For instance, the injection product input 806 includes parallel throttling elements 910A, 910B and corresponding parallel flow meters 814A, 814B. In one example, the flow meters 814A, 814B are selected to have a corresponding maximum flow rate proximate to that of the throttling elements 910A, 910B. By providing dual flow meters 814A, 814B, smaller and potentially less expensive components are used with the throttling elements 910A, 910B to accordingly decrease the overall expense of the injection interface 900. In a similar manner parallel flow meters 816A, 816B associated with the throttling elements 912A, 912B are provided with the injection product input 808. The flow meters shown in parallel with the respective throttling elements are, in one example, in communication with the control unit such as the control unit 914. The control unit 914 is in turn in communication with the throttling elements 910A, 910B and 912A, 912B to control the flow rate of the one or more injection products to the mixing chamber 822 for local mixing proximate to the nozzle assembly 824 and delivery through the nozzle 826.

FIG. 9C shows another example of an injection interface 950. In at least some regards, the injection interface 950 is similar to the examples of the injection interface 900 previously shown in FIGS. 9A and 9B. In this example, the parallel throttling elements 960A, 960B and 962A, 962B associated with respective injection product inputs 806, 808 correspond to one or more pumps configured to provide a flow of the injection product to the mixing chamber 822 for localized mixing of the injection products with the carrier fluid (e.g., from the carrier fluid input 804) and delivery of an agricultural product having one or more specified concentration of the respective injection products to a nozzle assembly 824 having a nozzle 826 proximately coupled with the interface 950.

As further shown in FIG. 9C, a control unit 964 is, in one example, in communication with each of the throttling elements 960A, 960B and 962A, 962B. In a similar manner to the control valves previously described and shown in FIGS. 9A, 9B, the pumps as the throttling elements in this example are, in one example, operated in parallel. For instance, one of the pumps, such as the throttling element 960A shown in FIG. 9C, is operated up to its maximum flow rate and an additional specified flow of the injection product is diverted through the supplemental throttling element 960B (in this example another pump) to accordingly provide an overall specified flow rate of the injection product to the mixer 822. Optionally, the control unit 964 offsets the overall flow between the throttling elements 960A, 960B to accordingly ensure each of the throttling elements, here pumps, are operated at less than their maximum flow rates to minimize one or more fluid characteristics of the system such as pressure drop, power requirement for the pumps or the like. By providing dual pumps, smaller and potentially less expensive pumps are used with as the throttling elements 960A, 960B (as well as 962A, 962B) to accordingly decrease the overall expense of the injection interface 950.

In a similar manner, the throttling elements 962A, 962B of the opposed injection product input 808 are operated in a similar parallel manner. For instance, the control unit 964 operates one of the throttling elements 962A up to its maximum flow rate and, upon specification of a higher flow rate (e.g. an increased specified concentration of the respective injection product), operates the supplemental throttling element 962B in combination with the first throttling element 962A. By using multiple pumps at the injection interface 950, smaller pumps are, in one example, specified for the injection interface 950 thereby decreasing expense while at the same time providing redundancy and operative capability for the injection interface 950. For instance, the throttling elements 960A, 960B and 962A. 962B are, in one example, specified at lower maximum flow rates relative to larger single pumps and accordingly are specified as less expensive lower flow pumps. At the same time an overall flow rate to the mixing chamber 822 is provided that is comparable to larger more expensive pumps. The plurality of throttling elements 960A, 960B (as well as the opposed throttling elements 962A, 962B) provide redundancy to facilitate the continued use of the injection interface 950 even where one of the throttling elements 960A, 960B mechanically or electrically fails.

FIGS. 10A and 10B show additional examples of injection interfaces 1000, 1050 including a plurality of injection product inputs 806, 808 using single consolidated throttling elements such as the throttling elements 1010 and 1060 in FIGS. 10A and 10B, respectively. Referring first to FIG. 10A, as shown, the injection interface 1000 includes similar components in at least some regards to the previously described injection interfaces. For instance, the injection interface 1000 includes an interface body 1002 having a carrier fluid input 804 (e.g., carrier fluid fitting in one example) and two or more injection product inputs 806, 808 (e.g., in another example, input fittings.

As further shown in FIG. 10A, the injection product inputs 806, 808 are each in communication with a product selection valve 1004. The product selection valve 1004 is, in one example, a three-way valve configured to select the injection product input 806 or the injection product input 808. As further shown in FIG. 10A, the product selection valve 1004 is coupled with the throttling element 1010 interposed between the selection valve 1004 and the mixing chamber 822. In a manner similar to the previously described embodiments provided herein, the flow of the injection product through the product selection valve 1004 is controlled by the throttling element 1010, such as a control valve or pump (the pump shown is shown in FIG. 10B). The carrier fluid delivered along the carrier fluid input 804 to the mixing chamber 822 mixes with the injection product delivered through the throttling element 1010 to accordingly provide an agricultural product having a specified concentration of the injection product at the injection port 820 for immediate application by the nozzle assembly 824, for instance, by spraying through the nozzle 826.

As shown in FIG. 10A, in one example, a flow meter 1006 is provided in line with the throttling element 1010. In previous examples, the flow meter 1006 is provided downstream relative to the throttling element 1010. In the example shown in FIG. 10A, the flow meter 1006 is provided upstream of the throttling element 1010. A control unit 1008 is in communication with each of the flow meter 1006 and the throttling element 1010. In one example, the control unit 1008 uses feedback from the flow meter 1006 (e.g., corresponding to actual flow through the throttling element 1010) to refine control of the throttling element 1010, for instance, toward a specified flow rate of one of the injection products to accordingly achieve a specified concentration of the injection product in the carrier fluid at the mixer 822.

As with previous embodiments described herein, the control unit 1008 is, in one example, included as part of the injection interface 1000. For instance, the control unit 1008 is retained along or housed within the interface body 1002. In another example, the control unit 1008 is a module or component of an overall master control unit, such as the injection control module 500 shown in FIG. 5, in communication with one or more injection interfaces 1000 provided along one or more sprayer booms of a sprayer, such as the agricultural sprayers shown in FIGS. 1A and 1B.

Referring now to FIG. 10B, another example of an injection interface 1050 is provided. The injection interface 1050 includes similar components to the injection interface 1000 shown in FIG. 10A. For instance, the interface 1050 includes an interface body 1052 including a carrier fluid input 804 and injection product inputs 806, 808. A product selection valve 1054 is interposed between the injection product inputs 806, 808 and a throttling element 1060, in this example, a pump configured to provide a metered flow rate of at least one of the injection products to the mixing chamber 822 for mixing with the carrier fluid from the carrier fluid input 804. As further shown in FIG. 10B (and also shown in FIG. 10A), each of the injection product inputs 806, 808 and the carrier fluid input 804 includes check valves 818 configured to prevent backflow of one or more of the injection products into the respective inputs.

In a manner similar to the injection interface 1000 shown in FIG. 10A, the throttling element 1060 of the injection interface 1050 meters the flow of at least one of the injection products into the carrier fluid for mixing at the mixing chamber 822. For instance, in this example, the throttling element 1060 includes a pump configured to provide a specified flow rate of the injection product delivered from the product selection valve 1054 to the mixing chamber 822. The throttling element 1060, in this example a pump, is, in one example, configured to provide multiple flow rates of the injection product, for instance, by varying displacement (e.g., by varying of piston displacement, operation of a diaphragm, peristaltic operation of a roller pump or metering pump, gear pump or the like) corresponding to specified concentrations of the injection product.

In each of the examples shown in FIGS. 10A and 10B, the respective injection interfaces 1000, 1050 are configured to provide multiple injection products, for instance, through two or more injection product inputs 806, 808 while providing a unitary throttling element 1010, 1060 configured to deliver a specified flow rate of the selected injection product to the mixing chamber 822 for mixing with a carrier fluid to provide a specified concentration of the injection product in the carrier fluid (e.g., an agricultural product). The product selection valve 1054 allows for the selection of one of the injection products 806, 808 and delivery of that selected product to the throttling elements 1010, 1060. The control unit 1008, 1058, in communication with the respective throttling elements 1010, 1060, provides the selected injection product to the mixing chamber 822 at the specified flow rate corresponding to a specified concentration of the injection product relative to the carrier fluid. The product selection valve 1004 (see FIG. 10A), 1054 (see FIG. 10B) directs the flow of either of the injection product inputs 806, 808 to the respective throttling elements 1010, 106W to minimize the inclusion of plural throttling elements including additional pumps, control valves, instrumentation for the same and the like in the injection interfaces 1000, 1050. Accordingly, the interfaces 1000, 1050 shown in FIGS. 10A, B are configured to provide multiple injection products at specified concentrations for mixing with the carrier fluid with the single or unitary throttling elements 1010, 1060.

In each of the examples shown in FIG. 10A, 10B, the throttling elements 1010, 1060 including merged inputs such as the injection product inputs 806, 808. The product selection valves 1004, 1054 facilitate metering of one or more injection products while at the same time minimizing extensive instrumentation control and additional features in each of the injection interfaces 1000, 1050. For instance, in the example shown in FIG. 10A, 10B, the injection interfaces 1000, 1050 use unitary throttling elements 1010, 1060 (single control valves or pumps) to meter the blended flow of each of the injection products to the mixing chamber 822.

Accordingly, each of the injection interfaces 1010, 1050 is able to mix a plurality of injection products with the carrier fluid and provide specified concentrations of those injection products and the carrier fluid while still using single throttling elements 1010, 1060.

FIG. 11 shows another example of an injection interface 1100. The injection interface 1100 includes at least some similar components to the other injection interfaces previously described herein. For instance, the injection interface 1100 includes an interface body 1102 having a plurality of inputs such as a carrier fluid input 804 and one or more injection product inputs such as the injection product inputs 806, 808. Additionally, the injection interface 1100 includes a mixing chamber 822 configured to mix the one or more injection products with the carrier fluid from the carrier fluid input 804 and dispense the locally mixed agricultural product to a nozzle such as the nozzle assembly 824 having a nozzle 826. The nozzle assembly 824 optionally includes its own control valve to apply the agricultural product with the injection products at specified concentrations at a specified flow rate. The nozzle assembly 824, in another example, includes a configurable nozzle to control spray patterns.

In the example shown in FIG. 11, the injection interface 1100 includes throttling elements 1112A and 1114A. In this example, the throttling elements 1112A, 1114A are used in combination, for instance, with blending elements 1112B and 1114B. For instance, the throttling element 1112A and the blending element 1112B are components of a dual-head gear pump configured to provide a metered flow of the injection product from the injection product input 806, mix the metered flow with an initial portion of the carrier fluid, and then distribute the mixed injection product and carrier fluid to the mixing chamber 822 for a second stage of mixing, for instance, with the carrier fluid and optionally another injection product.

As shown in FIG. 11, the throttling element 1112A is, in one example, provided as a multiple element gear pump, for instance, having the throttling element 1I 12A providing the metering function for the injection product delivered from the injection product input 806 in communication with (fluid communication and optionally mechanical communication) with the blending element 1112B. For instance, in one example, the throttling element 1112A pressurizes the injection product from the injection product input 806 (optionally provided by way of gravity flow, passive or low pressure pumping proximate to an injection product reservoir or the like) and delivers the injection product to the blending element 1112B. As shown in FIG. 11, the carrier fluid input 804 splits relative to each of the blending elements 1112B, 1114B and provides a flow of the carrier fluid to the blending elements 1112B, 1114B for blending (e.g., mixing) with the injection product delivered by way of the throttling elements 1112A, 1114A. Accordingly, the blending element 1112B and the throttling element 1112A work in combination to deliver a pressurized flow of the injection product at specified flow rate to the blending element 1112B. The blending element 112B mixes the specified flow rate of the injection product with a portion of the carrier fluid diverted to the element 1112B and then delivers the mixture of the two, for instance, through one or more check valves 818 to the mixing chamber 822 for additional mixing with supplemental carrier fluid and optionally another injection product 808, for instance, from injection product input 808.

As further shown in FIG. 11, the injection product input 808 includes its own throttling element 1114A and blending element 1114B. In one example, each of the throttling elements 1114A and blending element 1114B are in mechanical and fluid communication, for instance, rotation of the gears of the throttling element 114A (e.g., as a gear pump) is transmitted to the gears of the blending element 1114B. The injection product delivered from the injection product input 808 is accordingly metered by the throttling element 1114A, pressurized and thereby delivered to the blending element 1114B for blending with a flow of the carrier fluid diverted to the blending element 1114B from the carrier fluid input 804. The resulting mixture of the injection product as well as the diverted carrier fluid is delivered to the mixing chamber 822 for mixing with the carrier fluid from the input 804 (otherwise not diverted to either of the blending elements 1112B, 1114B) and mixed with the blended injection product from the input 806 and carrier fluid. Accordingly, the injection interface 1100 provides two stage mixing of each of the injection products with the carrier fluid by way of the blending elements 1112B, 1114B and the mixing chamber 822.

As shown in FIG. 11, the injection interface 1100 includes, as with previous examples, a control unit 1108 in communication with each of the throttling and blending elements 1112A, 1112B and 1114A, 1114B. The control unit 1108 is, in one example, provided with the injection interface 1100 and accordingly provides independent control to each of the throttling and blending elements 1112A, 1112B whether independent from each other, synced or the like. In another example, the control unit 1108 is a master control unit, for instance, associated with a plurality of injection interfaces 1100 and configured to accordingly control the flow rates of each of the injection products by way of operation of the respective throttling elements 1112A, 1114A and blending with each of the respective blending elements 1112B, 1114B (in each of the injection interfaces).

In one example, the throttling elements 1112A, 1114A are coupled with each of the blending elements 1112B, 1114B. That is to say, the elements are, in one example, mechanically coupled together (with a common shaft, intervening transmission or the like). Accordingly, input power provided to one of the throttling elements 1112A, 1114A is also provided or transmitted to the associated blending elements 1112B, 1114B. In one example, mechanical power provided to each of these elements is provided by one or more of a hydraulic motor, electric motor, power tank or the like to accordingly rotate the gears of each of the throttling elements 1112A, 1114A as well as the associated blending elements 1112B, 1114B.

FIG. 12 shows another example of an injection interface 1200. As with the previous embodiments described herein, the injection interface 1200 includes one or more fluid inputs such as a carrier fluid input 804, an injection product input 806 and optionally an additional injection product input 808 (as well as additional injection product inputs in other examples). The injection interface 1200 includes an interface body 1202 having one or more fittings for the various inputs. The injection interface 1200 further includes a mixing chamber 822 configured to locally mix a carrier fluid with the one or more of the injection products provided by the inputs 806, 808 relative to a nozzle assembly 824 and a nozzle 826.

As previously described herein, the local mixing of the injection products with the carrier fluid allows for variation and control of the concentration of each of the injection products in the carrier fluid and further facilitates instantaneous changing of the concentration of the injection product relative to the carrier fluid for immediate application, for instance, through the nozzle 826 to one or more crops, soil or the like. Instantaneous mixing and corresponding control of the injection product concentration to a specified concentration and delivery of the resulting mixed agricultural product through the nozzle 826 substantially minimizes (e.g., eliminates, minimizes or the like) lag time between mixing of the agricultural product to the specified concentration of the one or more injection products and dispensing of the agricultural product through the nozzle 826.

Referring again to FIG. 12, as shown, the injection interface 1200 includes another example of a throttling element 1210. In this example, the throttling element 1210 includes a pump configured to displace two or more injection products such as the injection products provided through the injection product inputs 806, 808. In one example, the throttling element 1210 includes one or more of a dual piston pump interconnected with a common crank shaft, a double action pump with each side of the piston faces configured to pump one of the injection products from the inputs 806, 808, a radial pump or the like. As shown, the injection products pass through the throttling element 1210 and are pressurized for delivery to the mixing chamber 822, for instance, through one or more check valves 818 interposed between the throttling element 1210 and the mixing chamber 822. In another example, the throttling element 1210 includes a plurality of component pumps driven from a common mechanical input. For instance, the component pumps are connected with the mechanical input by one or more cams, cam shafts, transmissions or the like to vary flow rates of the injection products between the component pumps. In another example, cams or cam shafts fix the ratio of the injection products to each other, and variation in rotation of the cams or cam shafts are used to proportionally increase and decrease the flow rates of each of the injection products (and their concentration in the carrier fluid) while maintaining a ratio between the injection products.

As further shown, the carrier fluid is provided by the carrier fluid input 804 (through a check valve 818, in one example) to the mixing chamber 822 for mixing with the injection product delivered by the throttling element 1210 at a specified flow rate, for instance, corresponding to a specified concentration of the injection products in the carrier fluid 804 once mixed. The resulting agricultural product is delivered from the mixing chamber 822 through an injection port 820 coupled in one example with the nozzle assembly 824. The local coupling and communication of the injection interface 1200 with the nozzle assembly 824 facilitates the immediate delivery of the agricultural product having the specified concentration to the nozzle 826 for dispensing into the field.

As further shown in FIG. 12, the injection interface 1200 optionally includes a control unit 1208. In one example, the control unit 1208 is included in the housing such as in the interface body 1202 of the injection interface 1200. In another example, and as similarly described herein, the control unit 1208 is a master control unit or component of a control unit (e.g., see injection control module 500 in FIG. 5) positioned away from the injection interface 1200 but coupled with the throttling element 1210 with a wired connection, wireless connection (e.g., optical, radio, RFID) or the like. The control unit 1208, in one example, operates the throttling element 1210 to control the flow rates of each of the injection products from the inputs 806, 808. The control unit 1208 correspondingly controls (e.g., increases, decreases, maintains, regulates or the like) the flow rate of each of the injection products from the inputs 806, 808 to achieve specified concentrations of each of the products (including a concentration of 0 or no injection product) within the carrier fluid delivered through the carrier fluid input 804 to the mixing chamber 822.

FIG. 13 shows one example of a composite boom tube 1300. The composite boom tube 1300 shown in FIG. 13 is, in one example, useable with one or more of the injection interfaces previously described and shown herein. As shown, the composite boom tube 1300 includes a tube body 1302 extending, for instance, into and out of the page. The tube body 1302 includes a tube body perimeter 1314 and one or more passages therein.

As further shown, for instance at the end of the tube body 1302 in FIG. 13, the composite boom tube 1300 includes one or more carrier fluid passages 1304 and one or more injection product passages 1306, 1308. The passages 1304, 1306, 1308 are, in one example, of different sizes. For instance, the carrier fluid passage 1304 is shown as a larger passage (based on cross-sectional area) relative to either of the injection product passages 1306, 1308. Similarly, the injection product passage 1306 is, in one example, larger relative to the injection product passage 1308. In at least some examples, varying flow rates are provided through each of the fluid passages 1304, 1306, 1308. For instance, the carrier fluid passage 1304 is sized to convey a relatively large flow rate of carrier fluid such as water, premixed solution or the like to one or more port stations 1316 (described further herein). Similarly, the injection product passages 1306, 1308 are sized with cross-sectional areas less than the carrier fluid passage 1304, in one example. Accordingly, the injection product passages 1306, 1308, in various examples, provide flow rates (lesser than the carrier fluid flow rate) of concentrated injection products for introduction to the carrier fluid. The injection products and carrier fluid are optionally mixed and distributed from one or more injection interfaces as described herein.

Referring again to FIG. 13, as shown, the various passages 1304, 1306, 1308 are, in examples, divided by partitions 1310 to isolate each of the passages from one another. In other examples, the various passages 1304, 1306, 1308 are provided in separate tubes coupled along, strung through or delivered through a conduit or other tube body such as the tube body 1302 in a manner similar to the configuration shown in FIG. 13. In such an example, each of the passages 1304, 1306, 1308 are formed by component tubes received within the tube body 1302 or adhered, fastened together or the like to facilitate the delivery of the various fluids such as the carrier fluid, injection products or the like to one or more port stations, for instance, along booms of the sprayer.

Referring again to the example shown in FIG. 13, the tube body 1302, in one example, includes a side wall 1312 forming the tube body perimeter 1314. As shown, one or more of the passages such as the carrier fluid passage 1304 and the injection product passages 1306, 1308 optionally share the side wall 1312 and accordingly the side wall 1312 forms at least one surface of each of these passages 1304, 1306, 1308.

The composite boom tube 1300 is, in one example, formed with one or more methods including, but not limited to, extrusion, co-extrusion, pultrusion or the like. In an extrusion example a metal such as aluminum, polymer or the like is extruded through a multi-component dye to accordingly provide each of the passages 1304, 1306, 1308 as well as the tube body 1302. These features are married together during the extrusion process to form a unitary tube body 1302 including the partitions 1310 and the component passages 1304, 1306, 1308.

In another example, each of the passages 1304, 1306, 1308 are separately formed, for instance, within adjacent pultrusion processes and then married, for instance, at a downstream process by one or more of adhesives, heat bonding (e.g., coupling of the component tubes while at a glass transition temperature or the like). In still other examples, each of the passages 1304, 1306, 1308 are formed separately and bonded with adhesives at a downstream location. Accordingly, the composite boom tube 1300 is, in one example, constructed with a variety of configurations, for instance, varying carrier fluid passages 1304 and injection product passages 1306, 1308 (including additional or fewer injection product passages). Optionally, the composite boom tube, and one or more passages are formed with non-circular configurations including, but not limited to, square or rectangular passages that are coupled together as component tubes, coextruded together or the like to form the composite boom tube (e.g., a square or rectangular composite boom tube).

In an additional example, the partition 1310 is a separate component from the tube body 1302. In this example, the partition 1310 is drawn through the tube body 1302 and coupled along the tube body 1302 to form the passages 1304, 1306, 1308. Optionally, partitions 1310 having different configurations including, but not limited to, single or multiple injection product passages, passages having different sizes or the like are used with the tube body 1302 to provide corresponding composite boom tubes 1300 with different configurations. The partition 1310 optionally includes one or more of adhesives, sealants, compliant fittings or the like along the leading edges of the partition engaged with the tube body 1302 to seal each of the passages 1304, 1306, 1308. After assembly whether by extrusion, pultrusion, co-extrusion or assembly of component passages, installation of a partition or the like the composite boom tube 1300 provides a relatively consistent cross-sectional profile, for instance, as shown in FIG. 13.

Referring again to FIG. 13, as shown, the composite boom tube 1300 includes a plurality of port stations 1316, 1318 provided along the tube body 1302. Each of the port stations 1316, 1318 includes one or more outlet ports provided at various locations along the tube body 1302. In the view shown in FIG. 13 (an enlarged view of an otherwise elongated composite boom tube 1300), tube port stations 1316, 1318 are shown. In other examples, the composite boom tube 1300 has a plurality of port stations including, but not limited to, 12, 24, 36 port stations or the like. Each of the port stations 1316, 1318 of the composite boom tube 1300 are, in one example, located at various locations along the tube 1302 including, but not limited to, set intervals between each of the port stations 1316, 1318 corresponding to specified locations of spray nozzles along a sprayer boom.

Each of the ports at the port stations 1316, 1318 are in communication with the various passages 1304, 1306, 1308 of the composite boom tube 1300. In the example shown in FIG. 13, the composite boom tube 1300 includes at each of the port stations 1316, 1318 carrier fluid outlet ports 1320, a first injection product outlet port 1322 and a second injection product outlet port 1324. In one example, each of the outlet ports includes one or more fittings (e.g., such as rubber fittings, check valves or the like) configured to bias the various ports 1320, 1322, 1324 into closed configurations. Accordingly, where one or more of the port stations 1316, 1318 does not include an injection interface (as described herein) the various ports 1320, 1322, 1324 remain closed at those port stations. As will be described herein, the coupling of injection interfaces at the port stations 1316, 1318 engages one or more fittings with the carrier fluid outlet port 1320 and the injection product outlet ports 1322, 1324 to accordingly open the ports and provide communication of the carrier fluid and one or more injection products to each of the coupled injection interfaces.

FIG. 14A shows the composite boom tube 1300 coupled with injection interfaces 1400 at the port stations 1316, 1318 previously shown in FIG. 13. As shown, the injection interfaces 1400 are coupled with the composite boom tube 1300, for instance, with one or more clamping features or other features configured to couple one or more inputs of the injection interfaces 1400 with corresponding ports 1320, 1322, 1324 at each of the port stations 1316, 1318. For instance, in the example shown in FIG. 14A and further shown in FIG. 14B, the interface body 1402 of each of the injection interfaces 1400 includes an input face or other feature configured to extend around at least a portion of the composite boom tube 1300 and thereby couple each of the inputs with the corresponding ports 1320, 1322, 1324. As further shown in FIG. 14A, the interface body 1402 is optionally coupled with a nozzle assembly 1404 to provide a feature for application of the agricultural product at the various locations of the port stations 1316, 1318 of the composite boom tube 1300.

As shown then in FIG. 14A, each of the injection interfaces 1400 and the composite boom tube 1300, when used in cooperation, provide localized injection interfaces for mixing of injection products and carrier fluid and application of agricultural product at a plurality of locations corresponding to the port stations provided along the composite boom tube 1300. As previously described herein, each of the injection interfaces 1400 provides for local control of the concentration of one or more injection products proximate to the nozzle assemblies 1404 to facilitate instantaneous control of the concentration of the one or more injection products within the carrier fluid and corresponding delivery of a mixed agricultural product having the injection products at specified concentrations for immediate dispensing from the nozzle assemblies 1404.

FIG. 14B shows one of the localized injection interfaces 1400 previously shown in FIG. 14A. In this example, the injection interface 1400 is shown in a front view in contrast to the side view previously shown in FIG. 14A. As shown, the injection interface 1400 includes the interface body 1402. In this example, the interface body 1402 includes one or more coupling features configured to couple the injection interface 1400 with the composite boom tube 1300 and accordingly provide one or more injection products and carrier fluid to the injection interface 1400 for localized injection of the various injection products to the carrier fluid at specified concentrations followed by dispensing of the resulting agricultural products, for instance, from one or more product dispensers. One example of a coupling feature includes an interface clamp 1432 (e.g., lockable clamp, biasing element, fastener or the like) configured to couple the injection interface 1400 with the composite boom tube 1300.

In FIG. 14B, one example of a product dispenser, a nozzle assembly 1404, is shown in broken lines coupled at an injection port 1428 of the interface 1400. In other examples, as described herein, the injection port 1428 of the injection interface 1400 is configured for coupling with another product dispenser such as a boom section, multiple nozzle assembly or the like.

Referring again to FIG. 14B, as shown, the injection interface 1400 includes one or more injection product fittings 1410, 1412 provided along an input face 1406 of the interface 1400. Additionally, a carrier fluid fitting 1408 is provided along the input face 1406. In the example shown in FIG. 14B, each of the fittings 1408, 1410, 1412 are configured to match the configuration of the ports 1320, 1322, 1324 shown in FIGS. 13 and 14A. Accordingly, with coupling of the injection interface 1400 with the composite boom tube 1300, each of the carrier fluid fitting 1408 and injection product fittings 1410, 1412 match with corresponding ports 1320, 1322, 1324 to provide communication of the various passages 1304, 1306, 1308 (shown in FIG. 13) to the corresponding components of the injection interface 1400. Optionally, the interface clamp 1432 (e.g., including a lockable clamp, biasing element, fastener or the like) biases one or more of the carrier fluid fitting 1408 or the injection product fittings 1410, 1412 into communication with the corresponding matched ports. The interface clamp 1432 initiates communication between the ports and the corresponding composite boom tube passages and retains the injection interface at a specified location on the composite boom tube, such as a port station 1316, 1318 (as shown in FIGS. 13 and 14A).

As further shown in FIG. 14B, each of the inputs of the injection interface 1400, for instance, the carrier fluid fitting 1408 and the injection product fittings 1410, 1412 include one or more components interposed between a mixing chamber 1420. In one example, the injection product fittings 1410, 1412 include one or more throttling elements 1414, 1416 configured to provide controlled variable flow rates of the injection product to the mixing chamber 1420 for mixing with the carrier fluid to thereby provide a specified concentration of the various injection products in the resulting agricultural product. In another example, the carrier fluid is also controlled, for instance, by a throttling element interposed between the carrier fluid fitting 1408 and the mixing chamber 1420.

Additionally, as shown previously in the schematic diagrams provided herein, the injection interface 1400 further includes one or more optional components in addition to the throttling elements 1414, 1416 including, but not limited to, check valves, flow meters, pressure transducers and the like configured to provide one or more characteristic measurements of the injection products or carrier fluid such as flow rates, pressure drops or the like through the various throttling elements 1414, 1416. The characteristic measurements are used, for instance, by a control unit such as the control unit 1430, to refine control of the injection products, carrier fluid or the like to provide an agricultural product having one or more specified concentrations of the injection products for dispensing at the product dispenser such as the nozzle assembly 1404.

As further shown in FIG. 14B, each of the injection product fitting 1410, 1412 and the carrier fluid fitting 1408 merge the respective fluids at the mixing chamber 1420 for mixing to form a mixed agricultural product for dispensing at the product dispensers. Optionally, a manifold 1418 is provided upstream from the mixing chamber 1420 to receive each of the injection products and carrier fluid prior to delivery to the mixing chamber 1420. In another example, each of the carrier fluid and the injection products are directly delivered to the mixing chamber 1420 for immediate mixing therein. The agricultural product 1420 as it leaves the mixing chamber 1420 is directed to the injection port 1428 configured for coupling with one or more product dispensers such as the nozzle assembly 1404, a boom section or the like.

In the example shown in FIG. 14B, a cap 1422 is interposed between the mixing chamber 1420 and the injection port 1428. In one example, the cap 1420 is removed and the corresponding free end of the interface body 1402 is configured as another example of an injection port, for instance, configured for coupling with one or more assemblies such as a multi-nozzle assembly to provide one or more various spray patterns according to the configuration of the component nozzles of the multi-nozzle assembly.

Referring again to FIG. 14B, as shown, the injection interface 1400 includes an optional control unit 1430 included in the injection interface 1400. In another example, and as previously described herein, the control unit 1430 is remotely positioned relative to the injection interface 1400, for instance, at a master control node, master control unit or the like such as the injection control module 500 shown in FIG. 5. Accordingly, the master control unit provides distributed control of each of a number of component injection interfaces 1400 coupled along the composite boom tube 1300. In other examples, the control unit 1430 as shown is a discrete control unit 1430 provided with the interface body 1402 and in communication with each of the throttling elements 1414, 1416 as well as one or more sensors such as pressure transducers, flow meters or the like provided with the injection interface 1400. Optionally, the control unit 1430, when provided as part of the injection interface 1400, is itself coupled wirelessly or by wired connection, for instance, through a data port or the like to one or more control units of an agricultural sprayer, tractor, harvester or the like, such as a field computer, master control unit, injection control module or the like. The control unit 1430, as previously described herein, controls the operation of the one or more throttling elements 1414, 1416 (e.g., control valves, pumps or the like) to provide one or more of an open loop or feedback loop control of the various throttling elements 1414, 1416 (as well as an optional throttling element included with the carrier fluid passage) to facilitate the control of the concentration of one or more injection products relative to the carrier fluid for control and immediate mixing of the injection products with the carrier fluid to form an agricultural product. The agricultural product (after mixing) is immediately ready for dispensing through a proximate product dispenser, such as the nozzle assembly 1404, with little to no lag time. Accordingly, rapid response to specified changes in the concentration, for instance, as the injection interface 1400 transitions to different zones of a field, a prescription changes for the injection product, or the like is accomplished with the injection interface 1400 (and other examples) described herein.

FIG. 15 shows one example of a product dispenser assembly 1500. In this example, the product dispenser assembly 1500 includes a nozzle assembly 1404 including a nozzle 1424 coupled with one or more passages or lines used with a sprayer, for instance, the sprayer shown in FIGS. 1A, 1B. In this example, the product dispenser assembly 1500 includes a carrier line 1502 (e.g., a boom tube or the like) providing a flow of carrier fluid, for instance, from a carrier fluid reservoir along the length of the boom. The carrier line 1502, in one example, continues to the left and right relative to FIG. 15. As shown, the carrier line 1502 extends into a cap 1504 and a portion of the carrier fluid is redirected into a nozzle passage such as the nozzle passage 1506. The remainder of the carrier fluid travels around the nozzle passage 1506 and continues to the right, for instance, toward the end of the boom. That portion of the carrier fluid delivered through the cap 1504 passes through the nozzle passage 1506 to the nozzle assembly 1404 for dispensing from the nozzle 1424.

In one example, for instance, where the product dispenser assembly 1500 is used with a sprayer not having one or more of the injection interfaces described herein, the carrier line 1502 includes a premixed solution of agricultural product that is provided along the carrier line 1502 and delivered to each of the nozzle assemblies 1404, for instance, along a sprayer boom through respective caps 1504 providing communication between the carrier line 1502 and the nozzle passage 1506.

Referring now to FIG. 16, another example of an injection interface 1600 is shown. In this example, the injection interface 1600 is configured for coupling with an existing product dispenser assembly 1500 including, for instance, a nozzle assembly 1404 and a carrier line 1502. As shown in FIG. 16, the cap 1504 is decoupled from the carrier line 1502 and nozzle passage 1506 and the injection interface 1600 is interposed therebetween. The cap 1504 is replaced, for instance, at an opposed end of the injection interface 1600 relative to an end of the interface 1600 coupled with the remainder of the carrier line 1502 and the nozzle passage 1506.

As further shown in FIG. 16, the product dispenser assembly 1500 (in this example, including the injection interface 1600) includes a nozzle assembly 1404 coupled with an intermediate feature, for instance, the carrier line 1502 and the nozzle passage 1506. In another example, the nozzle assembly 1404 includes a control valve 1426 such as a solenoid operated control valve having an operator that is moved according to a duty cycle to provide one or more flow rates, spray patterns or the like through the nozzle 1424 (e.g., of a mixed agricultural product solution including one or more injection products provided at a specified concentration relative to the carrier fluid).

Referring again to FIG. 16, the injection interface 1600 is interposed between the cap 1504 and the carrier line 1502. As shown in FIG. 16 by way of directional arrows, the carrier line 1502 provides the carrier fluid into the injection interface 1600, for instance, through a carrier fluid input 1604, in one example, having a check valve 1622 such as a diaphragm, lip seal or the like. The carrier fluid passes into the mixing chamber 1614 including one or more mixing structures including vanes, fluting, ridges, passages, a residence chamber or the like configured to mix one or more injection products into the carrier fluid prior to delivery to the remainder of the product dispenser assembly 1500 including the nozzle assembly 1404 and nozzle 1424.

As shown, the injection interface 1600 further includes one or more injection product inputs 1606, 1608. In this example, the interface 1600 includes dual injection product inputs, while in other examples the injection interface 1600 includes fewer or more injection product inputs including, but not limited to, a single injection product input, three, four, five or more injection product inputs. In a manner similar to the previously described and shown schematic versions of the injection interfaces provided herein, the injection product inputs 1606, 1608 provide a flow of one or more injection products to the injection interface 1600 for mixing with the carrier fluid locally relative to the product dispenser assembly 1500 including, for instance, the nozzle assembly 1404.

Additionally, the injection interface 1600 includes one or more throttling elements 1610, 1612 in line with the injection product inputs 1606, 1608, respectively. The throttling elements 1610, 1612 are operated in one example with a control unit 1624 to control the flow rate of the one or more injection products from the inputs 1606, 1608 to the carrier fluid and control the specified concentration of each of the injection products relative to the carrier fluid.

Referring again to FIG. 16, as shown, the control unit 1624 is, in this example, included within an interface body 1602 of the injection interface 1600. As with other previously described embodiments, the control unit 1624 is, in one example, remotely coupled with the injection interface 1600, for instance, wirelessly, by wired connection or the like. For instance, the control unit 1624 is, in one example, a master control unit or a component of a master control unit configured to operate and control a plurality of injection interfaces 1600 distributed along the sprayer boom. In the example shown in FIG. 16, the control unit 1624 is coupled with each of the throttling elements 1610, 1612. In another example, the control unit 1624 is coupled with one or more sensors including one or more of, but not limited to, pressure transducers 1618, 1620 and flow meters 1616. Optionally, the injection interface 1600 includes one or more of these sensors to facilitate feedback loop control of the throttling elements 1610, 1612. While in other examples the injection interface 1600 includes no sensors. For instance, in a configuration where the throttling elements 1610, 1612 include pumps, the injection interface 1600 is optionally without one or more of these instruments, and the throttling elements 1610, 1612 are operated in an open loop manner.

As shown in FIG. 16, the injection interface 1600 does include one or more sensors, such as flow meters 1616 provided for each or one or more of the injection product inputs 1606, 1608. The flow meters 1616 are, in one example, in communication with the control unit 1624 and optionally used to refine operation of the throttling elements 1610, 1612, for instance, in the manner of a feedback loop.

In another example, the injection interface 1600 includes one or more pressure transducers 1618, 1620 optionally provided upstream and downstream relative to the respective throttling elements 1610, 1612 to facilitate the pressure based determination of the flow rate (e.g., by pressure differential) through the throttling elements 1610, 1612. As shown, the pressure transducers 1618, 1620, in this example, are also coupled with the control unit 1624 and are used, in one example, to determine the flow rate through either or both of the throttling elements 1610, 1612 (for instance, where the flow rate through the injection product inputs 1606, 1608 is below the operating threshold for a flow meter such as the flow meter 1616). Optionally, the pressure transducers 1618, 1620 are used in combination with the flow meters 1616, for instance, where the injection product inputs 1606, 1608 are configured to provide a large range of flow rates above and below the operating threshold for the flow meter.

In operation, the injection products are delivered through the respective inputs 1606, 1608 at varying flow rates corresponding to one or more specified concentrations of the injection products relative to the carrier fluid. The throttling elements 1610, 1612 are controlled by, for example, the control unit 1624 to provide these injection products at the specified flow rates to the mixing chamber 1614 for mixing with the corresponding volume of carrier fluid. As the specified concentration of the one or more injection products changes (e.g., as the sprayer moves through a field and the product dispenser assembly 1500 enters into a zone having a differing prescription or the like), the control unit 1624 operates the throttling elements 1610, 1612 to accordingly change the flow rate of the respective injection products and change the specified concentration of the products within the carrier fluid in an instantaneous manner (including near instantaneous and immediately prior to dispensing) prior to application of the agricultural product from the nozzle assembly 1404.

As shown in FIG. 16, the injection product delivered from the throttling elements 1610, 1612 is provided to the mixing chamber 1614, for instance, through check valve 1620 configured to prevent backflow of the injection product or carrier fluid into the injection product inputs 1606, 1608. The injection products and the carrier fluid are mixed by the one or more mixing structures in the mixing chamber 1614 and delivered along the nozzle passage 1506 to the nozzle assembly 1404 including the nozzle 1424. Optionally, the nozzle assembly 1404 includes a control valve 1426, for instance, a solenoid operated control valve configured to operate at one or more duty cycles and thereby provide a controlled flow rate of the agricultural product (including the one or more injection products at specified concentrations) to various zones in the fields according to prescriptions that are implemented by the control unit 1624 through the throttling elements 1610, 1612.

FIG. 17 shows one example of the method 1700 for using a localized product injection interface, such as the injection interfaces described and shown previously herein. In describing the method 1700 reference is made to one or more components, elements, features, functions, steps or the like described herein. Where convenient reference is made to the components, elements, features, functions, steps or the like with reference numerals. Reference numerals provided are exemplary and are not exclusive. For instance, the components, elements, features, functions, steps or the like described in the method 1700 include, but are not limited to, the corresponding numbered elements, other corresponding features described herein (both numbered and unnumbered), as well as their equivalents.

At 1702, the method 1700 includes pressurizing an injection product. As described herein, the injection product is pressurized for injection into a carrier fluid. In one example pressurizing an injection product includes pressurizing the injection product at a remote location, for instance relative to one or more product dispensers. For instance, as shown in FIG. 2A the injection product is optionally pressurized by a pump such as the injection pump 203 provided adjacent to the injection product reservoir 104. The injection product is pressurized from the injection pump 203 to one or more of the throttling elements described herein, such as a control valve or pump. In other examples, the injection product is pressurized for injection to the carrier fluid locally relative to the product dispensers. For instance, as shown in FIG. 8B, in one example the throttling elements 860, 862, such as displacement pumps, pressurize the one or more injection products for mixing with the carrier fluid from a carrier fluid input 804.

At 1704, the method 1700 includes determining a specified injection concentration for the injection product at the product dispenser. In one example, determining the specified injection concentration includes determining one or more of the location of the injection interface or plurality of injection interfaces relative to one or more zones, regions or the like provided on a field map. In one example the sprayer includes an indexing system such as a GPS module or the like configured to determine the location of the sprayer on an ongoing basis. In other examples each of the product dispensers, injection interfaces or the like includes its own GPS fiducial mathematically related relative to the GPS sensor on the sprayer to determine the locations of the injection interfaces relative to the GPS sensor. In another example the specified injection concentration varies based on the speed of the sprayer the rotation of the sprayer booms (e.g., during a turn), variations based on operator specified concentrations or the like.

At 1706, the method 1700 includes operating at least one throttling element, for instance one or more of the throttling elements as shown herein, including control valves, displacement pumps or the like of the injection interface at the product dispenser (e.g., a nozzle assembly, boom section or the like). Other examples of product dispensers a boom section 108 (e.g., as shown in FIG. 2B).

In one example, operating the at least one throttling element includes injecting the injection product to a mixing chamber, such as the mixing chamber 822 shown in FIGS. 8A, 8B or the mixer 210, 304 shown in FIGS. 2B, 3B. The injection product is injected to the mixing chamber at the specified injection concentration. For instance, the injection production (including one or more injection products) is provided to the mixing chamber, manifold or the like at a flow rate corresponding to the specified concentration of the injection product relative to the flow rate of the carrier fluid (e.g., with increasing flow rates of the carrier fluid the flow rate of the one or more injection products is increased to offset the increase in the carrier fluid flow rate and maintain the specified injection concentration).

At 1710, operating the at least one throttling element (e.g., the one or more control valves, one or more pumps or the like) includes changing an injection concentration in the carrier fluid to the specified injection concentration at the product dispenser (such as one or more of the nozzle assembly, boom section or the like) according to the positioning of the at least one throttling element at the product dispenser. In one example changing the injection concentration includes a local change of the injection concentration at the product dispenser to facilitate instantaneous (including near instantaneous, with minimal lag time or the like) control of the injection concentration relative to the carrier fluid for immediate application of the mixed agricultural product from the product dispenser.

At 1712, the method 1700 includes delivering a mixture of the carrier fluid and the one or more injection products at the specified injection concentration (e.g., an agricultural product) to the product dispenser, such as one or more of the boom section 108 previously described herein or one or more nozzle assemblies 824 including nozzles 826 as previously described herein. The carrier fluid and the injection product are optionally blended and mixed at a mixing chamber, such as the mixing chamber 822 adjacent to the product dispenser. Accordingly, lag time otherwise present with remote mixing and delivery of the agricultural product along one or more booms or the like to the various product dispensers is avoided. Instead, with local mixing of the one or more injection products with the carrier fluid the resulting agricultural product is provided at a specified concentration to the associated product dispensers with minimal lag time (e.g., instantaneously or near instantaneously) to facilitate control (including variation, maintenance or the like) of specified injection product concentrations in the carrier fluid for immediate application to one or more crops, soil or the like in a field.

Several options for the method 1700 follow. In one example, pressurizing the injection product includes pressurizing the injection product to a plurality of localized injection interfaces, for instance one or more control valves positioned at product dispensers of the plurality of product dispensers (e.g., nozzles assemblies 824 and nozzles 826, boom sections 108 or the like). In one example, pressurizing the injection products to the plurality of localized injection interfaces includes remotely pressurizing the injection product at an injection pump as previously described herein and delivering the pressurized injection fluid in one or more injection product passages (such as the passages 1306, 1308 shown in FIG. 13) to the injection interfaces and product dispensers previously described herein. In other examples pressurizing the injection product to the localized injection interfaces includes pressurizing the injection product at the injection interfaces, for instance with one or more positive displacement pump throttling elements described herein. For instance, referring to FIG. 8B one example of throttling elements 860, 862 including positive displacement pumps is shown. In this example the throttling elements 860, 862 provide a pressurized environment for the one or more injection products and deliver the one or more injection products at flow rates corresponding to specified concentrations to the carrier fluid. In an example such as the one shown in FIG. 8B, the throttling element 860, 862 generate the pressurized environment of the injection product in a local manner relative to the injection interface 850 (also shown in FIG. 8B).

The method 1700 further includes, in another example, dispensing the mixture of the carrier fluid with the injection product at the specified injection concentration from the product dispenser immediately after injection and change of the injection concentration (change of the injection concentration also includes maintenance of a concentration). For instance, dispensing of the mixture of the carrier fluid and the injection product occurs proximate to injection of the injection product to the carrier fluid to facilitate dispensing (e.g., spray) with little to no lag time between the control of the injection product.

In another example, the method 1700 further includes measuring the injection concentration relative to the carrier fluid at a product dispenser for instance proximate to one or more of the boom section 108, nozzle assembly 824 or the like. The measured injection concentration is compared to the specified injection concentration. Changing the injection concentration as described in the method 1700 to the specified injection concentration includes instantaneously (e.g., with little to no lag time) changing the injection concentration according to the comparison of the measured injection concentration with the specified injection concentration. In one example, as shown in FIGS. 8A, one or more sensors, such as flow meters 814, 816, are included with one or more throttling elements 810, 812, respectively. The flow meters measure flow rates of the injection product through the respective throttling elements 810, 812. The measured flow rates of the one or more injection products correspond to concentrations of the injection products to the carrier fluid. The measured flow rates are compared with flow rates corresponding to the specified injection concentrations The control unit 813, in an example, uses the comparison to refine control of the throttling elements and achieve flow rates of each of the one or more injection products that meet the specified injection concentrations for each. Optionally, measuring the injection concentration includes determining the ratio of an injection product flow rate through the at least one throttling element to a carrier fluid flow rate to the injection interface. For instance, in one example a carrier fluid flow rate is determined with one or more upstream flow meters provided for the carrier fluid. In other examples, one or more flow meters or the like are provided downstream, for instance as part of or proximate to one or more injection interfaces such as the injection interface 800 shown in FIG. 8A.

Although the examples shown in FIGS. 8A, 9A and elsewhere include flow meters as example sensors, the sensors associated with the various injection interfaces described herein optionally include one or more pressure transducers for instance pressure transducers provided upstream and downstream relative to the various throttling elements. By measuring the pressure differential therebetween the flow rate is in one example determined for each of the injection products.

In other examples the method 1700 includes mixing the injection product with the carrier fluid in a mixing chamber, such as the mixing chamber 822 shown for instance in FIGS. 8A, 8B. The mixing chamber 822 one or more mixing features, such as serpentine passages, vanes, flutes, residence chambers or the like to passively or actively mix the one or more injection products with the carrier fluid to form the agricultural product.

In another example, operating the at least one throttling element on the localized product injection interface includes at least one of operating a control valve for instance the control valve throttling elements 810, 812 shown in FIG. 8A or operating the positive displacement pump throttling elements 860, 862 shown in FIG. 8A, 8B as well as any of the other examples previously described herein. Another example pressurizing the injection product includes operating the at least one throttling element for instance with a throttling elements include one or more positive displacement pump throttling element 860 and the positive displacement pump 862 shown in the FIG. 8B at product dispenser such as one or more of the boon section 108 nozzle assembly 824 or the like.

Various Notes & Examples

Example 1 can include subject matter such as a localized product injection system comprising: a composite boom tube including: a tube body extending from a carrier fluid input and at least one injection product input, a carrier fluid passage within the tube body and extending from the carrier fluid input, at least one injection product passage within the tube body and extending from the at least one injection product input, the at least one injection product passage isolated from the carrier fluid passage, and a plurality of port stations at a plurality of locations along the tube body, each of the plurality of port stations includes: a carrier fluid outlet port in communication with the carrier fluid passage, the carrier fluid outlet port is configured for coupling with a carrier fluid input of a localized injection interface, and at least one injection product outlet port in communication with the at least one injection product passage, the injection product outlet port is configured for coupling with an injection product input of the localized injection interface.

Example 2 can include, or can optionally be combined with the subject matter of Example 1, to optionally include wherein the tube body is an extruded tube body including coextruded partitions for each of the carrier fluid passage and the at least one injection product passage.

Example 3 can include, or can optionally be combined with the subject matter of one or any combination of Examples 1 or 2 to optionally include wherein the at least one injection product passage includes at least a first injection product passage and a second injection product passage, the first and second injection product passages isolated from each other.

Example 4 can include, or can optionally be combined with the subject matter of one or any combination of Examples 1-3 to optionally include wherein the first injection product passage includes a first cross sectional area larger than a second cross sectional area of the second injection product passage.

Example 5 can include, or can optionally be combined with the subject matter of one or any combination of Examples 1-4 to optionally include wherein the carrier fluid passage and the at least one injection product passage include component tubes within the tube body.

Example 6 can include, or can optionally be combined with the subject matter of Examples 1-5 to optionally include wherein at least two of the carrier fluid passage, the at least one injection product passage and the tube body share an integrated side wall.

Example 7 can include, or can optionally be combined with the subject matter of Examples 1-6 to optionally include wherein each of the carrier fluid passage, the at least one injection product passage and the tube body share an integrated side wall.

Example 8 can include, or can optionally be combined with the subject matter of Examples 1-7 to optionally include wherein the tube body includes a tube body perimeter, and for each of the port stations of the plurality of port stations: the carrier fluid outlet port is provided at a first perimeter location of the tube body perimeter, and the at least one injection product outlet port is provided at a second perimeter location of the tube body perimeter different than the first perimeter location.

Example 9 can include, or can optionally be combined with the subject matter of Examples 1-8 to optionally include wherein the first and second perimeter locations are different circumferential locations around the tube body perimeter.

Example 10 can include, or can optionally be combined with the subject matter of Examples 1-9 to optionally include at least one localized injection interface configured for coupling at a port station of the plurality of port stations, the at least one injection interface includes: a carrier fluid input and at least one injection product input, each of the carrier fluid and the at least one injection product inputs are configured for coupling with one of the carrier fluid outlet port and the at least one injection product outlet port of the composite boom tube at the port station of the plurality of port stations, at least one throttling element in communication with the at least one injection product input, a mixing chamber in communication with each of the carrier fluid input and the at least one injection product input, and an injection port in communication with the mixing chamber, the injection port configured for localized coupling at a product dispenser and localized injection to the product dispenser.

Example 11 can include, or can optionally be combined with the subject matter of Examples 1-10 to optionally include wherein the carrier fluid outlet port and the at least one injection product outlet port of the port station of the plurality of port stations are in a first arrangement, and the at least one location injection interface includes an input face including each of the carrier fluid input and the at least one injection product input in a second arrangement corresponding to the first arrangement.

Example 12 can include, or can optionally be combined with the subject matter of Examples 1-11 to optionally include wherein the at least one localized injection interface includes an interface clamp, the interface clamp configured to: couple the at least one localized injection interface with the port station, and couple the first arrangement of the carrier fluid outlet port and the at least one injection product outlet port of the port station with the second arrangement of the carrier fluid input and the least one injection product input of the at least one localized injection interface.

Example 13 can include, or can optionally be combined with the subject matter of Examples 1-12 to optionally include a localized injection interface comprising: an input face configured for coupling at a port station along a composite boom tube, the input face includes: a carrier fluid fitting configured for coupling with a carrier fluid outlet port at the port station, at least one injection product fitting configured for coupling with at least one injection product outlet port at the port station, and each of the carrier fluid fitting and the at least one injection product fitting are arranged on the input face to interface with the respective carrier fluid outlet port and the at least one injection product outlet port with coupling of the localized injection interface at the port station; at least one throttling element in communication with the at least one injection product fitting; a mixing chamber in communication with each of the carrier fluid and the at least one injection product fittings; and an injection port in communication with the mixing chamber, the injection port configured for localized coupling at a product dispenser and localized injection to the product dispenser.

Example 14 can include, or can optionally be combined with the subject matter of Examples 1-13 to optionally include an electronic control unit coupled with the at least one throttling element, the electronic control unit configured to control the throttling element and a corresponding injection product flow rate through the throttling element.

Example 15 can include, or can optionally be combined with the subject matter of Examples 1-14 to optionally include an interface clamp, the interface clamp configured to: couple the at least one localized injection interface with the port station, and couple the arrangement of the carrier fluid outlet port and the at least one injection product outlet port of the port station with the arrangement of the carrier fluid fitting and the least one injection product fitting of the localized injection interface.

Example 16 can include, or can optionally be combined with the subject matter of Examples 1-15 to optionally include the composite boom tube having the port station included with a plurality of port stations provided along the composite boom tube.

Example 17 can include, or can optionally be combined with the subject matter of Examples 1-16 to optionally include the product dispenser, the product dispenser includes a nozzle assembly coupled with the injection port.

Example 18 can include, or can optionally be combined with the subject matter of Examples 1-17 to optionally include the nozzle assembly is integral to the localized injection interface.

Example 19 can include, or can optionally be combined with the subject matter of Examples 1-18 to optionally include wherein the mixing chamber includes one or more of vanes, flutes or passages configured to mix an injection product with a carrier fluid.

Example 20 can include, or can optionally be combined with the subject matter of Examples 1-19 to optionally include a flow meter in communication with the at least one injection product fitting.

Example 21 can include, or can optionally be combined with the subject matter of Examples 1-20 to optionally include a first pressure transducer positioned upstream relative to the at least one injection product fitting, and a second pressure transducer positioned downstream relative to the at least one injection product fitting, and between the mixing chamber and the at least one injection product fitting.

Example 22 can include, or can optionally be combined with the subject matter of Examples 1-21 to optionally include wherein the throttling element includes one or more of a control valve or pump.

Example 23 can include, or can optionally be combined with the subject matter of Examples 1-22 to optionally include a localized injection interface comprising: an interface body including a mixing chamber, a carrier fluid input in communication with the mixing chamber, the carrier fluid input configured for coupling with a carrier fluid passage; at least one injection product input in communication with the mixing chamber, the at least one injection product input configured for coupling with an injection product passage; an injection product control system configured to deliver an injection product to a carrier fluid locally relative to a nozzle assembly, the injection product control system includes: a throttling element interposed between the at least one injection product input and the mixing chamber, and a control unit coupled with the throttling element, the control unit and the throttling element are configured to control the flow of the injection product to the mixing chamber; and an injection port in communication with the mixing chamber, the injection port is configured for localized coupling with the nozzle assembly and direct delivery of a mixture of the carrier fluid and the injection product to the nozzle assembly.

Example 24 can include, or can optionally be combined with the subject matter of Examples 1-23 to optionally include a nozzle assembly coupled with the injection port.

Example 25 can include, or can optionally be combined with the subject matter of Examples 1-24 to optionally include wherein the localized injection interface is configured for: downstream coupling with a carrier fluid system and at least one injection product system, and local coupling upstream relative to the nozzle assembly.

Example 26 can include, or can optionally be combined with the subject matter of Examples 1-25 to optionally include wherein in an operation configuration: the carrier fluid input is configured to deliver the carrier fluid to the mixing chamber, the at least one injection product input is configured to deliver a specified flow rate of the injection product to the mixing chamber according to the operation of the control unit and the throttling element, the mixing chamber is configured to mix the injection product with the carrier fluid, and the injection port is configured to locally deliver the mixture of the carrier fluid and the injection product directly to the nozzle assembly.

Example 27 can include, or can optionally be combined with the subject matter of Examples 1-26 to optionally include wherein the mixing chamber includes at least one mixing structure.

Example 28 can include, or can optionally be combined with the subject matter of Examples 1-27 to optionally include wherein the at least one mixing structure includes one or more of vanes, flutes, passages or residence chambers.

Example 29 can include, or can optionally be combined with the subject matter of Examples 1-28 to optionally include wherein the carrier fluid input includes a carrier fluid check valve and the at least one injection product input includes an injection product check valve.

Example 30 can include, or can optionally be combined with the subject matter of Examples 1-29 to optionally include wherein the control unit operates the throttling element according to a specified concentration of the injection product relative to the carrier fluid.

Example 31 can include, or can optionally be combined with the subject matter of Examples 1-30 to optionally include wherein the throttling element includes one or more of a control valve or pump coupled with the control unit.

Example 32 can include, or can optionally be combined with the subject matter of Examples 1-31 to optionally include a method for using a localized product injection interface comprising: pressurizing an injection product; determining a specified injection concentration for the injection product at a product dispenser; and operating at least one throttling element of the localized product injection interface at the product dispenser, operating includes: injecting the injection product to a mixing chamber at the product dispenser according to the specified injection concentration, and changing an injection concentration in the carrier fluid to the specified injection concentration at the product dispenser according to the positioning of the at least one throttling element at the product dispenser; and delivering a mixture of the carrier fluid and the injection product at the specified injection concentration to the product dispenser.

Example 33 can include, or can optionally be combined with the subject matter of Examples 1-32 to optionally include wherein pressurizing the injection product includes pressurizing the injection product to a plurality of localized injection interfaces each respectively positioned at product dispensers of a plurality of product dispensers.

Example 34 can include, or can optionally be combined with the subject matter of Examples 1-33 to optionally include dispensing the mixture of the carrier fluid with the injection product at the specified injection concentration from the product dispenser immediately after injection and change of the injection concentration.

Example 35 can include, or can optionally be combined with the subject matter of Examples 1-34 to optionally include measuring the injection concentration relative to the carrier fluid at the product dispenser; comparing the measured injection concentration relative to the specified injection concentration; and wherein changing an injection concentration in the carrier fluid to the specified injection concentration includes instantaneously changing the injection concentration according to the comparison of the measured injection concentration with the specified injection concentration.

Example 36 can include, or can optionally be combined with the subject matter of Examples 1-35 to optionally include wherein measuring the injection concentration includes determining the ratio of an injection product flow rate through the at least one throttling element to a carrier fluid flow rate to the mixing chamber.

Example 37 can include, or can optionally be combined with the subject matter of Examples 1-36 to optionally include wherein determining the specified injection concentration includes determining the specified injection concentration according to the injection concentration associated with a determined location on the field map; and operating the at least one throttling element includes operating the at least one throttling element according to the determined location and the associated injection concentration.

Example 38 can include, or can optionally be combined with the subject matter of Examples 1-37 to optionally include mixing the injection product with the carrier fluid in a mixing chamber with one or more mixing structures.

Example 39 can include, or can optionally be combined with the subject matter of Examples 1-38 to optionally include wherein operating the at least one throttling element of the localized product injection interface includes at least one of: operating a control valve, or operating a pump.

Example 40 can include, or can optionally be combined with the subject matter of Examples 1-39 to optionally include wherein pressurizing the injection product includes operating the at least one throttling element at the product dispenser, the at least one throttling element includes a pump.

Example 41 can include, or can optionally be combined with the subject matter of Examples 1-40 to optionally include wherein pressurizing the injection product includes pressurizing the injection product between an injection product reservoir and the at least one throttling element, the at least one throttling element includes one or more of a control valve or a pump.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

The claimed invention is:

1. A localized product injection interface comprising:
one or more interface bodies configured for coupling with a boom tube, the boom tube coupled with one or more upstream pumps configured to pressurize a carrier fluid and an injection product, the one or more interface bodies configured to mix the carrier fluid and the injection product to form an agricultural product and provide the agricultural product for spray application, each interface body of the one or more interface bodies houses:
 a carrier fluid fitting configured to couple with a carrier fluid passage of the boom tube and receive the carrier fluid pressurized with the one or more upstream pumps;
 an injection product fitting configured to couple with an injection product passage of the boom tube and receive the injection product pressurized with the one or more upstream pumps;
 an injection control valve, the injection product fitting extending to the injection control valve, the injection control valve is configured to control an injection flow rate of the injection product;
 a mixing chamber, the carrier fluid fitting and injection control valve extending to the mixing chamber, the mixing chamber includes a static mixer configured to mix the injection product at the injection flow rate with the carrier fluid from the carrier fluid fitting in each interface body and provide the agricultural product; and
 at least one flow measuring sensor proximate to the injection control valve;
  wherein the at least one flow measuring sensor measures at least one of flow rate or pressure differential of the injection product;
  wherein the injection control valve is configured to meter a quantity of the injection product to the mixing chamber according to the measured at least one of flow rate or pressure differential of the injection product; and
 a plurality of nozzle assemblies, each nozzle assembly engaged with at least one of the one or more interface bodies;
  wherein each nozzle assembly of the plurality of nozzle assemblies is in direct communication with the mixing chamber housed in at least one of the one or more interface bodies, and each nozzle assembly is configured to spray the agricultural product pressurized with the one or more upstream pumps;
wherein the agricultural product sprayed from each nozzle assembly includes a concentration of injection product specific to each nozzle assembly.

2. The localized product injection interface of claim 1 comprising a control unit in communication with the injection control valve, and the control unit is configured to control concentration of the injection product in the carrier fluid with control of the injection flow rate by the injection control valve.

3. The localized product injection interface of claim 2, comprising a carrier control valve in communication with the carrier fluid fitting and the mixing chamber, and the control unit is in communication with the carrier control valve; and
the control unit is configured to control a carrier flow rate of the carrier fluid with the carrier control valve.

4. The localized product injection interface of claim 2, comprising one or more sensors configured to measure characteristics of one or more of the injection product or the carrier fluid, the one or more sensors in communication with the control unit.

5. The localized product injection interface of claim 4, wherein the one or more sensors include one or more of flow meters or pressure transducers coupled with one or more of the injection product fitting or the carrier fluid fitting.

6. The localized product injection interface of claim 4, wherein the one or more sensors include sensors configured to measure or determine a flow rate of one or more of the injection product or the carrier fluid; and wherein the control unit is configured to control concentration of the injection product in the carrier fluid according to the measured or determined flow rate.

7. The localized product injection interface of claim 2, comprising a concentration sensor proximate to the nozzle assembly, the concentration sensor configured to measure concentration of the injection product in the agricultural product.

8. The localized product injection interface of claim 1, wherein the interface body is configured for:
downstream coupling with a carrier fluid system and at least one injection product system; and
local coupling upstream relative to the nozzle assembly.

9. The localized product injection interface of claim 1, wherein the mixing chamber is interposed between the nozzle assembly and each of the carrier fluid fitting and the injection product fitting.

10. The localized product injection interface of claim 1, wherein the interface body includes an interface clamp configured to:
close around the boom tube;
interfit the carrier fluid fitting with the carrier fluid passage; and
interfit the injection product fitting with the injection product passage.

11. The localized product injection interface of claim 10, wherein the interface body includes an input face having the carrier fluid fitting and the injection product fitting extending along the input face; and wherein closing of the interface clamp is configured to interfit the carrier fluid fitting and the injection product fitting along the interface clamp with the carrier fluid passage and the injection product passage, respectively.

12. The localized product injection interface of claim 1 comprising the one or more upstream pumps; and the boom tube extending from the one or more upstream pumps to the interface body.

13. The localized product injection interface of claim 1, including a control unit configured to communicated with the injection control valve to control the injection flow rate based on at least one of the measured flow rate or pressure differential.

14. A localized product injection interface comprising:
one or more interface bodies, each interface body configured for coupling with a boom tube, the boom tube coupled with one or more upstream pumps configured to pressurize a carrier fluid and an injection product, each interface body configured to mix the carrier fluid and the injection product to form an agricultural product and provide the agricultural product for spray application, each interface body houses:
a carrier fluid fitting configured to couple with a carrier fluid passage of the boom tube and receive the carrier fluid pressurized with the one or more upstream pumps;
an injection product fitting configured to couple with an injection product passage of the boom tube and receive the injection product pressurized with the one or more upstream pumps;
an injection control valve, the injection product fitting extending to the injection control valve, the injection control valve is configured to control an injection flow rate of the injection product;
at least one flow measuring sensor proximate to the injection control valve;
wherein the at least one flow measuring sensor is configured to measure at least one of the flow rate or pressure differential of the injection product and is configured to provide an output to a control unit;
a carrier control valve, the carrier fluid fitting extending to the carrier control valve, and the carrier control valve is configured to control a carrier flow rate of the carrier fluid; and
a mixing chamber, the carrier control valve and the injection control valve extending to the mixing chamber, the mixing chamber includes a static mixer configured to mix the injection product at the injection flow rate with the carrier fluid at the carrier flow rate in each interface body and provide the agricultural product;
the control unit in communication with the injection control valve and the carrier control valve of each interface body, the control unit is configured to control each of the injection flow rate, based on the at least one of the flow rate or pressure differential, and the carrier flow rate; and
one or more nozzle assemblies, each nozzle assembly directly coupled with an associated interface body of the one or more interface bodies, each nozzle assembly in direct communication with the mixing chamber, and each nozzle assembly is configured to spray the agricultural product pressurized with the one or more upstream pumps;
wherein the control unit is configured to independently control the injection control valve of each interface body, and is configured to control each nozzle assembly associated with a respective injection control valve is configured to spray an agricultural product with independently controlled concentration relative to a different nozzle assembly of the one or more nozzle assemblies and a respective injection control valves according to an output from the control unit.

15. The localized product injection interface of claim 14 comprising one or more sensors configured to measure characteristics of one or more of the injection product or the carrier fluid, the one or more sensors in communication with the control unit.

16. The localized product injection interface of claim 15, wherein the one or more sensors include one or more of flow meters or pressure transducers coupled with one or more of the injection product fitting or the carrier fluid fitting.

17. The localized product injection interface of claim 16, wherein the one or more flow meters or pressure transducers are configured to measure or determine one or more of the injection flow rate of the injection product or the carrier flow rate of the carrier fluid; and wherein the control unit is configured to control concentration of the injection product in the carrier fluid according to one or more of the injection flow rate or the carrier flow rate.

18. The localized product injection interface of claim 17, wherein the one or more flow meters or pressure transducers are configured to measure or determine each of the injection flow rate and the carrier flow rate; and wherein the control unit is configured to control concentration of the injection product in the carrier fluid according to the injection flow rate and the carrier flow rate.

19. The localized product injection interface of claim 14 comprising a concentration sensor proximate to the nozzle assembly, the concentration sensor configured to measure concentration of the injection product in the agricultural product.

20. The localized product injection interface of claim 19, wherein the control unit is configured to control the injection flow rate of the injection control valve based on the measured concentration of the injection product.

21. The localized product injection interface of claim 14, wherein the injection product fitting includes at least first and second injection product fittings configured to couple with first and second injection product passages of the injection product passage; and the injection control valve includes a first injection control valve in communication with the first injection product fitting and a second injection control valve in communication with the second injection product fitting.

22. The localized product injection interface of claim 21, wherein the control unit is in communication with each of the first and second injection control valves, and the control unit is configured to control each of first and second injection flow rates.

23. The localized product injection interface of claim 22 comprising the injection product, and the injection product includes first and second injection products that are different.

24. The localized product injection interface of claim 14, wherein the mixing chamber is interposed between the nozzle assembly and each of the carrier fluid fitting and the injection product fitting.

25. The localized product injection interface of claim 14, wherein the interface body includes an interface clamp configured to:
close around the boom tube;
interfit the carrier fluid fitting with the carrier fluid passage; and
interfit the injection product fitting with the injection product passage.

26. The localized product injection interface of claim 25, wherein the interface body includes an input face having the carrier fluid fitting and the injection product fitting extending along the input face; and wherein closing of the interface clamp is configured to interfit the carrier fluid fitting and the injection product fitting along the interface clamp with the carrier fluid passage and the injection product passage, respectively.

27. The localized product injection interface of claim 14 comprising the one or more upstream pumps; and the boom tube extending from the one or more upstream pumps to the interface body.

* * * * *